US011895347B2

(12) United States Patent
Park et al.

(10) Patent No.: US 11,895,347 B2
(45) Date of Patent: Feb. 6, 2024

(54) MEDIA PROCESSING DEVICE AND MEDIA PROCESSING METHOD

(71) Applicant: LG ELECTRONICS INC., Seoul (KR)

(72) Inventors: Jonghwan Park, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/797,599

(22) PCT Filed: Feb. 17, 2021

(86) PCT No.: PCT/KR2021/002010
§ 371 (c)(1),
(2) Date: Aug. 4, 2022

(87) PCT Pub. No.: WO2021/177630
PCT Pub. Date: Sep. 10, 2021

(65) Prior Publication Data
US 2023/0042657 A1     Feb. 9, 2023

(30) Foreign Application Priority Data

Mar. 5, 2020 (KR) .................. 10-2020-0027942
Mar. 19, 2020 (KR) .................. 10-2020-0034021
Mar. 26, 2020 (KR) .................. 10-2020-0037143

(51) Int. Cl.
*H04N 21/2362* (2011.01)
*H04N 21/262* (2011.01)

(52) U.S. Cl.
CPC ....... *H04N 21/2362* (2013.01); *H04N 21/262* (2013.01)

(58) Field of Classification Search
CPC .................. H04N 21/2362; H04N 21/262
(Continued)

(56) References Cited

U.S. PATENT DOCUMENTS 10,356,453 B2 * 7/2019 Hwang .................. H04L 65/80
2010/0058387 A1 * 3/2010 De Cuetos ............. H04H 60/25
725/39
(Continued)

FOREIGN PATENT DOCUMENTS

KR   10-2014-0107251 A    9/2014
WO      2019212318 A1    11/2019

OTHER PUBLICATIONS

Broadbandtvnews.com: DVBI-I Specification Wins Approval, Nov. 13, 2019 (5 Pages).
(Continued)

*Primary Examiner* — Dominic D Saltarelli
(74) *Attorney, Agent, or Firm* — BRYAN CAVE LEIGHTON PAISNER LLP

(57) ABSTRACT

Disclosed herein is a media processing device including a receiver configured to receive a service and receive a service list for the service from a service list server, a processor configured to perform service discovery for the service based on the service list, and a displayer configured to display the service based on the service discovery. Disclosed herein is a media processing device including a memory and a processor connected to the memory, wherein the processor may be configured to transmit a service, and transmit a service list for the service from a service list server, wherein the service list may be used to perform service discovery for the service.

10 Claims, 76 Drawing Sheets

(58) Field of Classification Search
USPC .......................................................... 725/54
See application file for complete search history.

(56) References Cited

U.S. PATENT DOCUMENTS

| | | |
|---|---|---|
| 2012/0288031 A1 | 11/2012 | Vare et al. |
| 2014/0282780 A1* | 9/2014 | Craib ............... H04N 21/44209 |
| | | 725/54 |
| 2017/0013028 A1 | 1/2017 | Yang et al. |
| 2017/0155963 A1* | 6/2017 | Harper ............. H04N 21/47214 |
| 2019/0306006 A1 | 10/2019 | Kwak et al. |
| 2020/0045379 A1 | 2/2020 | Yang et al. |

OTHER PUBLICATIONS

Anigan, Peter et al., Webinar: DVB-I service discovery and programme metadata. DVB Nov. 4, 2019 (51 Pages).

\* cited by examiner

FIG. 5

| Terms | Meaning |
|---|---|
| C | ServiceDiscoveryListTable including services delivered via Cable |
| S | ServiceDiscoveryListTable including services delivered via Satellite |
| T | ServiceDiscoveryListTable including services delivered via Terrestrial |
| I | ServiceDiscoveryListTable including services delivered via Internet |
| IPTV | ServiceDiscoveryListTable including services delivered via IPTV |
| ALL | ServiceDiscoveryListTable including all services delivered via C|S|T|I |

FIG. 9

| Element or Attribute Name | Use | Data Type | Format |
|---|---|---|---|
| ServiceDiscoveryListTable | 1 | | Root element |
| Service | 1..N | | |
| serviceId | 1 | unsignedShort | Number that uniquely identifies this service within the scope of the originalNetworkId. |
| globalServiceId | 0..1 | uri | Globally unique service identifier. It is mapped with the global service id in the ESG. For the traditional DVB-C/S/T service, this attribute is not present. |
| originalNetworkId | 1 | unsignedShort | Number that uniquely identifies the original network which this service was originally generated. |
| transportStreamId | 0..1 | unsignedShort | Number that uniquely identifies the transport stream. This attribute should be present in the traditional DVB-C/S/T service, but it may not be present for the DVB-I service with ISO BMFF format. |
| serviceCategory | 1 | unsignedByte | The category of this service. It can be linear, on-demand, or application service. More detail is listed in the table below. |
| SvcSeqNum | 1 | unsignedByte | Version of service information in this table - increments by one for each new version of service data in RFD; wraps around to 0. |
| contentFormat | 0..1 | unsignedByte | The format of contents of this service |
| svchetUrl | 0..N | anyURI | URL to access signaling/ESG objects. |
| urlType | 1 | unsignedShort | Type of files available with this URL (See ) |

FIG. 10

| serviceCategory | Meaning |
|---|---|
| 0 | Not used |
| 1 | Linear TV Service |
| 2 | Linear Radio Service |
| 3 | VoD Service |
| 4 | App Service |
| 5 | ESG Service |
| 6 | Data Service |
| 7-255 | Reserved for the future use |

FIG. 11

| contentFormat | Meaning |
|---|---|
| 0 | Not used |
| 1 | TS |
| 2 | ISO BMFF |
| 3 | CMAF |
| 4-255 | Reserved for the future use |

FIG. 12

| urlType | Meaning |
|---|---|
| 0 | Not used |
| 1 | URL of Service Signaling Server |
| 2 | URL of ESG server (providing access to the ESG data) |
| Other values | Reserved for the future use |

FIG. 13

| Element or Attribute Name | Use | Data Type | Format |
|---|---|---|---|
| ServiceDiscoveryListTable | 1 | | Root element |
| SdtInetUrl | 0..N | anyURI | URL to access signaling/ESG objects. |
|   urlType | 1 | unsignedByte | Type of files available with this URL |
| Service | 1..N | | Service information |
|   serviceId | 1 | unsignedShort | Number that uniquely identifies this service within the scope of the originalNetworkId. |
|   globalServiceId | 0..1 | uri | Globally unique service identifier. It is mapped with the global service id in the ESG. For the traditional DVB-C/S/T service, this attribute is not present. |
|   originalNetworkId | 1 | unsignedShort | Number that uniquely identifies the original network which this service was originally generated. |
|   transportStreamId | 0..1 | unsignedShort | Number that uniquely identifies the transport stream. This attribute should be present in the traditional DVB-C/S/T service, but it may not be present for the DVB-I service with ISO BMFF format. |
|   serviceType | 1 | unsignedByte | The category of this service. It can be linear, on-demand, or application service. More detail is listed in the table below. |
|   SvcSeqNum | 1 | unsignedByte | Version of service information in this table - increments by one for each new version of service data in RFD; wraps around to 0. |
|   contentFormat | 0..1 | unsignedByte | The format of contents of this service(See Table 8.4) |
|   svcInetUrl | 0..N | anyURI | URL to access signaling/ESG objects for this service |
|     urlType | 1 | unsignedByte | Type of files available with this URL |

FIG. 14

| Terms | Meaning |
|---|---|
| <service_id> | Identifies desired service |
| normal|diff|template | Identifies desired mode of files |
| current|next | Identifies desired current/next version |
| list_of_signaling_object_types | space separated string of string tokens defined in Table 8.8. |

FIG. 15

| object_type value | Description |
|---|---|
| ALL | All metadata objects for requested service(s) |
| USBD | USBD for requested service(s) |
| MPD | DASH MPD for requested service(s) |
| NIT | Network Information Table |
| BAT | Bouquet Association Table |
| SDT | Service Description Table |
| AIT | Application Information Table |
| DWD | Distribution Window Description |
| ----- | All other values DVB Reserved. |

FIG. 18

```
<xs:complexType name="metadataEnvelopeType">
    <xs:sequence>
        <xs:element name="item" type="metadataEnvelopeItemType" maxOccurs="unbounded"/>
    </xs:sequence>
</xs:complexType>

<xs:complexType name="metadataEnvelopeItemType">
    <xs:sequence>
            <xs:element name="metadataFragment" type="xs:string" minOccurs="0"/>
            <xs:any namespace="##other" processContents="lax" minOccurs="0" maxOccurs="unbounded"/>
    </xs:sequence>
    <xs:attribute name="metadataURI" type="xs:anyURI" use="required"/>
    <xs:attribute name="version" type="xs:positiveInteger" use="required"/>
    <xs:attribute name="validFrom" type="xs:dateTime" use="optional"/>
    <xs:attribute name="validUntil" type="xs:dateTime" use="optional"/>
    <xs:attribute name="contentType" type="xs:string" use="optional"/>
    <xs:attribute name="nextUrlAvailableTime" type="xs:dateTime" use="optional"/>
    <xs:attribute name="nextUrl" type="xs:anyURI" use="optional"/>
    <xs:anyAttribute processContents="skip"/>
</xs:complexType>
```

FIG. 21

| Element or Attribute Name | Use | Data Type | Format |
|---|---|---|---|
| UserServiceBundleDescription | | | Root element of the User Service Bundle Description for DVB-I |
| UserServiceDescription | 1 | | A single instance of a DVB-I Service. |
| @serviceId | 1 | unsignedShort | Reference to corresponding service entry in the SDLT. |
| @globalServiceId | 0..1 | anyURI | Globally unique service identifier. Reference to corresponding service entry in the ESG (Electronic Service Guide) information. |
| @serviceCategory | 1 | unsignedByte | The category of this service. It can be linear TV, linear Radio, on-demand, or application service. More detail is listed in the table below. |
| @hidden | 0..1 | boolean | Indicates whether this service is hidden in the service list or shown to users. The default value is 'FALSE' |
| @appRendering | 0..1 | boolean | Indicates whether any application will be executed first and render this service. The default value is 'FALSE'. |
| @MediaPresentationDescription | 0..1 | anyURI | URL pointing to MPD signaling description |
| @ApplicationInformationTable | 0..1 | anyURI | URL pointing to AIT signaling description |
| @DistributionWindowDescription | 0..1 | anyURI | URL pointing to DWD signaling description |
| RunningStatus | 0..1 | unsignedByte | Specify the status of this service as running, not running or starts in a few seconds, etc.. |
| @duration | 0..1 | unsignedInt | When the RunningStatus is not running (for example, not running or pausing), the pausing time duration in seconds. |
| @resumeTime | 0..1 | dateTime | When the RunningStatus is not running (for example, not running or pausing), the resumed date and time. |
| Name | 0..N | string | Name of the DVB-I service. |
| @lang | 1 | lang | Language of the DVB-I service name. |
| ServiceLanguage | 0..N | lang | Available languages of the DVB-I service |
| Icon | 0..N | anyURI | URL pointing to icon (image). Multiple URLs could be used to point to icons (images) of different width and height or different representation formats. |
| @mimeType | 0..1 | string | The optional MIME type of the icon allowing receivers to preemptively ignore fetching image types they are not capable of using. |
| @width | 0..1 | unsignedInt | Width of the referenced image in pixels. |
| @height | 0..1 | unsignedInt | Height of the referenced image in pixels. |
| @dataSize | 0..1 | unsignedInt | Size of the image data in bytes. |
| @displayDuration | 0..1 | unsignedInt | The icon(image) display time duration in seconds. |
| DeliveryMethod | 0..N | | Container of transport-related information pertaining to the contents of the service over broadcast and (optionally) broadband modes of access. |
| BroadcastAppService | 0..N | | A DASH Representation delivered over broadcast containing the corresponding media component(s) belonging to the DVB-I Service. |
| BasePattern | 1..N | string | A character pattern for use by the DVB-I receiver to match against any portion of the Segment URL used by the DASH Client to request DASH Media Segments of a parent DASH Representation. |
| UnicastAppService | 0..N | | A DASH Representation delivered over broadband containing the constituent media content component(s) belonging to the DVB-I Service. |
| BasePattern | 1..N | string | A character pattern for use by the DVB-I receiver to match against any portion of the Segment URL used by the DASH Client to request DASH Media Segments of a parent DASH Representation. |

FIG. 22

| RunningStatus | Meaning |
|---|---|
| 0 | Not used |
| 1 | Running |
| 2 | Not Running |
| 3 | Pausing |
| 4 | Starts in a few seconds |
| 5 | Service off-air |
| 6-255 | Reserved for the future use |

FIG. 26

| Element or Attribute Name | Use | Data Type | Format |
|---|---|---|---|
| ServiceDiscoveryListTable | 1 | | Root element |
| SdfuneList | 0..N | anyURI | URL to access signaling/ESG objects. |
| @urlType | 1 | unsignedByte | Type of files available with this URL. |
| Service | 1..N | | Service information |
| @serviceId | 1 | unsignedShort | Number that uniquely identifies this service within the scope of the originalNetworkId |
| @globalServiceId | 0..1 | uri | Globally unique service identifier. It is mapped with the global service id in the ESG. For the traditional DVB-C/S/T service, this attribute is not present. |
| @originalNetworkId | 1 | unsignedShort | Number that uniquely identifies the original network which this service was originally generated. |
| @transportStreamId | 0..1 | unsignedShort | Number that uniquely identifies the transport stream. This attribute should be present in the traditional DVB-C/S/T service, but it may not be present for the DVB-I service with ISO BMFF format. |
| @frequencyNum | 0..1 | unsignedShort | Number that uniquely identifies the frequency number of physical layer. This attribute shall be present when the service is traditional terrestrial service. |
| @serviceCategory | 1 | unsignedByte | The category of this service. It can be linear, on-demand, or application service. More detail is listed in the table below. |
| @svcSeqNum | 1 | unsignedByte | Version of service information in this table – increments by one for each new version of service data in RFD; wraps around to 0. |
| @contentFormat | 0..1 | unsignedByte | The format of contents of this service (See Table 8.4). |
| @hidden | 0..1 | boolean | Indicates whether this service is hidden in the service list or shown to users. The default value is 'FALSE'. |
| @appRendering | 0..1 | boolean | Indicates whether any application will be executed first and render this service. The default value is 'FALSE'. |
| @MediaPresentationDescription | 0..1 | anyURI | URL pointing to MPD signaling description |
| @ApplicationInformationTable | 0..1 | anyURI | URL pointing to AIT signaling description |
| @DistributionWindowDescription | 0..1 | anyURI | URL pointing to DWD signaling description |
| RunningStatus | 0..1 | unsignedByte | Specify the status of this service as running, not running or starts in a few seconds, etc.. |
| @duration | 0..1 | unsignedInt | When the RunningStatus is not running (for example, not running or pausing), the pausing time duration in seconds. |
| @resumeTime | 0..1 | dateTime | When the RunningStatus is not running (for example, not running or pausing), the resumed date and time. |
| Name | 0..N | string | Name of the DVB-I service. |
| @lang | 1 | lang | Language of the DVB-I service name. |
| ServiceLanguage | 0..N | lang | Available languages of the DVB-I service. |
| Icon | 0..N | anyURI | URL pointing to icon (image). Multiple URLs could be used to point to icons (images) of different width and height or different representation formats. |
| @mimeType | 0..1 | string | The optional MIME type of the icon allowing receivers to preemptively ignore fetching image types they are not capable of using. |
| @width | 0..1 | unsignedInt | Width of the referenced image in pixels. |
| @height | 0..1 | unsignedInt | Height of the referenced image in pixels. |
| @dataSize | 0..1 | unsignedInt | Size of the image data in bytes. |
| @displayDuration | 0..1 | unsignedInt | The icon(image) display time duration in seconds. |
| svcfuneList | 0..N | anyURI | URL to access signaling/ESG objects for this service. |
| @urlType | 1 | unsignedByte | Type of files available with this URL. |

FIG. 27

| Element or Attribute Name | Use | Data Type | Description |
|---|---|---|---|
| UserServiceBundleDescription | | | Root element of the User Service Bundle Description for DVB-I |
| UserServiceDescription | 1 | | A single instance of a DVB-I Service. |
| @serviceId | 1 | unsignedShort | Reference to corresponding service entry in the SDLT. |
| @globalServiceId | 0..1 | anyURI | Globally unique service identifier. Reference to corresponding service entry in the ESG (Electronic Service Guide) information. |
| DeliveryMethod | 0..N | | Container of transport-related information pertaining to the contents of the service over broadcast and (optionally) broadband modes of access. |
| BroadcastAppService | 0..N | | A DASH Representation delivered over broadcast containing the corresponding media component(s) belonging to the DVB-I Service. |
| BasePattern | 1..N | string | A character pattern for use by the DVB-I receiver to match against any portion of the Segment URL used by the DASH Client to request DASH Media Segments of a parent DASH Representation. |
| UnicastAppService | 0..N | | A DASH Representation delivered over broadband containing the constituent media content component(s) belonging to the DVB-I Service. |
| BasePattern | 1..N | string | A character pattern for use by the DVB-I receiver to match against any portion of the Segment URL used by the DASH Client to request DASH Media Segments of a parent DASH Representation. |

FIG. 30

| Element or Attribute Name | Use | Data Type | Format |
|---|---|---|---|
| LocationInfo | 0..N | LocationInfoType | An element that may indicate various types of location information |
| Region | 0..N | RegionType | Indicates country name and city name to provide location information about a region |
| @isoCountryCode | 1 | string | This is an alphabet character value in 2 bytes representing the country name and must have a value defined in ISO 3166-1 |
| City | 0..N | string | Indicates the name of a city registered in the country. If the value of this element is not present, the entire country is indicated. |
| @lang | 1 | lang | Indicates the language in which the city name is displayed |
| Circle | 0..N | | Location information represented by circle |
| @lat | 1 | string | Represents a character string indicating a latitude from -90 (South) to 90 (North). It can be indicated in decimal degrees. |
| @lng | 1 | string | Represents a character string indicating a longitude from Greenwich Meridian, -180 (West) to 180 (East). It can be indicated in decimal degrees. |
| @radius | 1 | unsignedInt | Indicates the radius of a circle in meters |
| Square | 0..N | | Location information represented by a rectangle |
| @swLat | 1 | string | Southwest latitude |
| @swLng | 1 | string | Southwest longitude |
| @neLat | 1 | string | Northeast latitude |
| @neLng | 1 | string | Northeast longitude |
| PolyGone | 0..N | listOfString | Location information represented by a polygon. It is composed of a (latitude, longitude) string list as many as the value of @numOfPoints. Each position represents the vertex of the polygon. |
| @numOfPoints | 1 | unsignedByte | Number of vertices of polygon |
| IPaddressScope | 0..N | | Indicates the scope of region information allocated as an IP address value. |
| @version | 1 | unsignedByte | Version of IP address value. 4 or 6. |
| @startIpAddr | 1 | string | An IP address value that matches the version. This value represents the IP address value of the start of the scope. |
| @endIpAddr | 1 | string | An IP address value that matches the version. This value represents the IP address value of the end of the scope. |

FIG. 31

| Element or Attribute Name | Use | Data Type | Format |
|---|---|---|---|
| ServiceDiscoveryListTable | 1 | | Root element |
| ... (ellipsis) | | | |
| LocationInfo | 0..N | LocationInfoType | An element value that may indicate various types of location information. It indicates location information corresponding to all services included in SDLT. |
| Service | | | |
| @serviceId | 1 | unsignedShort | Number that uniquely identifies this service |
| ... (ellipsis) | | | |
| LocationInfo | 0..N | LocationInfoType | An element value that may indicate various types of location information. It indicates location information related to this service |
| ... (ellipsis) | | | |

FIG. 36

```
<xs:complexType name="metadataEnvelopeType">
   <xs:sequence>
      <xs:element name="item" type="metadataEnvelopeItemType" maxOccurs="unbounded"/>
   </xs:sequence>
</xs:complexType>
<xs:complexType name="metadataEnvelopeItemType">
   <xs:sequence>
         <xs:element name="metadataFragment" type="xs:string" minOccurs="0"/>
         <xs:any namespace="##other" processContents="lax" minOccurs="0" maxOccurs="unbounded"/>
   </xs:sequence>
   <xs:attribute name="metadataURI" type="xs:anyURI" use="required"/>
   <xs:attribute name="version" type="xs:positiveInteger" use="required"/>
   <xs:attribute name="validFrom" type="xs:dateTime" use="optional"/>
   <xs:attribute name="validUntil" type="xs:dateTime" use="optional"/>
   <xs:attribute name="contentType" type="xs:string" use="optional"/>
   <xs:attribute name="nextUrlAvailableTime" type="xs:dateTime" use="optional"/>
   <xs:attribute name="nextUrl" type="xs:anyURI" use="optional"/>
   <xs:anyAttribute processContents="skip"/>
</xs:complexType>
```

FIG. 37 multipart / related container

--DVB_DITS_servicediscovery_fragment_boundary
Content-Location : 1041_9_envelope.xml
Content-ID : <DVB_DITS_servicediscovery_metadata_envelope>
Content-Type : application / DITS-servicediscovery_metadataenvelope + xml ; charset = UTF-8

Service list metadata envelop

<?xml version="1.0" encoding="UTF-8" standalone="no"?>
<metadataEnvelope><item metadataURI = "1041_9_SDIT.xml" version="3" contentType="application/DITS-1-2-3+xml"/>
<item metadataURI="1041_9_SDIT.xml" version="171" contentType="application/DITS-4-5-6+xml"/>
<item metadataURI="1041_9_SDIT.xml" version="63" contentType="application/DITS-3-6-9+xml"/>
<item metadataURI="1041_9_SDIT.xml" version="7" contentType="application/DITS-10-20-30+xml"/></metadataEnvelope>

FIG. 38

| Element or Attribute Name | Use | Data Type | Format |
|---|---|---|---|
| ServiceDiscoveryListTable | 1 | | Root element |
| SdtBaseUrl | 0..N | anyURI | URL to access signaling/ESG objects |
| @fileType | 1 | unsignedByte | Type of files available with this URL |
| Service | 1..N | | Service information |
| @serviceId | 1 | unsignedShort | Number that uniquely identifies this service within the scope of the originalNetworkId |
| @globalServiceId | 0..1 | uri | Globally unique service identifier. It is mapped with the global service id in the ESG. For the traditional DVB-C/S/T service, this attribute is not present. |
| @originalNetworkId | 1 | unsignedShort | Number that uniquely identifies the original network which this service was originally generated. |
| @transportStreamId | 0..1 | unsignedShort | Number that uniquely identifies the transport stream. This attribute should be present in the traditional DVB-C/S/T service, but it may not be present for the DVB-I service with ISO BMFF format |
| @frequencyNum | 0..1 | unsignedShort | Number that uniquely identifies the frequency number of physical layer. This attribute shall be present when the service is traditional terrestrial service. |
| @serviceCategory | 1 | unsignedByte | The category of the service. It can be linear, on-demand, or application service. More detail is listed in the table below. |
| @svcSeqNum | 1 | unsignedByte | Version of service information in this table – increments by one for each new version of service data in RFD; wraps around to 0. |
| @contentFormat | 0..1 | unsignedByte | The format of contents of this service(See Table 8.4). |
| @hidden | 0..1 | boolean | Indicates whether this service is hidden in the service list or shown to users. The default value is 'FALSE'. |
| @selectable | 0..1 | boolean | |
| @hidden(visible)_guide | 1 | unsignedByte | |
| @hidden(visible)_presentation | 0..1 | anyURI | |
| @appRendering | 0..1 | boolean | Indicates whether any application will be executed first and render this service. The default value is 'FALSE' |
| @MediaPresentationDescription | 0..1 | anyURI | URL pointing to MPD signaling description |
| @ApplicationInformationTable | 0..1 | anyURI | URL pointing to AIT signaling description |
| @DistributionWindowDescription | 0..1 | anyURI | URL pointing to DWD signaling description |
| RunningStatus | 0..1 | unsignedByte | Specify the status of this service as running, not running or starts in a few seconds, etc. |
| @duration | 0..1 | unsignedInt | When the RunningStatus is not running (for example, not running or pausing), the pausing time duration in seconds |
| @resumeTime | 0..1 | dateTime | When the RunningStatus is not running (for example, not running or pausing), the resumed date and time |
| Name | 0..N | string | Name of the service. |
| @lang | 1 | lang | Language of the service name. |
| ServiceLanguage | 0..N | lang | Available languages of the service. |
| Icon | 0..N | anyURI | URL pointing to icon (image). Multiple URLs could be used to point to icons (images) of different width and height or different representation formats. |
| @mimeType | 0..1 | string | The optional MIME type of the icon allowing receivers to preemptively ignore fetching image types they are not capable of using. |
| @width | 0..1 | unsignedInt | Width of the referenced image in pixels. |
| @height | 0..1 | unsignedInt | Height of the referenced image in pixels. |
| @dataSize | 0..1 | unsignedInt | Size of the image data in bytes. |
| @displayDuration | 0..1 | unsignedInt | The icon(image) display time duration in seconds. |
| svcInstUrl | 0..N | anyURI | URL to access signaling/ESG objects for this service. |
| @fileType | 1 | unsignedByte | Type of files available with this URL |

FIG. 39

|  | Hidden (=0) | Hidden (=1) |
|---|---|---|
| hide_guide (=0) | - When Hidden=0, the hide_guide flag is ignored.<br>- Logical channel visible<br>- Visible even in EPG/ESG | - Logical channel is skipped during channel surfing.<br>- It is indicated as if it is not defined even when the direct channel entry is accessed.<br>- Logical channel information may be indicated in the EPG according to the value of hide_guide (=0). |
| hide_guide (=1) | - When Hidden=0, the hide_guide flag is ignored.<br>- Logical channel visible<br>- Visible even in EPG/ESG | - Logical channel is skipped during channel surfing.<br>- It is indicated as if it is not defined even when the direct channel entry is accessed.<br>- Logical channel information may be indicated in the EPG according to the value of hide_guide (=0).<br>- (new) However, access is allowed in app service. |

FIG. 40

| Type | Values | hidden(visible)_presentation |
|---|---|---|
| 0x0000 | Rendering by device | |
| 0x0001 | Alternative link of Service provider | www.bbc.co.kr/alternative/music |
| 0x0002 | Linked service(alternative channel) | DVB triplet : /DITS-(OriginalNetworkID)-(TransportStreamID)-(serviceID)<br><br>Ex) Application/DITS-11-20-06 |
| 0x0003 | Stereoscopic channel guide | DVB triplet : /DITS-(OriginalNetworkID)-(TransportStreamID)-(serviceID)<br><br>Ex) Application/DITS-11-20-06 |
| 0x0004 | ESG, BCG(Broadband Content Guide) link | loginformDB.html |
| 0x0005 | Alternative app service | dedicated channel for app<br>e.g.) Access to app using AIT |

```
<RelatedMaterial xsi:type="tva2:ExtendedRelatedMaterialType">
    <!-- 19: Promotional still image -->
    <HowRelated href="urn:tva:metadata:cs:HowRelatedCS:2012:19"/>
    <MediaLocator>
        <MediaUri contentType="image/png">
            http://img-ctv.digitaluk.co.uk/channel7/service_a_linear.png
        </MediaUri>
    </MediaLocator>
    <!-- Alt text -->
    <PromotionalText>Service A</PromotionalText>
</RelatedMaterial>
<RelatedMaterial>
    <HowRelated href="urn:tva:metadata:cs:HowRelatedCS:2012:10.5"/>
    <MediaLocator>
        <MediaUri contentType="application/vnd.dvb.ait+xml">
            http://www.channel9.co.uk/player/aitaits?channel=channela
        </MediaUri>
    </MediaLocator>
</RelatedMaterial>
```

FIG. 46

```
<element name="ServiceList" type="dvbisd:DVBiServiceListType"/>
<complexType name="DVBiServiceListType">
  <sequence>
    <element name="Name" type="mpeg7:TextualType" maxOccurs="unbounded"/>
    <element name="ProviderName" type=" mpeg7:TextualType " maxOccurs="unbounded"/>
    <element name="RelatedMaterial" type="tva:RelatedMaterialType" minOccurs="0" maxOccurs="unbounded"/>
    <element name="RegionList" type="dvbisd:RegionListType" minOccurs="0"/>
    <element name="TargetRegion" type="dvbisd:RegionIdRefType" minOccurs="0" maxOccurs="unbounded"/>
    <element name="LCNTableList" type="dvbisd:LCNTableListType" minOccurs="0"/>
    <element name="Service" type="dvbisd:DVBiServiceType" minOccurs="0" maxOccurs="unbounded"/>
    <any namespace="##other" processContents="lax" minOccurs="0" maxOccurs="unbounded"/>
  </sequence>
  <attribute name="version" type="positiveInteger" use="required"/>
</complexType>
```

FIG. 47

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory 1 .. ∞ |
| ProviderName | The name of the provider of this service list in a human readable form. Multiple values for the provider name can be specified as long as they have different xml:lang values. | Mandatory 1 .. ∞ |
| RelatedMaterial | Additional material related to the service. Use to signal the following<br>• Service list logos, see clause 5.2.5.1 | Optional 0 .. ∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional 0 .. ∞ |
| LCNTableList | The list of tables that define regionalized and packaged logical channel numbers for the services in this service list. | Optional |
| Service | The services that are part of this service list. | Optional 0 .. ∞ |
| @version | The version number of the service list. Must be incremented for every published change. | Mandatory |

FIG. 48

```
<complexType name="DVBiServiceType">
  <sequence>
    <element name="UniqueIdentifier" type="dvbisd:ServiceIdentifierType"/>
    <element name="ServiceInstance" type="dvbisd:ServiceInstanceType" minOccurs="0" maxOccurs="unbounded"/>
    <element name="TargetRegion" type="dvbisd:RegionIdRefType" minOccurs="0" maxOccurs="unbounded"/>
    <element name="ServiceName" type="mpeg7:TextualType" maxOccurs="unbounded"/>
    <element name="ProviderName" type="mpeg7:TextualType" maxOccurs="unbounded"/>
    <element name="RelatedMaterial" type="tva:RelatedMaterialType" minOccurs="0" maxOccurs="unbounded"/>
    <element name="ServiceGenre" type="dvbisd-base:Genre" minOccurs="0"/>
    <element name="ServiceType" type="dvbisd-base:ServiceType" minOccurs="0"/>
    <element name="RecordingInfo" type="tva:ControlledTermType" minOccurs="0"/>
    <element name="GuideSource" type="dvbisd-base:BCGOffering" minOccurs="0"/>
  </sequence>
  <attribute name="version" type="positiveInteger" use="required"/>
</complexType>
```

FIG. 49

| Name | Semantic Definition | Constraints |
|---|---|---|
| UniqueIdentifier | The unique ID of the service. This ID should never be changed for a service, even if all other parameters of the service are changed. Refer to clause 5.2.2 for the suitable formats of the service identifier. | Mandatory |
| ServiceInstance | The instances(s) where the A/V content for the service may be found. If multiple elements of this type are present and available (refer to clause 5.2.4), the one with the lowest value of the @priority attribute has the highest priority. All ServiceInstances for a given Service carry the same editorial content. | Optional 0 .. ∞ |
| TargetRegion | The name of the service. Multiple service names can be specified as long as they have different xml:lang values. | Optional 0 .. ∞ |
| ServiceName | The unique ID of the service. This ID should never be changed for a service, even if all other parameters of the service are changed. Refer to clause 5.2.2 for the suitable formats of the service identifier. | Mandatory 1 .. ∞ |
| ProviderName | The name of the provider of this service in a human readable form. This element should include an xml:lang attribute to identify the language being used. | Mandatory 1 .. ∞ |
| RelatedMaterial | Additional material related to the service. Use to signal the following<br>• Out of service banners, see clause 5 .2.4.3<br>• Service related applications, see clause 5 .2.3<br>• Service logos, see clause 5 .2.5.2 | Optional 0 .. ∞ |
| ServiceGenre | The genre of the service. | Optional 0 .. 1 |
| ServiceType | The service type, as defined in ETSI EN 300 468 [6]. | Optional 0 .. 1 |
| RecordingInfo | In some territories this signalling may help a DVB-I client determine whether or not the content from this service may be recorded, time-shifted and/or redistributed. How clients make use of this signalling is not defined by the present document. The value for this element should be taken from the RecordingInfoCS defined in cause 8.3.3. | Optional 0 .. 1 |
| GuideSource | The details of a broadband content guide carrying metadata for this service. The service type, as defined in ETSI EN 300 468 [6]. | Optional 0 .. 1 |
| @version | The version number of the service. Must be incremented for every published change. | Mandatory |

FIG. 50

```
<complexType name="ServiceInstanceType">
 <sequence>
  <element name="DisplayName" type="mpeg7:TextualType" minOccurs="0" maxOccurs="unbounded"/>
  <element name="RelatedMaterial" type="tva:RelatedMaterialType" minOccurs="0" maxOccurs="unbounded"/>
  <element name="DRMSystemId" type="string" minOccurs="0" maxOccurs="unbounded"/>
  <element name="ContentAttributes" type="dvbisd-base:ContentAttributesType" minOccurs="0"/>
  <element name="Availability" type="dvbisd-base:ServiceAvailabilityType" minOccurs="0"/>
  <element name="SubscriptionPackage" type="string" minOccurs="0" maxOccurs="unbounded"/>
  <element name="FTAContentManagement" type="dvbisd:FTAContentManagementType" minOccurs="0"/>
  <element name="SourceType" type="anyURI"/>
  <choice minOccurs="0" maxOccurs="unbounded">
     <element name="DVBTDeliveryParameters" type="dvbisd:DVBTDeliveryParametersType"/>
     <sequence>
       <element name="DVBSDeliveryParameters" type="dvbisd:DVBSDeliveryParametersType"/>
       <element name="SATIPDeliveryParameters" type="dvbisd:SATIPDeliveryParametersType" minOccurs="0"/>
     </sequence>
     <element name="DVBCDeliveryParameters" type="dvbisd:DVBCDeliveryParametersType"/>
     <element name="RTSPDeliveryParameters" type="dvbisd:RTSPDeliveryParametersType"/>
     <element name="MulticastTSDeliveryParameters" type="dvbisd:MulticastTSDeliveryParametersType"/>
     <sequence>
       <element name="DASHDeliveryParameters" type="dvbisd:DASHDeliveryParametersType"/>
       <element name="MulticastTSDeliveryParameters" type="dvbisd:MulticastTSDeliveryParametersType"
          minOccurs="0"/>/>
     </sequence>
     <any namespace="##other" processContents="lax"/>
  </choice>
 <sequence>
 <attribute name="priority" type="integer" default="0"/>
</complexType>
```

FIG. 51

| Name | Semantic Definition | Constraints |
|---|---|---|
| DisplayName | Human-readable name of the service associated in this specific Service Location. Multiple service names may be provided as long as they all have different xml:lang attributes. When not present, ServiceName is used. | Optional 0..∞ |
| RelatedMaterial | Additional material related to the service. Use to signal the following<br>• Out of service banners, see clause 5.2.4.3<br>• Service related applications, see clause 5.2.3<br>• Service logos, see clause 5.2.3.2<br>Any related material with a particular value of HowRelated that is provided within a ServiceInstance element supersedes any corresponding related material with that value of HowRelated that is provided within a Service element. | Optional 0..∞ |
| DRMSystemId | Denotes any content protection scheme being used for this service. The value shall be the same as the @schemeIdURI defined in clause 8.4 of DVB A168 [10] | Optional 0..∞ |
| ContentAttributes | Refer to Annex D.1.3.2 of ETSI TS 103 205 [2] for semantic definition.a | Optional 0..1 |
| Availability | Indicates the period(s) in time when this service location is expected to be active. | Optional 0..1 |
| SubscriptionPackage | Identifies the subscription packages in which this service is included. | Optional 0..∞ |
| FTAContentManagement | DVB-I service instances not using DRM may carry a FTAContentManagement element to define the content management policy for the ServiceInstance. The semantics of each attribute are those defined for the correspondingly named fields of the FTA_content_management_descriptor defined in clause 6.2.18.0 of ETSI EN 300 468 [6]. | Optional 0..1 |
| SourceType | Identifies the primary delivery source for this service instance and thus determines the required delivery parameters according to Table 13. | Optional 0..1 |
| DVBTDeliveryParameters | Delivery parameters for DVB-T services. | |
| DVBSDeliveryParameters | Delivery parameters for DVB-S services. | |
| DVBCDeliveryParameters | Delivery parameters for DVB-C services. | To be specified in accordance with SourceType as described in Table 13 |
| RTSPDeliveryParameters | Delivery parameters for RTSP services. | |
| MulticastTSDeliveryParameters | Delivery parameters for services delivered using multicast UDP. | |
| DASHDeliveryParameters | Delivery parameters for services using DVB DASH [10] delivery. | |
| SATIPDeliveryParameters | Provides parameters that a DVB-I client supporting SAT>IP as a "thin client" can use to receive the service instance from a SAT>IP server | |
| @priority | The priority of this service instance relative to the other services instances of the service. | Optional |

FIG. 52

[DASHDeliveryParameters]
<complexType name="DASHDeliveryParametersType">
  <sequence>
    <element name="UriBasedLocation" type="dvbisd-base:dvbExtendedURIType" maxOccurs="unbounded"/>
    <element name="MinimumBitRate" type="unsignedInt" minOccurs="0"/>
  </sequence>
</complexType>

| Name | Semantic Definition | Constraints |
| --- | --- | --- |
| UriBased Location | Refer to Annex D.1.3.2 of ETSI TS 103 205 [2] for semantic definition. | Mandatory 1 .. ∞ |
| Minimum BitRate | Threshold bit-rate under which an alternative source for the same service should be preferred, if available. | Optional |

FIG. 53

```
<complexType name="DASHDeliveryParametersType">
    <sequence>
        <element name="UriBasedLocation" type="dvbisd-base:dvbExtendedURIType" maxOccurs="unbounded"/>
        <element name="MinimumBitRate" type="unsignedInt" minOccurs="0"/>
        <element name="ComparisonBitRate" type="unsignedInt" minOccurs="0"/>
        <element name=" ComparisonContentAttributeType " type="dvbisd-base:ContentAttributesType" minOccurs="0"/>
    </sequence>
</complexType>

<complexType name=" ComparisonContentAttributeType ">
    <sequence>
        <element name="AudioAttributes" type="tva:AudioAttributesType" minOccurs="0" maxOccurs="unbounded"/>
        <element name="VideoAttributes " type="tva:VudioAttributesType" minOccurs="0" maxOccurs="unbounded"/>
        <element name="CaptionLanguage" type="tva:CaptionLanguageType" minOccurs="0" maxOccurs="unbounded"/>
        <element name="SignLanguage" type="tva:SignLanguageType" minOccurs="0" maxOccurs="unbounded"/>
    </sequence>
</complexType>
```

FIG. 54

```
<complexType name="DASHDeliveryParametersType">
  <sequence>
    <element name="UriBasedLocation" type="dvbisd-base:dvbExtendedURIType" maxOccurs="unbounded"/>
    <element name="MinimumBitRate" type="unsignedInt" minOccurs="0"/>
    <element name="ComparisonContentAttributeType" type="dvbisd-base:ContentAttributesType" minOccurs="0"/>
  </sequence>
</complexType>

<complexType name="ComparisonContentAttributeType">
  <sequence>
    <element name="AudioAttributes" type="tva:AudioAttributesType" minOccurs="0" maxOccurs="unbounded"/>
    <element name="VideoAttributes" type="tva:VideoAttributesType" minOccurs="0" maxOccurs="unbounded"/>
    <element name="CaptionLanguage" type="tva:CaptionLanguageType" minOccurs="0" maxOccurs="unbounded"/>
    <element name="SignLanguage" type="tva:SignLanguageType" minOccurs="0" maxOccurs="unbounded"/>
    <element name="ComparisonBitRate" type="unsignedInt" minOccurs="0"/>
  </sequence>
</complexType>
```

FIG. 55

```
<ServiceInstance priority="0">
  <DisplayName> ABC drama </DisplayName>
  <ContentAttributes>
  <dvbisd-base:AudioAttributes>
    <AvaCoding href="urn:mpeg:mpeg7:cs:AudioCodingFormatCS:2001:3.2">
      <AvaName>MPEG-1 Audio Layer II</AvaName>
    </AvaCoding>
  </dvbisd-base:AudioAttributes>
  <dvbisd-base:AudioAttributes>
    <AvaCoding href="urn:dvb:metadata:cs:AudioCodecCS:2007:3.3">
      <AvaName>AC3</AvaName>
    </AvaCoding>
  </dvbisd-base:AudioAttributes>
  <dvbisd-base:VideoAttributes>
    <AvaCoding href="urn:mpeg:mpeg7:cs:VideoCodingFormatCS:2001:2.2.2">
      <AvaName>MPEG-2 Video Main Profile @ Main Level</AvaName>
    </AvaCoding>
  </dvbisd-base:VideoAttributes>
  </ContentAttributes>
  <SourceType>urn:dvb:source:dvb-s</SourceType>
  <DVBSDeliveryParameters>
    <DVBTriplet origNetId="1" tsId="1101" serviceId="28106"/>
    <OrbitalPosition> 19.2 </OrbitalPosition>                                    ~ S5400
    <Frequency> 11836.00 </Frequency>
    <Polarization>horizontal</Polarization>
  </DVBSDeliveryParameters>
</ServiceInstance>

<ServiceInstance priority="1">
  <DisplayName> ABC drama </DisplayName>
  <SourceType>urn:dvb:source:dvb-dash</SourceType>
  <DASHDeliveryParameters>
    <UriBasedLocation contentType="application/dash+xml">
      <dvbisd-base:URI>https://live.daszera.de/0001/Das%20Erste.mpd</dvbisd-base:URI>
      <UriBaseLocation>
    </UriBasedLocation>
    <MinimumBitRate> 1M </MinimumBitRate>
    ┌─────────────────────────────────────────────────────────────────┐
    │ <ComparisonBitRate> 7M </ComparisonBitRate>                     │
    │ <ComparisonContentAttribute>                                    │
    │ <dvbisd-base:VideoAttributes>                                   │
    │   <AvaCoding href="urn:mpeg:mpeg7:cs:VideoCodingFormatCS:2001:2.2.2"> │
    │     <AvaName>HEVC Video Main 10 Profile @ Main Level</AvaName> : UHD enable │
    │   </AvaCoding>                                                  │
    │ </dvbisd-base:VideoAttributes>                                  │
    │ </ComparisonContentAttribute>                                   │
    └─────────────────────────────────────────────────────────────────┘
  </DASHDeliveryParameters>                                            ~ S5410
</ServiceInstance>
```

FIG. 58

```
<ContentGuideSourceList>
    <ContentGuideSource CGSID="cgs-dvbi-01">
        <Name xml:lang="en">A-Z Content Guide</Name>
        <ProviderName xml:lang="en">A-Z Metadata</ProviderName>
        <RelatedMaterial>
            <HowRelated href="urn:dvb:metadata:cs:HowRelatedCS:2019:1002.1">
            <MediaLocator>
                <MediaUri contentType="image/png">
                https://cgs.az.metadata/static/logo.png
                </MediaUri>
            </MediaLocator>
        </RelatedMaterial>
        <ScheduleInfoEndpoint contentType="application/xml">
            <URI>https://cgs.az.metadata/schedule</URI>
        </ScheduleInfoEndpoint>
        <ProgramInfoEndpoint contentType="application/xml">
            <URI>https://cgs.az.metadata/program</URI>
        </ProgramInfoEndpoint>
        <GroupInfoEndpoint contentType="application/xml">
            <URI>https://cgs.az.metadata/group</URI>
        </GroupInfoEndpoint>
    </ContentGuideSource>
</ContentGuideSourceList>
```

FIG. 61

```
DVB-I service scheme
    <complexType name="ServiceType">
        <sequence>
            <element name="UniqueIdentifier" type="dvbisd:ServiceIdentifierType"/>
            <element name="ServiceInstance" type="dvbisd:ServiceInstanceType" minOccurs="0" maxOccurs="unbounded"/>
            <element name="TargetRegion" type="dvbisd:RegionIdRefType" minOccurs="0" maxOccurs="unbounded"/>
            <element name="ServiceName" type="mpeg7:TextualType" maxOccurs="unbounded"/>
            <element name="ProviderName" type="mpeg7:TextualType" maxOccurs="unbounded"/>
            <element name="RelatedMaterial" type="tva:RelatedMaterialType" minOccurs="0" maxOccurs="unbounded"/>
            <element name="ServiceGenre" type="tva:ServiceGenreType" minOccurs="0"/>
            <element name="ServiceType" type="tva:ControlledTermType" minOccurs="0"/>
            <element name="RecordingInfo" type="tva:ControlledTermType" minOccurs="0"/>
            <choice minOccurs="0">
                <element name="ContentGuideSource" type="dvbisd:ContentGuideSourceType"/>
                <element name="ContentGuideSourceRef" type="dvbisd:ContentGuideProviderRefType"/>
                <element name="PollingInterval" type="dvbisd:PollingIntervalType" minOccurs="0"/>
            </choice>
            <element name="ContentGuideServiceRef" type="dvbisd:ServiceIdentifierType" minOccurs="0"/>
        </sequence>
        <attribute name="version" type="positiveInteger" use="required"/>
    </complexType>
    <complexType name="ServiceInstanceType">
        <sequence>
            <element name="DisplayName" type="mpeg7:TextualType" minOccurs="0" maxOccurs="unbounded"/>
            <element name="RelatedMaterial" type="tva:RelatedMaterialType" minOccurs="0" maxOccurs="unbounded"/>
            <element name="ContentProtection" type="dvbisd:ContentProtectionType" minOccurs="0" maxOccurs="unbounded"/>
            <element name="ContentAttributes" type="dvbisd:ContentAttributesType" minOccurs="0"/>
            <element name="Availability" type="dvbisd:ServiceAvailabilityType" minOccurs="0"/>
            <element name="SubscriptionPackage" type="string" minOccurs="0" maxOccurs="unbounded"/>
            <element name="FTAContentManagement" type="dvbisd:FTAContentManagementType" minOccurs="0"/>
            <element name="SourceType" type="anyURI"/>
            <choice minOccurs="0">
                <sequence>
                    <element name="DVBTDeliveryParameters" type="dvbisd:DVBTDeliveryParametersType"/>
                    <element name="SATIPDeliveryParameters" type="dvbisd:SATIPDeliveryParametersType" minOccurs="0"/>
                </sequence>
                <sequence>
                    <element name="DVBSDeliveryParameters" type="dvbisd:DVBSDeliveryParametersType"/>
                    <element name="SATIPDeliveryParameters" type="dvbisd:SATIPDeliveryParametersType" minOccurs="0"/>
                </sequence>
                <element name="DVBCDeliveryParameters" type="dvbisd:DVBCDeliveryParametersType"/>
                <element name="RTSPDeliveryParameters" type="dvbisd:RTSPDeliveryParametersType" minOccurs="0"/>
                <element name="MulticastTSDeliveryParameters" type="dvbisd:MulticastTSDeliveryParametersType" minOccurs="0"/>
                <sequence>
                    <element name="DASHDeliveryParameters" type="dvbisd:DASHDeliveryParametersType"/>
                    <element name="MulticastTSDeliveryParameters" type="dvbisd:MulticastTSDeliveryParametersType" minOccurs="0"/>
                </sequence>
                <any namespace="##other" processContents="lax"/>
            </choice>
            ...
```

FIG. 62

```
<complexType name="ContentGuideSourceType">
    <sequence>
        <element name="Name" type="mpeg7:TextualType" minOccurs="0" maxOccurs="unbounded"/>
        <element name="RelatedMaterial" type="tva:RelatedMaterialType" minOccurs="0" maxOccurs="unbounded"/>
        <element name="ScheduleInfoEndpoint" type="dvbisd:ExtendedURIType"/>
        <element name="ProgramInfoEndpoint" type="dvbisd:ExtendedURIType" minOccurs="0"/>
        <element name="GroupInfoEndpoint" type="dvbisd:ExtendedURIType" minOccurs="0"/>
        <element name="MoreEpisodesEndpoint" type="dvbisd:ExtendedURIType" minOccurs="0"/>
    </sequence>
    <attribute name="CGSID" type="dvbisd:ContentGuideProviderIdType" use="required"/>
</complexType>
```

```
<complexType name="PollingIntervalType">
    <sequence>
        <element name="PollingInterval" type="dvbisd:Duration"/>
        <element name="DynamicIntervalPeriodOffset" type="dvbisd:Integer"/>
    </sequence>
</complexType>
```

```
....
<complexType name="ContentGuideSourceType">
    <sequence>
        <element name="Name" type="mpeg7:TextualType" minOccurs="0" maxOccurs="unbounded"/>
        <element name="ProviderName" type="mpeg7:TextualType" maxOccurs="unbounded"/>
        <element name="RelatedMaterial" type="tva:RelatedMaterialType" minOccurs="0" maxOccurs="unbounded"/>
        <element name="ScheduleInfoEndpoint" type="dvbisd:ExtendedURIType"/>
        <element name="ProgramInfoEndpoint" type="dvbisd:ExtendedURIType" minOccurs="0"/>
        <element name="GroupInfoEndpoint" type="dvbisd:ExtendedURIType" minOccurs="0"/>
        <element name="MoreEpisodesEndpoint" type="dvbisd:ExtendedURIType" minOccurs="0"/>
        <element name="IndividualPeriodEndpoint" type="dvbisd:ExtendedURIType" minOccurs="0"/>
    </sequence>
    <attribute name="CGSID" type="dvbisd:ContentGuideProviderIdType" use="required"/>
    <attribute name="dynamic" type="boolean" default="false"/>
<attribute name="MinimumMetadataUpdatePeriod" type="duration" use="optional"/>
</complexType>
```

72000

```
<ContentGuideSourceList>
    <ContentGuideSource CGSID="cgs-dvbi-01">
        <Name xml:lang="en">A-Z Content Guide</Name>
        <ProviderName xml:lang="en">A-Z Metadata</ProviderName>
        <RelatedMaterial>
            <HowRelated href="urn:dvb:metadata:cs:HowRelatedCS:2019:1002.1"/>
            <MediaLocator>
                <MediaUri contentType="image/png">
                https://cgs.az.metadata/static/logo.png
                </MediaUri>
            </MediaLocator>
        </RelatedMaterial>
        <ScheduleInfoEndpoint contentType="application/xml">
            <URI>https://cgs.az.metadata/schedule</URI>
        </IndividualPeriodEndpoint>
    </ContentGuideSource>
</ContentGuideSourceList>
```

```
<ContentGuideSourceList>
    <ContentGuideSource CGSID="cgs-dvbi-01">
        <Name xml:lang="en">A-Z Content Guide</Name>
        <ProviderName xml:lang="en">A-Z Metadata</ProviderName>
        <RelatedMaterial>
            <HowRelated href="urn:dvb:metadata:cs:HowRelatedCS:2019:1002.1">
            <MediaLocator>
                <MediaUri contentType="image/png">
                https://cgs.az.metadata/static/logo.png
                </MediaUri>
            </MediaLocator>
        </RelatedMaterial>
        <ScheduleInfoEndpoint contentType="application/xml">
            <URI>https://cgs.az.metadata/schedule </URI>
        </ScheduleInfoEndpoint>
        ...
        <IndividualPeriodEndpoint contentType="application/xml">
            <URI>https://cgs.az.metadata/IndividualPeriod </URI>
        </IndividualPeriodEndpoint>
    </ContentGuideSource>
<ContentGuideSourceList>
```
~ 73000

MEDIA PROCESSING DEVICE AND MEDIA PROCESSING METHOD

CROSS-REFERENCE TO RELATED APPLICATIONS

This application is a National Stage Filing Under 35 U.S.C. 371 of International Application No. PCT/KR2021/002010, filed on Feb. 17, 2021, which claims the benefit of Korean Application No. 10-2020-0027942, filed on Mar. 5, 2020, Korean Application No. 10-2020-0034021, filed on Mar. 19, 2020, Korean Application No. 10-2020-0037143, filed on Mar. 26, 2020, the contents of which are all hereby incorporated by reference herein in their entirety.

TECHNICAL FIELD

The present disclosure relates to a media processing device and a media processing method.

BACKGROUND ART

As analog broadcast signal transmission comes to an end, various technologies for transmitting/receiving digital broadcast signals have been developed. A digital broadcast signal may contain a larger amount of video/audio data than an analog broadcast signal. It may further contain various types of additional data other than the video/audio data.

DISCLOSURE

Technical Problem

A broadcast signal transmission device and a broadcast signal reception device according to embodiments of the present disclosure implement an Internet protocol (IP) based TV service capable of providing the same user experience (UX) as a terrestrial, satellite, and/or cable linear channel.

The broadcast signal transmission device and the broadcast signal reception device according to embodiments of the present disclosure provide a channel guide aggregated with the terrestrial, satellite, and/or cable channel by receiving open Internet-based native code, rather than an application-based linear channel service.

The broadcast signal transmission device and the broadcast signal reception device according to embodiments of the present disclosure provide a seamless service of real time/non-real time media streaming in consideration of high unicast traffic and a situation in which a broadcast service is consumed through media such as an over-the-top (OTT) device, a personal computer (PC), and an internet protocol television (IP TV), which are IP-based devices, rather than through direct reception of a fixed terrestrial service.

Technical Solution

To achieve the object and other advantages and in accordance with the purpose of the disclosure, as embodied and broadly described herein, a media processing device according to embodiments may include a receiver configured to receive a service and receive a service list for the service from a service list server, a processor configured to perform service discovery for the service based on the service list, and a displayer configured to display the service based on the service discovery. According to embodiments, a media processing device may include a memory and a processor connected to the memory, wherein the processor may be configured to transmit a service and transmit a service list for the service from a service list server, wherein the service list may be used to perform service discovery for the service.

Advantageous Effects

Internet-based broadcast service discovery and acquirement may be implemented over a broadband network by a receiver that is not equipped with an existing traditional tuner.

In receiving an aggregated service list, there is no need to receive the entire aggregated service list due to a versioning/expiration management method for each service and selective parsing and storage for each service.

In a hidden/selectable/inactive operation of the Internet linear channel, a better media service may be provided by blocking a logical channel service that fails to provide a broadcast signal and thus causes inconvenience to users, and providing an Internet return channel replacement service.

A device that supports an RF-based DVB tuner enables a service that is accessed through a UI in which the existing linear service and the OTT service are aggregated.

Without a set-top box (STB), a media service that provides the same UX as existing linear channels may be provided through the open Internet.

As the existing DVB network and Internet channels are aggregated, the resolution that may be provided within the same channel may be extended.

Signaling of DVB-I service list location may be enabled by uri_linkage_descriptor according to embodiments. A reception device according to embodiments may efficiently acquire a DVB-I service list. In addition, an end point according to the embodiments may allow the reception device to efficiently acquire a service list.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 shows query terms according to embodiments;

FIG. 9 shows syntax of a service discovery list table (SDLT) according to embodiments;

FIG. 10 shows a service category according to embodiments;

FIG. 11 shows content formats according to embodiments;

FIG. 12 shows types of URLs according to embodiments;

FIG. 13 shows SDLT syntax to which SdltInetUrl is added according to embodiments;

FIG. 14 shows terms that may be used for the query term according to embodiments;

FIG. 15 shows a list of signaling object types according to embodiments;

FIG. 18 shows a metadata envelope type according to embodiments;

FIG. 21 shows an example of a USBD according to embodiments;

FIG. 22 shows RunningStatus according to embodiments;

FIG. 26 shows extended syntax of a service discovery list table according to embodiments;

FIG. 27 shows syntax of a reduced USBD according to embodiments;

FIG. 30 shows syntax of a LocationInfo element indicating location information according to embodiments;

FIG. 31 shows an SDLT including location information according to embodiments;

FIG. 36 specifically shows a metadata envelope according to embodiments;

FIG. 37 shows a DITS service discovery metadata envelop according to embodiments;

FIG. 38 shows an extension of an SDLT according to embodiments;

FIG. 39 shows an example of channel management according to embodiments;

FIG. 40 shows values of hidden (visible)_presentation according to embodiments;

FIG. 42 shows an example of an SDLT including Related Material according to embodiments;

FIG. 43 shows an example of use of the Related Material according to embodiments;

FIG. 46 shows a DVB-I service list type according to embodiments;

FIG. 47 is a table representation of a DVB-I service list type according to embodiments;

FIG. 48 shows a DVB-I service type according to embodiments;

FIG. 49 shows a DVB-I service type according to embodiments;

FIG. 50 shows a DVB-I service type according to embodiments;

FIG. 51 shows a table representation of a service instance type according to embodiments;

FIG. 52 shows an extension of DASH delivery parameters for simulcast according to embodiments and a table representation of the DASH delivery parameters for simulcast according to embodiments;

FIG. 53 shows a DASH delivery parameters type according to embodiments;

FIG. 54 shows a DASH delivery parameters type according to embodiments;

FIG. 55 illustrates signaling of a DVB-I service instance according to embodiments;

FIG. 58 shows a content guide source list according to embodiments;

FIGS. 61 and 62 show syntax for dynamic polling according to embodiments;

FIGS. 65 and 66 show syntax for polling according to embodiments;

FIG. 68 shows a DVB-I service list discovery schema according to embodiments;

FIG. 70 illustrates a method of acquiring the latest content guide information for each DVB-I service according to embodiments;

FIG. 72 shows a DVB-I service scheme according to embodiments;

FIG. 73 shows a DVB-I service scheme according to embodiments;

BEST MODE

Figure 1:
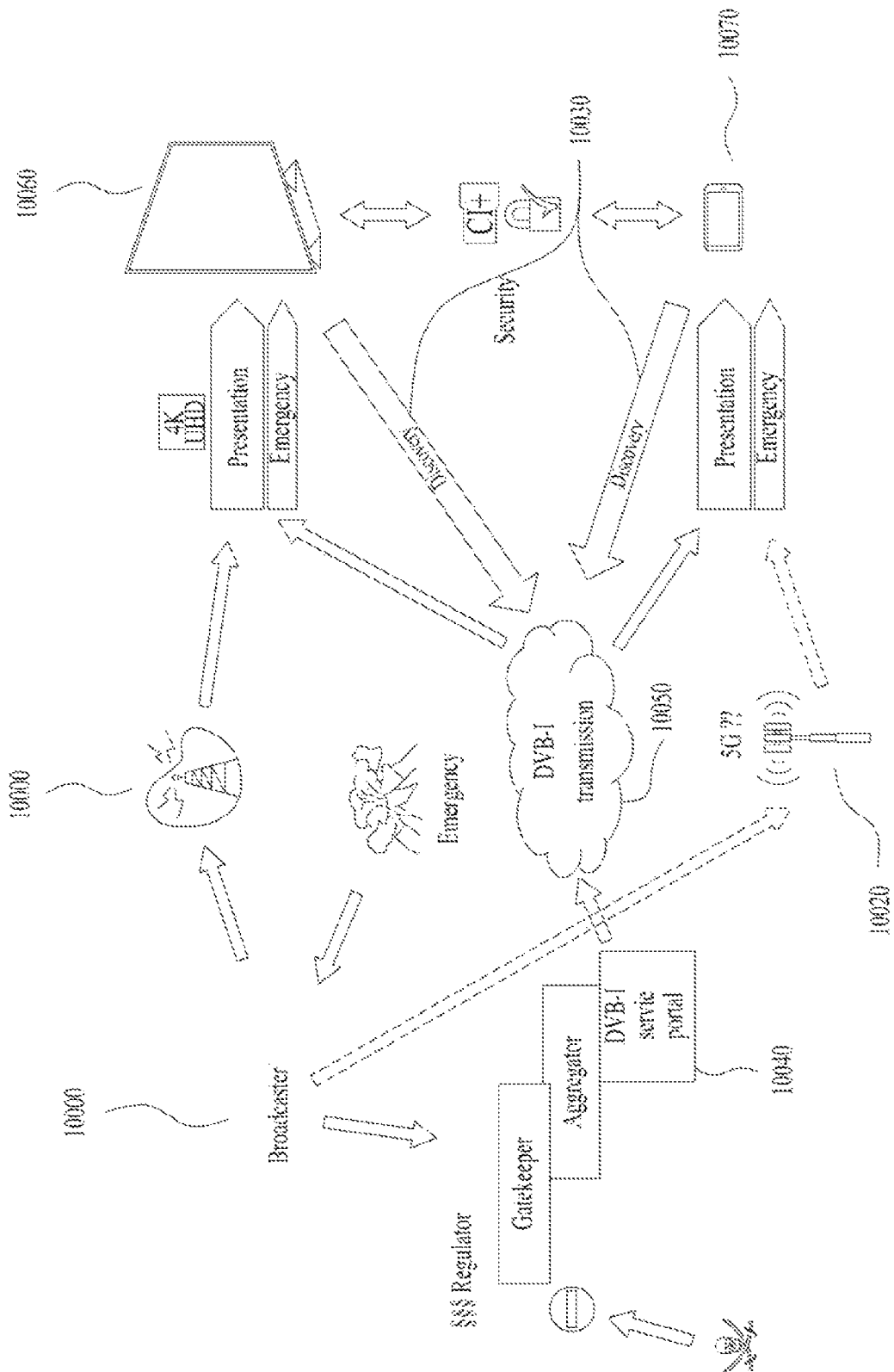
FIG. 1 shows a service scenario according to embodiments.

Hereinafter, embodiments disclosed in this specification will be described in detail with reference to the accompanying drawings. The same or similar components are given the same reference numbers and redundant description thereof is omitted. The suffixes "module" and "unit" of elements herein are used for convenience of description and thus are used interchangeably and do not have any distinguishable meanings or functions. Further, in describing the embodiments disclosed in this specification, if a detailed description of related known techniques would unnecessarily obscure the gist of the embodiments disclosed in this specification, detailed description thereof will be omitted. In addition, the attached drawings are provided for easy understanding of the embodiments disclosed in this specification and do not limit technical idea disclosed in this specification, and the embodiments should be construed as including all modifications, equivalents, and alternatives falling within the spirit and scope of the present disclosure.

It is apparent that the following embodiments are intended to embody the present disclosure and are not intended to limit or restrict the scope of the present disclosure. All techniques easily conceivable by those skilled in the art from the detailed description and embodiments of the present disclosure are interpreted as belonging to the scope of the present disclosure.

The following detailed description is to be construed in all aspects as illustrative and not restrictive. The scope of the present disclosure should be determined by reasonable interpretation of the appended claims and all changes which come within the equivalent scope of the present disclosure are within the scope of the present disclosure.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the accompanying drawings and the detailed description should not be construed as limiting the embodiments set forth herein and should be interpreted as covering all equivalents to the embodiments disclosed in the accompanying drawings and the detailed description or other substitutions.

Operations of methods/devices for transmitting and receiving broadcast signals according to embodiments will be described. The methods/devices for transmitting and receiving broadcast signals may be referred to as a method/device according to embodiments.

FIG. 1 shows a service scenario according to embodiments.

The embodiments described in this specification relate to a method/device for the signaling method to provide discovery and acquirement of Internet-based broadcast services based on the scenario of FIG. 1, and embodiments that provide a signaling scheme for such operation will be described.

Specifically, embodiments provide a method of implementing an IP-based TV service capable of providing the same user UX as terrestrial, satellite, and cable linear channels.

Embodiments provide a method of providing a channel guide aggregated with terrestrial, satellite, and cable channels through reception of an open Internet-based native code, not an application-based linear channel service.

Embodiments provide an aggregated broadcast system protocol based on all of terrestrial wave, satellite, cable, and Internet.

Embodiments provide a method of acquiring Internet broadcast service signaling by a receiver without a terrestrial, satellite, or cable tuner.

Embodiments provide a service discovery system for acquiring a broadcast service based on Internet transmission.

Embodiments provide an Internet-based broadcast service signaling mechanism.

Embodiments provide a service discovery scheme for providing an Internet-based broadcast service.

Embodiments propose additional information that should be defined for Internet-based broadcast service identification.

Embodiments provide a system mechanism for acquiring Internet-based broadcast service signaling.

Embodiments propose a versioning/expiration management method for each service and a selective parsing and storage method for each service in receiving an aggregated service list.

Embodiments propose a channel management method in a hidden/selectable/inactive state of an Internet linear channel.

Embodiments propose a service discovery signaling scheme for providing an Internet-based broadcast service.

Embodiments propose a structure of a service list metadata envelope configured when a service list fragmented for each unique service is transmitted in a multipart/related container.

Embodiments propose a method of displaying a current channel status or providing an alternative channel for a user in a hidden/selectable/inactive case of an Internet linear logical channel when the user directly accesses the current channel.

Embodiments may enable a receiver not equipped with a traditional tuner to perform Internet-based broadcast service discovery and acquirement over a broadband network.

According to embodiments, as a versioning/expiration management method for each service and selective parsing and storage for each service are provided, there is no need to receive an entire aggregated service list in receiving an aggregated service list.

According to embodiments, when the Internet linear channel is in the hidden/selectable/inactive state, a better media service may be provided by blocking a logical channel service that fails to provide a broadcast signal and thus causes inconvenience to users, and providing an Internet return channel replacement service.

The traditional IP-based linear channel service is operated in a manner than authentication is granted through the subscription of a specific provider (e.g., an ISP, a network operator) and an IP linear service is received through the set-top box (STB) provided by the provider. In addition, recently, connectivity TVs have been introduced, thereby making a set-top boxless (STB-less) IP linear service available. Representative standard technologies are ATSC 3.0, IBB, and HbbTV. Clients may be provided with various linear rich-media services by operating an application on the OS platform inside the TV. Various operators provide their own developed service application to be installed on the TV platform, and the application defines a server that may receive data for the service and APIs that enable request/reception. On the basis of the life cycle, the client may access the app through the TV UI and receive various services through the app.

In North America and Europe, the popularity of OTT channels is as high as watching linear TV worldwide, and the OTT has become an essential media application for IP-based devices with the expansion of the OTT market. However, the influential form of OTT has become an exclusive service through its own platform and a service eco-system dedicated to the OTT. In other words, the OTT forms its own app-ecosystem consumption pattern in terms of codec, protocol stack, application, browser, and the like that only each OTT provides.

In this regard, embodiments propose a method and an device that may address issues such as the exclusive platform of OTTs and dependency on the operation of applications.

Embodiments propose a service that discovers a service by which a service is discovered at a receiver native level and a client accesses a accessible service server and receives a linear service, in contrast with conventional technology that requires an App to be executed to provide a channel UX similar to the terrestrial (T), satellite (S), or cable (C) linear channel service.

In addition, embodiments propose a service scenario in which the OTT's own platform is integrated into a single unified TV native platform to allow users to receive and view OTT content on a channel without executing an OTT app.

Referring to FIG. 1, a broadcaster 10000 may transmit a service on a terrestrial (T), satellite (S), or cable (C) channel 10010 and an Internet channel 10020 simultaneously. Service providers and manufacturers of devices capable of receiving a DVB-I service 10050 may obtain authentication of a service channel through regulation and provide Internet channels through existing linear services and channel aggregators.

In order to present a list of existing linear broadcasting channels (for example, terrestrial, satellite, and cable channels) and an Internet channel list in an aggregated form, bootstrap 10030 may be operated based on service discovery information provided over the existing linear network.

On the broadcaster side, the existing traditional service provision type may be extended, and additional services may be provided in the form of an on-demand/multicast service along with the existing linear channel network. In addition, a personalization service may be provided through a connection-based usage report of an Internet channel.

From the perspective of TV/STB manufacturers, by providing a channel list 10040 aggregating OTT services with traditional T/S/C channels, opportunities to provide various services and expand the functions of the terminal may be obtained.

In the case of the network/ISP, OTT contents may be aggregated through their network infrastructure to expand service provision. In addition, through dynamic allocation of unicast/multicast, delivery performance enhanced compared to that of a terminal providing a non-management network-based service may be provided.

In other words, the broadcaster 10000 may transmit broadcast data over the traditional broadcast network 10010 and the Internet network 10020. A reception device according to embodiments, for example, a TV 10060 or a second device 10070 may make a request for the service discovery 10030 of the broadcast data to the DVB-I provider or server 10050, and receive the aggregated DVB-I service list 10040. Thus, service signaling may be performed on both the traditional linear channel and the Internet channel without the process of installing and executing a separate app at the native level.

Figure 2:
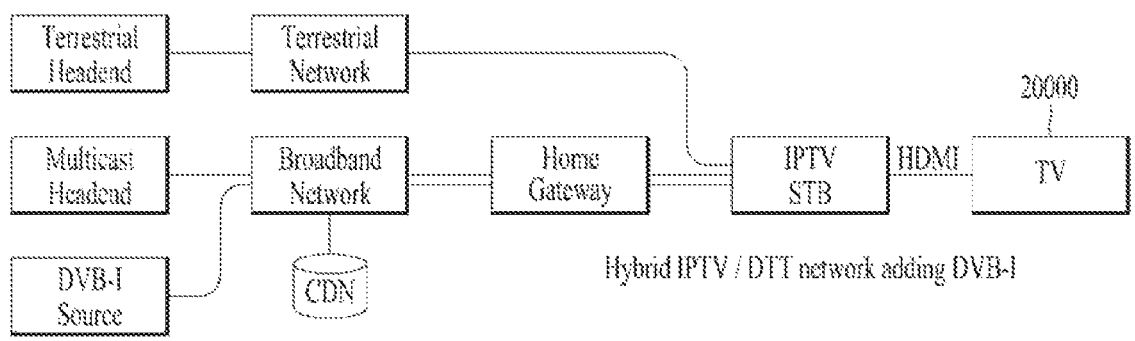
FIG. 2 is a flowchart of an operation according to embodiments from the perspective of a network operator/ISP according to embodiments.

FIG. 2 is a flowchart of an operation according to embodiments from the perspective of a network operator/ISP according to embodiments.

The device 20000 according to the embodiments may be a TV receiver. That is, it may be a device according to a hybrid IPTV/DTT network that supports DVB-I service. The reception device 20000 may be connected to an STB. The connection may be established by, for example, HDMI. The IPTV STB may receive a terrestrial broadcast signal from a terrestrial headend over a terrestrial network, and may receive various services and/or data from a multicast headend, which provides multicast services, a DVB-I source, which provides DVB-I services, and/or a content delivery network (CDN), which provides Internet content or the like, through a home gateway and a broadband network.

In particular, in the case of OTT, an OTT application suitable for a different OS environment is separately provided for each existing terminal. However, the method/device according to the embodiments may use a service through an industry standard based ecosystem without such a separate application. This provides a common service interface, thereby providing a convenient and efficient service access.

Figure 3:
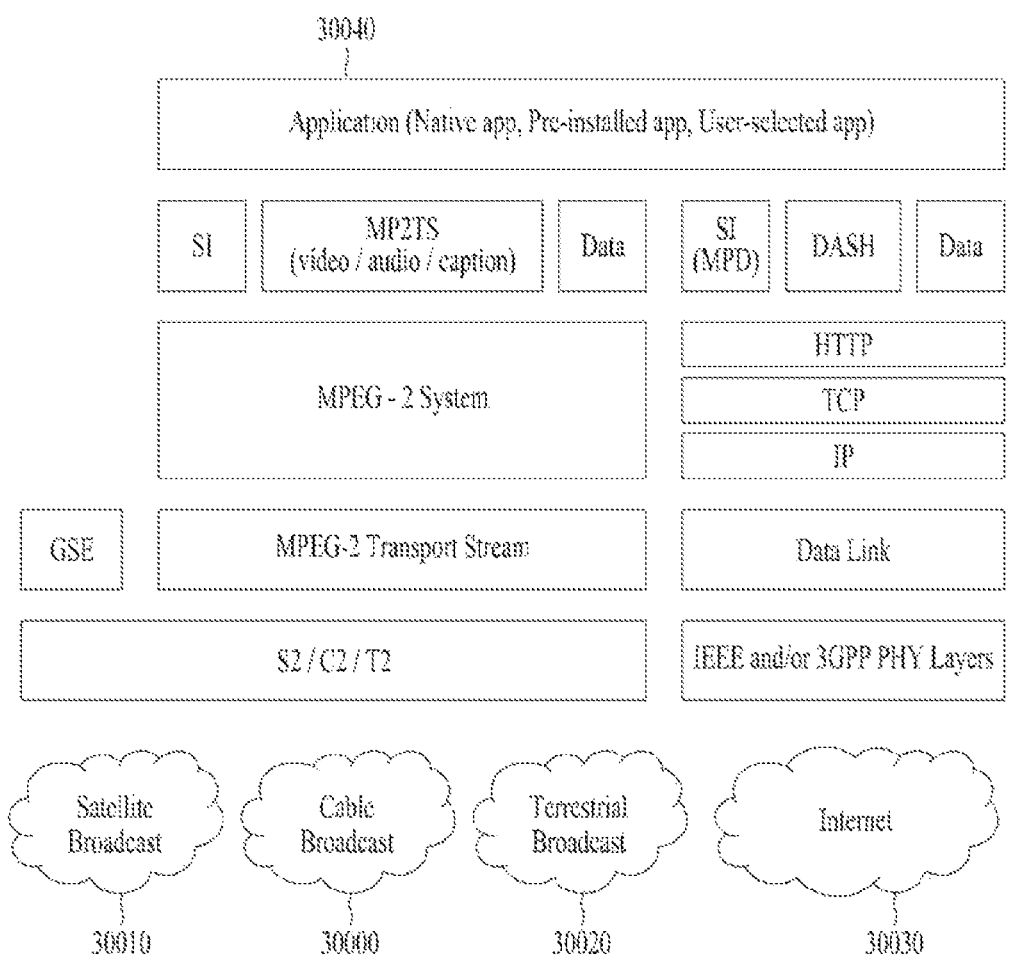
FIG. 3 shows a stack of protocols for DVB channel services according to embodiments.

FIG. 3 shows a stack of protocols for DVB channel services according to embodiments.

The TV device 20000 of FIG. 2 may perform the scenario of FIG. 1 based on the protocol structure of FIG. 3.

Services according to embodiments include DVB C/S/T/I services. Based on the protocol stack structure constituting the DVB-C (30000)/S (30010)/T (30020)/I (30030) service of FIG. 3, the embodiments propose a mechanism for discovering a DVB-I service transmitted through the Internet and a signaling scheme therefor. The method/device according to the embodiments may drive an application through service discovery, and an application 30040 according to the embodiments may include a native application, a pre-installed application, and a user-selected application.

Figure 4:
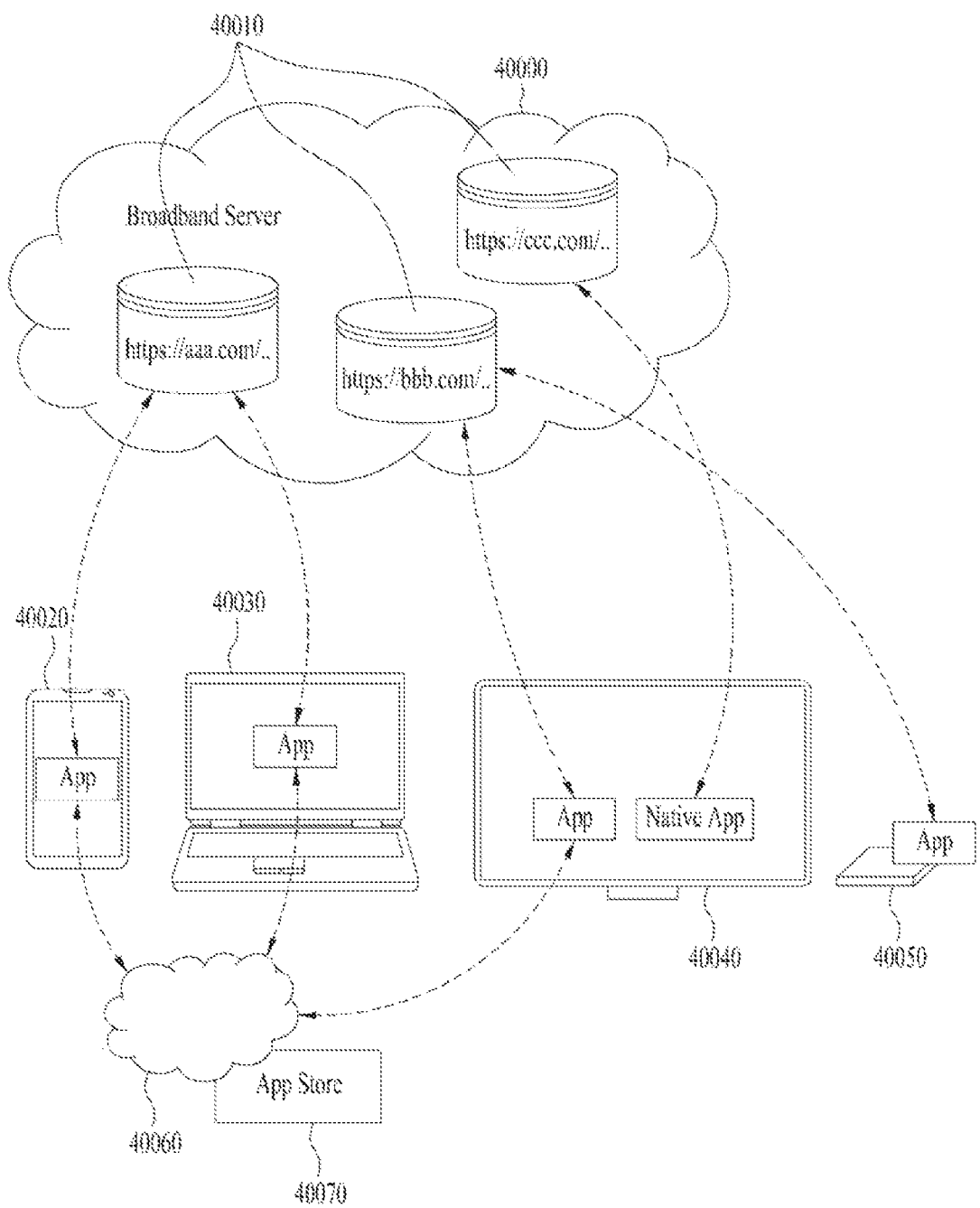
FIG. 4 shows various examples of DVB-I clients according to embodiments.

FIG. 4 shows various examples of DVB-I clients according to embodiments.

A mobile device 40020, a computer 40030, a TV 40040, and a set-top box or second device 40050 of FIG. 4 may correspond to/be compatible with the TV 20000 of FIG. 2.

A method of performing DVB-I service discovery by a reception device even when the reception method/device according to the embodiments is not connected to a tuner for DVB-C/S/T is proposed.

In other words, even when the DVB-C/S/T tuner is not installed (connected), the reception device may be connected to a broadband network and a receiver including (connected to) an A/V player module may perform DVB-I service discovery. A receiver equipped with (connected to) the DVB-C/S/T tuner may perform a channel scan using a conventional method (e.g., devices with a broadband Internet connection and no DVB-C/S/T tuner, devices with a broadband internet connection and a DVB-C/S/T tuner).

FIG. 4 shows various locations of DVB-I clients including a pre-provisioned URL.

The broadband server 40000 may store URLs 40010 for various applications in a database.

Reception devices according to the embodiments which are connected to the broadband server 40000 may include the mobile device 40020, the computer 40030, the TV 40040, the set-top box or second device 40050.

Each reception device may be connected to an app store 40070 through a cloud 40060.

The flow of service discovery according to the embodiments may be configured as follows.

1. A service discovery list table is retrieved/acquired over the broadband network based on a pre-provisioned URL.

2. The pre-provisioned URL may be used in various modules as follows: A. a DVB-I client module provided by a receiver manufacturer; B. a DVB-I client module mounted on a set-top box provided by the network operator (The module may be an app implemented separately inside the device or may be an HbbTV app); C. a mobile receiver or a DVB-I client module installed in an app downloaded from the App Store and installed by the receiver where apps can be installed.

3. The pre-provisioned URL may be in the form of a query template. The query template is completed as a template in an app (including a DVB-I client) installed on the receiver, and the receiver may transmit an HTTP request to the broadband server. The query template form may be defined as follows:

http[s]://{Recovery Base URL}/[?query]/sdlt, where:

[string] items in square brackets [ . . . ] indicate an optional string and

{element} items in curly brackets { . . . } indicate a named element.

{Recovery Base URL} is pre-installed in each app or native app and released, and may have a different URL value for each receiver on which each app is installed or each receiver provided by a manufacturer.

There is no restriction on the values of {Recovery Base URL}. They should allow access to a broadband server using the URL as a base.

The [?query] string may be produced in the form of a template in the app according to the device capability to configure a request string.

For query terms according to embodiments, refer to FIG. 5.

4. The service discovery list table includes a DVB service list, and includes a URL by which signaling of each service may be received. It also includes valid information for each service.

FIG. 5 shows query terms according to embodiments.

FIG. 5 shows examples of query terms used by a reception device according to embodiments in the service discovery process of FIG. 4.

The query term C represents ServiceDiscoveryListTable including services delivered via Cable.

The query term S represents ServiceDiscoveryListTable including services delivered via Satellite.

The query term T represents ServiceDiscoveryListTable including services delivered via Terrestrial.

The query term I represents ServiceDiscoveryListTable including services delivered via Internet.

The query term IPTV represents ServiceDiscoveryListTable including services delivered via IPTV.

The query term ALL represents ServiceDiscoveryListTable including all services delivered via CISITII.

Figure 6:
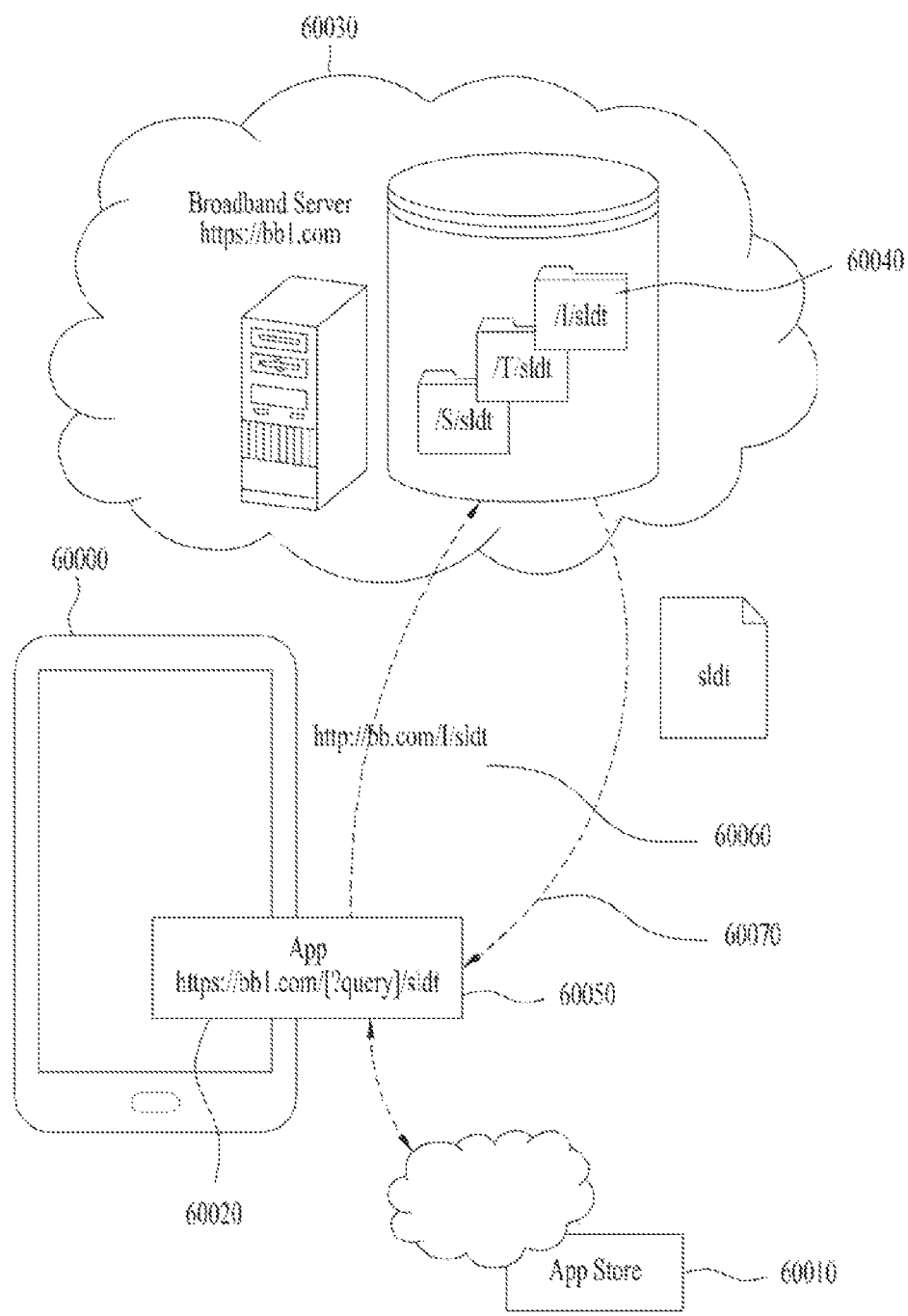
FIG. 6 shows an example of a DVB-I service discovery query request according to embodiments.

FIG. 6 shows an example of a DVB-I service discovery query request according to embodiments.

FIG. 6 shows a process of performing a query request by a reception device 60000 according to the embodiments based on the query of FIG. 5. The reception device 60000 of FIG. 6 includes the device 20000 of FIG. 2 and the terminals 40020, 40030, 40040, and 40050 of FIG. 4.

The reception device according to the embodiments may perform the following operations based on a pre-provisioned URL and a query template, and the transmission device according to the embodiments supports processing for the operation of the reception device.

1. A mobile receiver supporting only the broadband network (or the reception device 60000 according to the embodiments) may download an app 60020 enabling discovery of a DVB-I service from the app store 60010 and install the same.

2. The downloaded app includes a DVB-I client module. The module has a pre-provisioned URL.

3. In order to perform DVB-I service discovery, the mobile receiver 60000 configures a query form 60050 using the embedded pre-provisioned URL.

4. Since the receiver does not contain a DVB-S/C/T tuner, it desires to discover a DVB-I service obtainable over the broadband network 60030. Here, the broadband network or server 60030 is considered to include, for example, an address of https://bbl.com.

5. The query template 60060 may be configured in a query form 60050 requesting a service discovery list table (SDLT or SLDT, service list discovery table) 60040 including a list in which only DVB-I services may be discovered. Here, the SDLT may include a list table in which services (channels) such as DVB-I/T/S may be discovered. For example, the query may be expressed as https://bbl.com/[?query]/sldt based on the address 60030 of the broadband network, and may have a form making a request for sldt to a specific server.

6. Upon receiving the query 60060, the broadband server 60030 parses the query 60060, and then provides a response 60070 to the receiver 60000, which has made the request 60060, through a response scenario implemented in the server 60030. Here, the query 60060 may be expressed as, for example, http://bbl.com/i/sldt based on the address of the server, and may have a form making a request to a specific server for an SDLT for the I content (service).

7. An sdlt file 60070 that responds (or corresponds) to the request 60060 may be configured in any file format is supportable in an XML or Json-format web environment.

Figure 7:
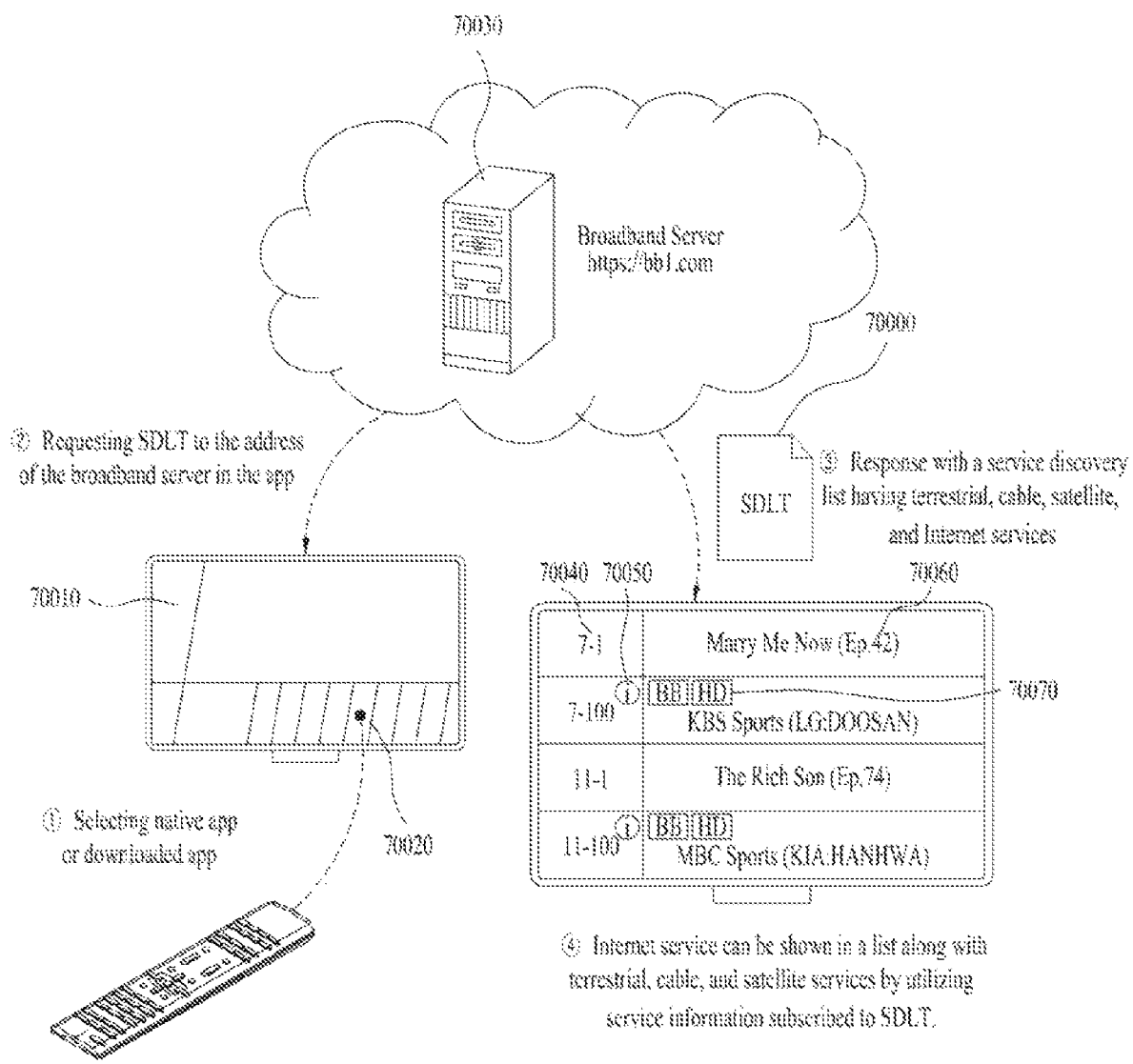
FIG. 7 shows example devices of embodiments implementing a service list UI based on SDLT according to the embodiments.

FIG. 7 shows example devices of embodiments implementing a service list UI based on SDLT according to the embodiments.

FIG. 7 illustrates a detailed implementation operation of the SDLT-based service discovery process of FIG. 6 from a UI perspective.

The reception device of the embodiments may provide a service UI/UX for user convenience. As an SDLT 70000 proposed in the embodiments is provided, the receiver may list Internet-based services together with traditional terrestrial, satellite, and cable services in a service list that may be selected by a user. FIG. 7 shows a UI on a TV through a specific app, and an icon may be generated and displayed for each receiver to show whether or not each service is transmitted on the Internet according to the characteristics of each service. In addition, the receiver may additionally provide information. For example, when the receiver is not connected to a broadband, it may indicate that Internet-based services cannot be selected.

In other words, the reception device 70010 of the embodiments may receive a selection signal from a user through voice/electric signal/various inputs (No. 1). Here, the user may select a native app and/or a downloaded app 70020. For convenience of user selection, the reception device 70010 may express UI/UX-related information in various configurations/types on the display (70020).

The reception device 70010 may request (request) an SDLT to a broadband server address (e.g., https://bbl.com, 70030) embedded in the app (No. 2).

The server 70030 may send a service discovery list including all terrestrial, cable, satellite, and Internet services to the reception device 70010 in response (No. 3).

The reception device 70010 may present, on the display, an Internet service together with terrestrial, cable, and satellite services in the form of a UI/UX list based on service information written in the SDLT. A logical channel number 70040, a terrestrial/cable/satellite/Internet channel indicator 70050, program/service related information (title, content, episode number, etc.) 70060, capability/resolution information and the like 70070 may be displayed on the display through a UI/UX.

Figure 8:
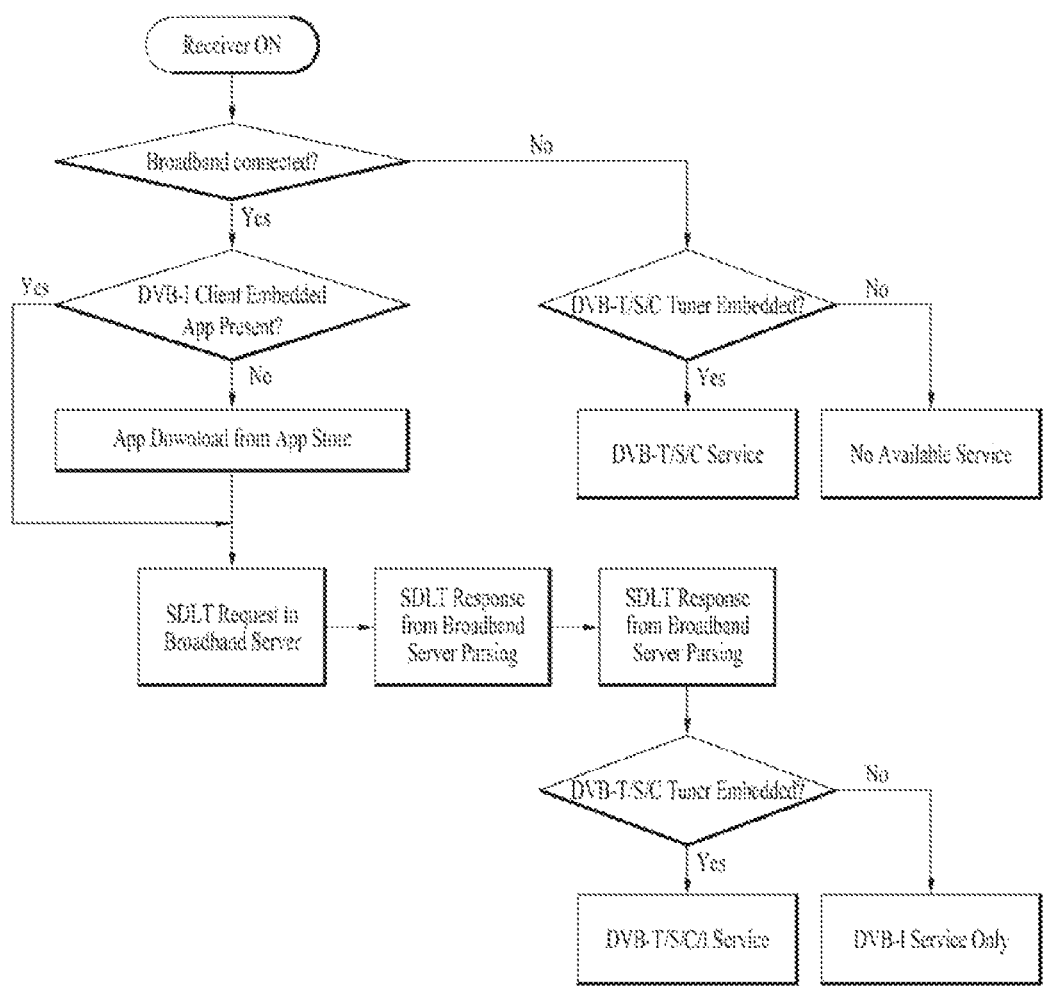
FIG. 8 is an exemplary flowchart of a service discovery operation according to embodiments.

FIG. 8 is an exemplary flowchart of a service discovery operation according to embodiments.

FIG. 8 is a flowchart of the service discovery described with reference to in FIGS. 6 and 7.

1. The reception device according to the embodiments is activated.

2-1. When the reception device is connected to a broadband network 2-1-1. When an app with a DVB-I client is present in the reception device 2-1-1-1. The reception device transmits an SDLT request to the broadband network.

2-1-1-2. the reception device parses SDLT response information received from the broadband network.

2-1-1-3. The reception device checks whether there is a DVB-T/S/C tuner. When there is a tuner, a DVB-T/S/C/I service is provided to users based on the SDLT. When there is no tuner, only the DVB-T service is provided to users based on the SDLT.

2-1-2. When there is no app on which the DVB-I client is installed in the reception device, the reception device may download the app from the app store.

2-2. When the reception device is not connected to the broadband network, but has a DVB-T/S/C tuner, it receives DVB T/S/C service and provides the same to the user. When there is no DVB-T/S/C tuner, it notifies the user through the UI/UX that there is no service available.

FIG. 9 shows syntax of a service discovery list table (SDLT) according to embodiments.

FIG. 9 shows the syntax of the SDLT according to the embodiments described in FIG. 8 and the like.

The ServiceDiscoveryListTable of FIG. 9 may be generated/encoded by a service provider, an encoder (BICM), the signaling generator, and the like in the transmission device according to the embodiments, and may be parsed/acquired by a signaling parser, a signaling parser, and the like in the reception device.

The ServiceDiscoveryListTable (SDLT) according to the embodiments may take the form of an HTTP response provided by the broadband server through an HTTP request configured in a query form according to the pre-provisioned URL embedded in the DVB-I client module and the receiver capability.

FIG. 9 shows definitions of elements and attribute values of the SDLT in XML format according to embodiments.

ServiceDiscoveryListTable represents the root element of the table and includes a service list necessary for service discovery.

Service represents a service included in the list.

serviceId is an identifier of the service. For DVB-C/S/T, the serviceId has a unique value within the range of serviceId+transportStreamId+originalNetworkId. For DVB-I, the serviceId has a unique value within the range of the original network.

For DVB-I, globalServiceId has a value in the form of a globally unique URI that is mapped to one service in the Electronic Service Guide (ESG).

originalNetworkId indicates an identifier of the original network.

transportStreamId indicates an identifier of a transport stream.

serviceCategory indicates the category of a service, and may be defined as shown in FIG. 10.

FIG. 10 shows service categories according to embodiments.

FIG. 10 shows a detailed configuration of a service category element of the SDLT of FIG. 9;

For example, the values of the service category may be expressed as follows: 1: Linear TV Service; 2: Linear Radio Service; 3: VoD Service; 4: App Service; 5: ESG Service; 6: Data Service.

SvcSeqNum is a sequence number indicating whether a value inside the service element has changed. When this value has not changed, this means that the value inside the service element has not changed. When a service with the same ServiceId has already been received, the receiver does not need to perform reanalysis.

contentFormat indicates a format of contents constituting a service. Content formats will be described with reference to FIG. 11.

FIG. 11 shows content formats according to embodiments.

FIG. 11 shows content formats that the services for the respective categories described with reference to FIG. 10 have.

For example, the values of content formats may be expressed as follows: 1: TS (contents according to the MPEG-2 TS format); 2: ISO BMFF (contents according to the ISO BMFF file structure); 3: CMAF (contents according to the common media applications format).

SvcInetUrl indicates the URL value of a broadband server that may receive service signaling or ESG.

urlType indicates the type of the broadband server URL, and may indicate signaling data or ESG data as shown in FIG. 12.

FIG. 12 shows types of URLs according to embodiments.

FIG. 12 shows a URL type element of the SDLT of FIG. 9;

For example, the type values of the URL may be expressed as follows: 1: URL of Service Signaling Server; 2: URL of ESG server (providing access to the ESG data).

FIG. 13 shows SDLT syntax to which SdltInetUrl is added according to embodiments.

FIG. 13 is an example corresponding to or additionally extended from the SDLT of FIG. 9.

A method/device according to embodiments may configure a query form using SdltInetUrl and svcInetUrl.

Embodiments may generate a query term accessible to the service signaling and ESG using SdltInetUrl or SvcInetUrl of each service provided in the SDLT.

Embodiments propose a method of signaling a broadband URL of an SDLT level. SdltInetUrl represents a broadband server address accessible by a receiver to acquire information that may correspond to a certain service included in the SDLT, and may be included in the SDLT as shown in FIG. 13.

SdltInetUrl indicates a URL value of the broadband server from which signaling or ESG related to any service listed in the SDLT may be acquired.

urlType may indicate a type of the broadband server URL, and may indicate signaling data or ESG data according to each defined type.

In the present disclosure, the URL according to the embodiments may be referred to as address information or the like.

FIG. 14 shows terms that may be used for the query term according to embodiments.

FIG. 14 shows terms used in configuring a query term based on the SDLT of FIG. 13 and/or FIG. 9.

The embodiments propose a method of configuring an HTTP query term that may request service-related information using SdltInetUrl as follows. FIG. 14 defines terms applicable in configuring an HTTP request query.

service_id identifies a desired service.

normal|diff|template identifies a desired mode of files.

current|next identifies a desired current/next version.

list_of_signaling_object_types indicates the type of a signaling object, and may be expressed on a space basis.

When SdltInetUrl having urlType equal to "1" is signaled in the SDLT, the term <service_id> may be used. This means a query that the URL is signaled at the SDLT level, but the receiver desires to acquire only signaling information for a specific required service. When the value of <service_id> is not included in the query term, this means that signaling for all services signaled in the SDLT is requested. The reception device according to the embodiments may request and acquire signaling information for a specific service by configuring a query based on the service ID.

As for the term normal/diff/template, when a request for a DVB-I service is made, the corresponding term may be applied when the signaling objects are in XML format.

The term current/next indicates whether the requested signaling object is signaling of the current service or signaling of next version. According to embodiments, when a signaling object of the current version is requested, the corresponding term may be omitted.

The term list_of_signaling_object_types indicates the types of requested signaling objects (see FIG. 15), which may be separated into spaces. When all signaling objects are requested, ALL may be applied to the query term.

FIG. 15 shows a list of signaling object types according to embodiments.

FIG. 15 shows an example of object(s) signaled by the method/device according to the embodiments in FIGS. 1, 4, 6, 7 and the like.

For example, the values of the signaling object and information indicated by the values may be configured as follows: ALL: All metadata objects for requested service(s); USBD: USBD for requested service(s); MPD: DASH MPD for requested service(s); NIT: Network Information Table; BAT: Bouquet Association Table; SDT: Service Description Table; AIT: Application Information Table; DWD: Distribution Window Description.

Figure 16:
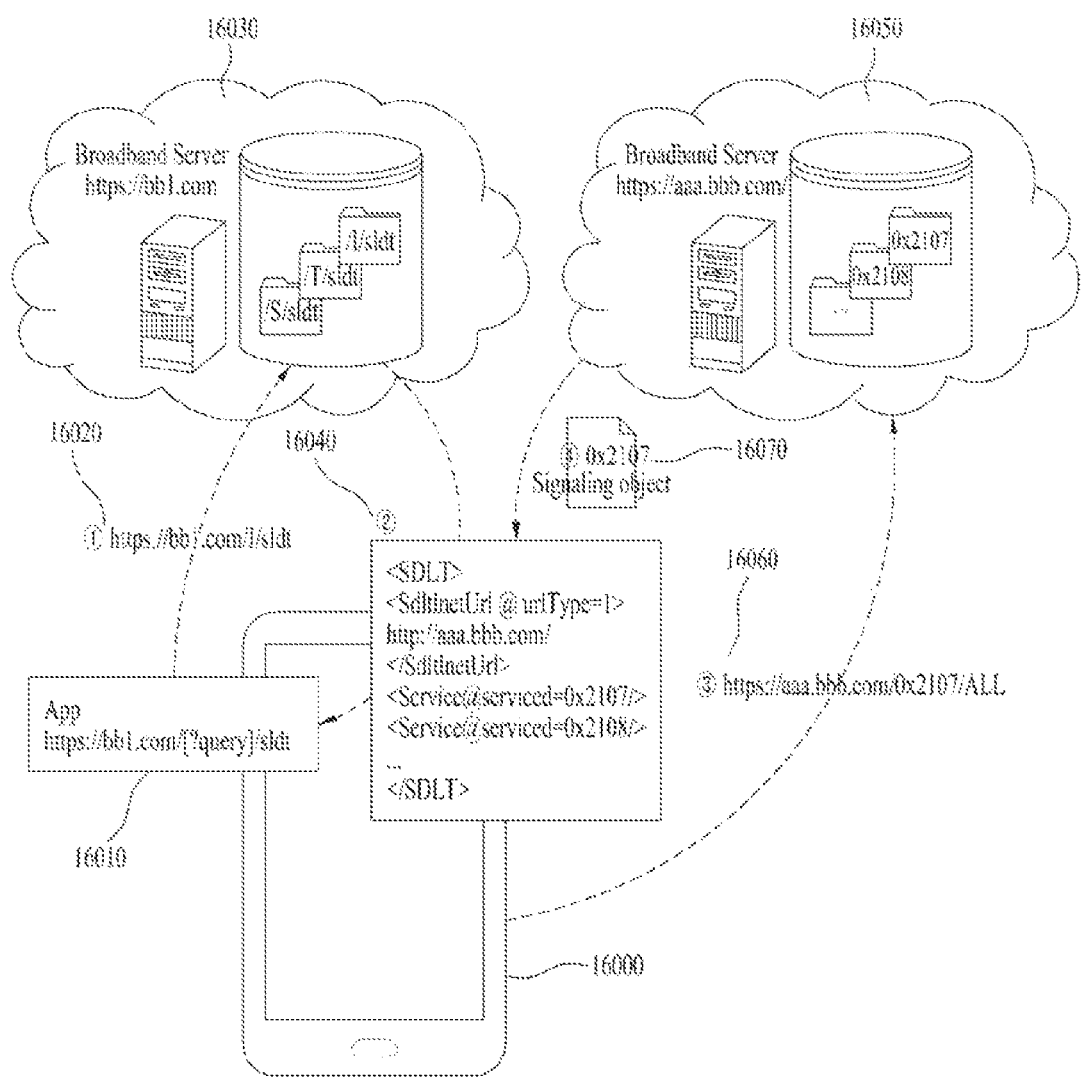
FIG. 16 shows an example of use of the query term using SdltInetUrl according to embodiments.

FIG. 16 shows an example of use of the query term using SdltInetUrl according to embodiments.

FIG. 16 is an additional example related to the service discovery process of FIGS. 4, 6, and 7.

The method/device according to the embodiments may generate a query term using sdltInetUrl as follows.

1. When the receiver acquires an SDLT through <sdltI-netUrl urlType="1">http://aaa.bbb.com/</sdltInetUrl>, the receiver configures the query term with the value of http://aaa.bbb.com/0x2107/ALL. When such an HTTP request is made, the broadband server returns all signaling objects for service (having @serviceId equal to 0x2107) in a current normal version.

2. When the receiver acquires an SDLT through <sdltI-netUrl urlType="1">http://xxx.yyy.com/</sdltInetUrl>, the receiver configures the query term with a value of http://xxx.yyy.com/0x2103/next/MPD. When such an HTTP request is made, the broadband server returns the MPD signaling object for service with the @serviceId equal to 0x2103 in the next normal version.

A reception device 16000 according to the embodiments corresponds to the reception device of the above-described embodiments. The reception device 16000 generates a query term 16010. The query term 16010 may transmit a query (?query) requesting an SDLT for the broadband server address to the server based on an app (16020).

A server 16030 according to the embodiments corresponds to the broadband server according to the above-described embodiments. The server 16030 contains the address of the server, for example, https://bbl.com, and the database of the server contains an SDLT for services such as I/T/S.

In response to the query 16020, the reception device 16000 receives an SDLT 16040 from the server 16030.

The SDLT 16040 may include the address of the server for signaling, for which the URL TYPE is 1, may identify information of the service signaling such as, for example, 2107, 2107, for, for example, http://aaa.bbb.com or each service ID.

The reception device 16000 may generate a query term 16060 to be sent to the signaling server 16050 based on the SDLT 16040 and transmit the query term 16060 to the signaling server 16050. The query term 16060 may include the signaling server 16050, include an identifier of a service requesting signaling information, and include information that requests all signaling information about an identifier of a specific service. The signaling server 16050 may store, in a database, the signaling information about the service for each service identifier. The reception device 16000 may receive, from the signaling server 16050, a signaling object 16070 as response information corresponding to the request. The signaling object 16070 includes signaling information about an identifier of a specific service. According to embodiments, the server may include a server 16030 containing an SDLT and/or a server 16020 containing signaling objects for each service. The server may be referred to as various terms such as a broadband server, an Internet server, a communication network server, and a signaling server. In addition, the servers may be classified into the two servers described above, or may be integrated into one server.

Figure 17:
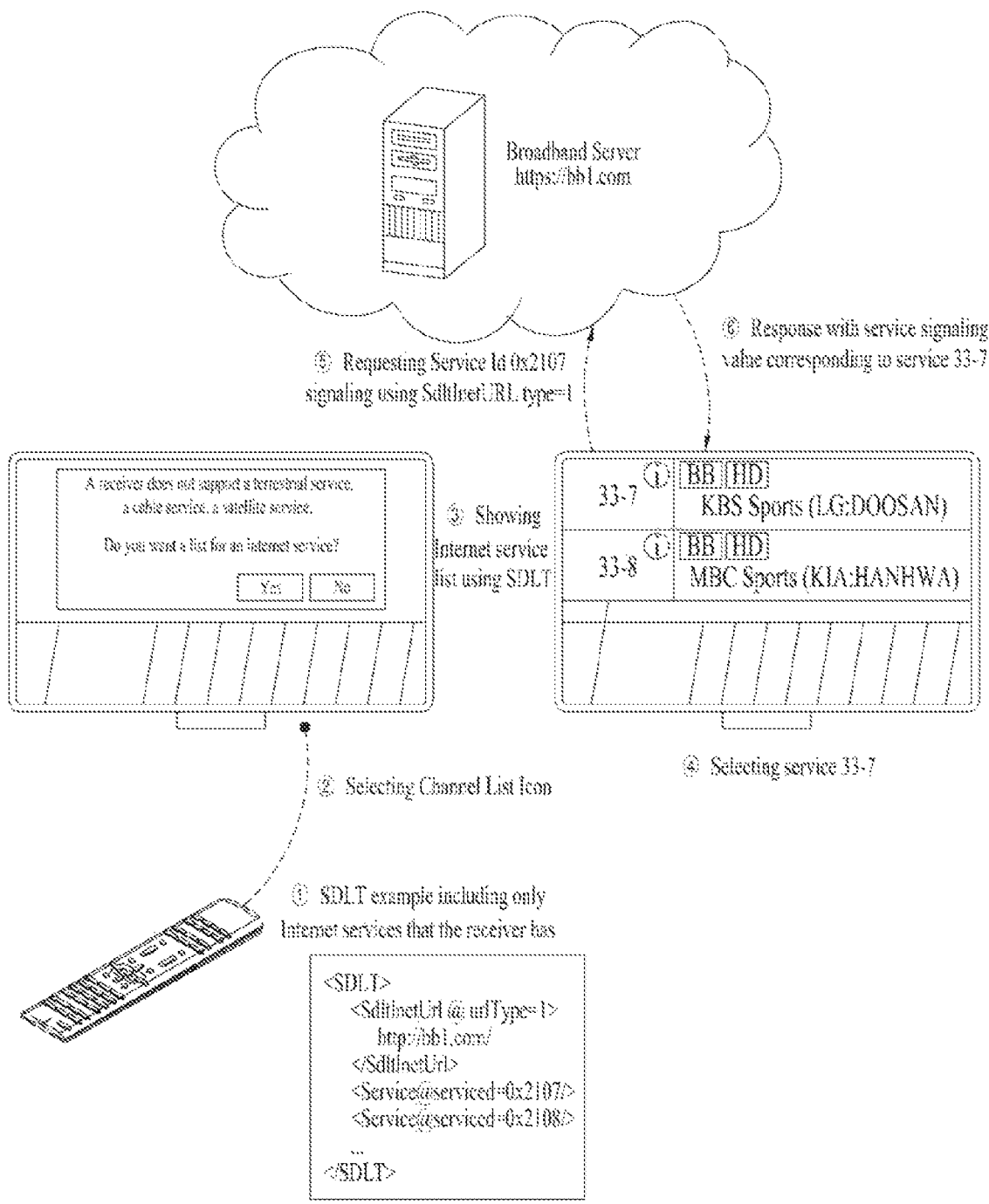
FIG. 17 shows an example of a UI/UX provided by a method/device according to embodiments.

FIG. 17 shows an example of a UI/UX provided by a method/device according to embodiments.

FIG. 17 shows an additional related example of the UI/UX examples for FIGS. 4, 6, 7, 16, and the like.

A flowchart of the UI/UX operation according to the embodiments may be configured as follows.

1. The reception device (including the reception devices according to the above-described embodiments) may acquire the SDLT from a broadcast signal or from a network, or may have an SDLT stored. The SDLT contains an SDLT internet url based on the url type value, and contains one or more service IDs.

2. The reception device may receive an input signal from a user. The reception device may display a service list to the user based on the UI/UX. The input signal may be information on an object the user desires to view. The reception device may provide the user with notification information (audible or visual menu/icon, etc.) to indicate whether the reception device supports terrestrial, cable, or satellite services. Also, through notification information, the reception device may ask the user whether to check the list of Internet services (DVB-I contents).

3. When the reception device receives a channel list icon selection signal from the user, the reception device provides an Internet service list to the user based on the SDLT. As in the above-described embodiments, the reception device may display, on the display, channel numbers for services, a channel type (terrestrial, cable, satellite, Internet, etc.), the name of a program belonging to the service, a summary of the program, the resolution the service, capability information, and the like.

4. The reception device may receive a signal for selecting a channel number for a specific service 33-7 from the user.

5. In response to the user's selection, the reception device makes a request to the signaling server for signaling corresponding to a URL type equal to 1 and a service ID equal to 0X2107.

6. In response to the request from the reception device to the signaling server, the reception device may receive service signaling information about a service corresponding to 33-7 from the signaling server.

FIG. 18 shows a metadata envelope type according to embodiments.

Figure 19:
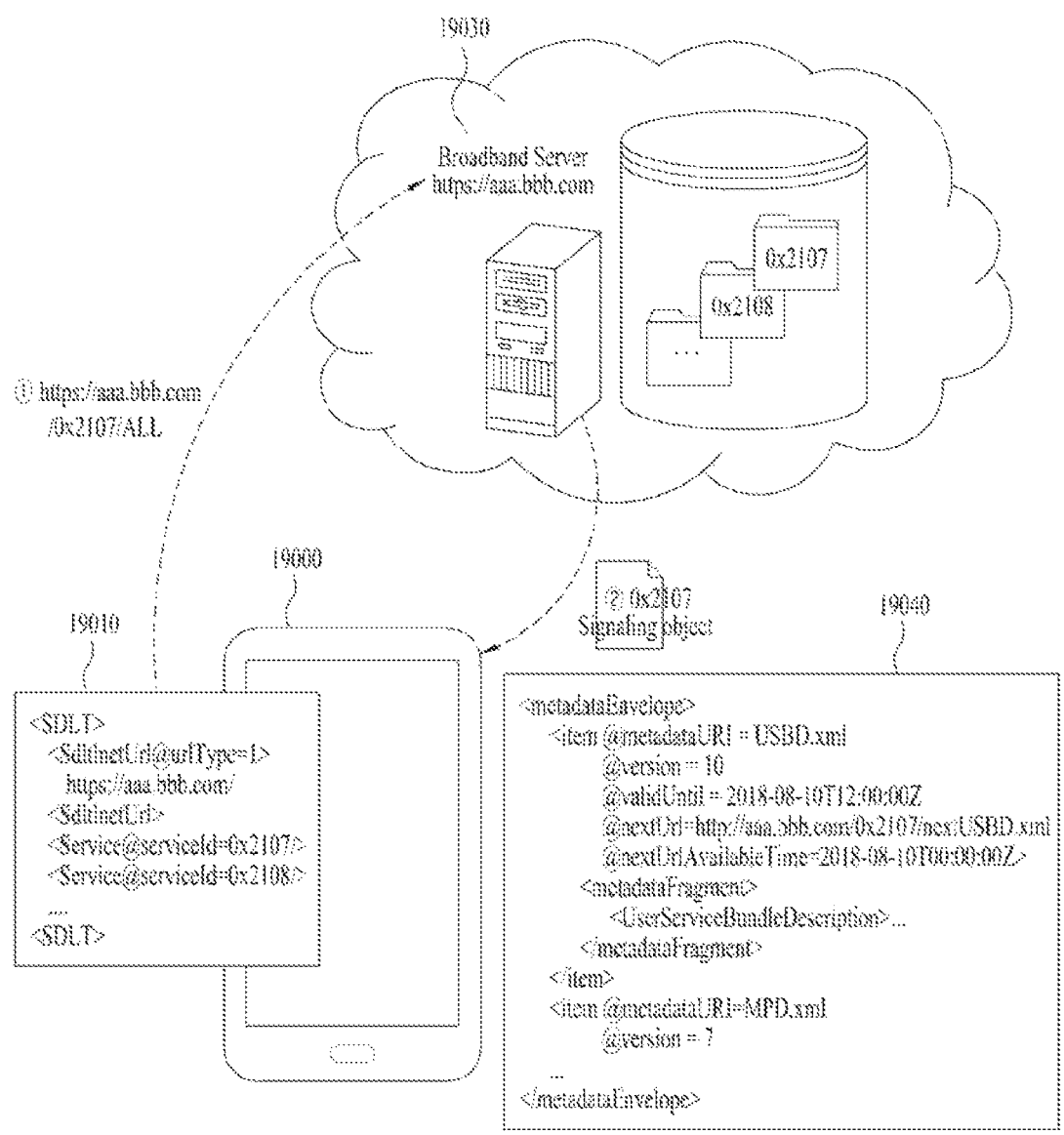
FIG. 19 shows an example of an HTTP Response based on a metadata envelope according to embodiments.

The metadata envelope of FIG. 18 may be one of signaling objects that is signaling information about a service (see FIG. 19).

The method/device according to the embodiments may execute an HTTP response signaling scheme for the DVB-I service.

Hereinafter, a DVB-I HTTP response signaling scheme used in receiving an HTTP response for a DVB-I service signaling HTTP request that is made over a broadband network will be described.

Upon receiving an HTTP response for an HTTP request that the receiver has made to the broadband server using SdltInetUrl or SvcInetUrl, the receiver should be allowed to check whether the response meets the request made by the receiver. In addition, embodiments may perform the following operations such that the latest information may be acquired in the fastest time.

The HTTP response containing a DVB-I service signaling object is carried in a metadataEnvelope structure. The metadataEnvelope of the DVB-I service signaling according to the embodiments is configured as metadataEnvelopeType as shown in FIG. 18.

The metadataEnvelope is composed of a sequence of item elements, and each item represents a respective signaling object. The item element is defined by metadataEnvelopeItemType, as shown in FIG. 18.

nextUrlAvailableTime indicates a possible start time for making an HTTP request to the broadband server with nextUrl indicating signaling of the next version. This attribute value is proposed to reduce the request errors of receivers that acquire a signaling object through a request/response process over a broadband network. The receiver may calculate the best time in the time between this attribute value and the attribute value of validUntil according to the implementation algorithm, to reduce the probability that receiver requests are concentrated and the receiver fail to receive a response.

nextUrl specifies a broadband URL address value indicating a signaling object of the next version.

metadataEnvelopeType is included in the response information received by the receiver.

The element name is indicated as item, and the type indicates metadataEnvelopeItemType.

metadataEnvelopeItemType represents the type of the metadata envelope item.

The element name may be metadataFragment, and the type may be string.

The attribute name may be metadataURI, and the type may be anyURI.

The attribute name may be version, and the type may be positiveInteger.

The attribute name may be validFrom, and the type may be dateTime (date/time).

The attribute name may be validUntil, and the type may be dateTime (date/time). Based on validFrom and validUntil, metadata may indicate the validity time of the response information.

The attribute name may be contentType, and the type may be string.

The attribute name may be nextUrlAvailableTime, and the type may be dateTime (date/time). This attribute indicates the next available time.

The attribute name may be nextUrl, and the type may be anyURI.

As shown in FIG. 18, the above-described attribute may be present essentially or optionally or may be omitted.

FIG. 19 shows an example of an HTTP Response based on a metadata envelope according to embodiments.

FIG. 19 shows a service signaling based on the metadata envelope of FIG. 18 and the SDLT of FIGS. 9, 13, and the like;

The receiver receives signaling of the DVB-I service as a response from the broadband server according to the HTTP request made by the receiver using the metadataEnvelope according to the embodiments.

In the embodiments, nextUrl and nextUrlAvailableTime of the USBD are signaled. Thus, the current USBD is valid until, for example, 12 o'clock on August 10 and the USBD of the next version is downloadable on the next URL address from, for example, 0 o'clock on August 10. Accordingly, the receiver is allowed to download the next version of the USBD for 12 hours available outside the time when there is a lot of traffic.

A reception device 19000 (corresponding to the reception devices according to the above-described embodiments) checks an SDLT 19010. The SDLT 19010 includes URL TYPE and SERVICE ID.

The reception device 19000 may make a request to a signaling server 19030 for all information (ALL) of signaling corresponding to a specific service, for example, a service having service ID equal to 0X2107.

The reception device 19000 may receive, from the signaling server 19030, signaling object(s) 19040 corresponding to a response to the request. The signaling object 19040 includes signaling information about a service corresponding to the requested service identifier. As described above, the signaling object 1940 may be expressed in the form of a metadata envelope. The signaling object 1940 may include an item for USDB and an item for MPD. For each item, the signaling object 1940 may include, based on a metadata fragment, version information, validUntil, an address (nextUrl) for the next information, and available time for the next information (nextUrlAvailableTime).

Figure 20:
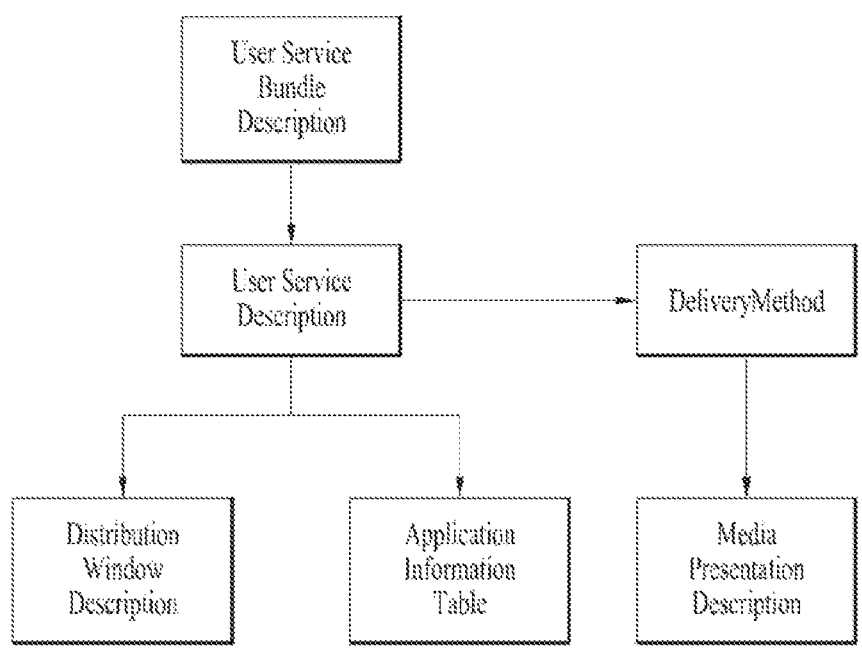
FIG. 20 shows a DVB-I service signaling mechanism according to embodiments.

FIG. 20 shows a DVB-I service signaling mechanism according to embodiments.

FIG. 20 shows types of DVB-I service signaling that may be additionally applied to FIGS. 1, 4, 6, 7, 8, 16, 17, 19, and the like, and a mechanism thereof.

The method/device according to the embodiments generates/configures service signaling of an Internet-based service in a certain type of metadata, and proposes a definition of service information included in each metadata. The transmission method/device according to the embodiments may generate and transmit such signaling information, and the reception method/device according to the embodiments may receive the signaling information and perform service discovery.

In the case of the DVB-I service, the receiver connected to the broadband server should be able to play audio (A)/video (V)/caption contentsregardless of whether the DVB-C/S/T tuner is installed or not. A service signaling configuration of a DVB-I service provided by the broadband server in response to a request for signaling of the service made by the receiver is proposed.

Information included in the service signaling of the DVB-I service depends on the role and configuration of each metadata signaling object, as shown in FIG. 20. Embodiments propose a DVB-I service signaling scheme composed of four types of signaling metadata.

The following signaling information may be referred to as various terms such as first information, second information, first signaling information, and second signaling information.

UserServiceBundleDescription (USBD): signals information about the DVB-I service, and includes URL information about the MPD in the case of a DVB-I linear service.

MediaPresentationDescription (MPD): Signaling metadata used in DVB-DASH. The usage and signaling information of the corresponding metadata are as defined in MPEG-DASH.

Application Information Table (AIT): When the DVB-I service is a service driven by an application, the USBD may announce the URL for AIT signaling for connecting the application.

Distribution Window Description (DWD): The DVB-I service may provide a user with information about the service as it starts to show still images or normal files. In this case, the USBD may announce a URL linking a DWD that signals schedule information about when to distribute a still image.

In addition, the above-described metadata may have the following reference relationship. The USBD may reference the USD. The USBD may reference the DWD and/or the AIT. Furthermore, the USBD may reference the MPD according to the service/signaling delivery method.

FIG. 21 shows an example of a USBD according to embodiments.

FIG. 21 corresponds to the USBD of FIG. 20.

The transmission method/device according to the embodiments may transmit the USBD, or the reception method/device according to the embodiments may acquire the USBD based on service discovery signaling from the transmission device and/or the server.

The configuration of the UserServiceBundleDescription of the DVB-I service according to the embodiments will be described.

The USBD according to the embodiments may describe comprehensive information of the DVB-I service, and provide a service signaling system that serves as a starting point for connecting other signaling metadata needed for the USBD/USD to provide each service to the user.

The USBD according to the embodiments may be configured to include only one user service description (USD). The USD contains comprehensive information on the user service and information on how and when the service can be provided to the user. FIG. 21 describes the syntax of the USBD/USD.

UserServiceBundleDescription: is a root element of the USBD for DVB-I.

UserServiceDescription: indicates a single instance of the DVB-I service.

@serviceId: is a service identifier of the unsignedShort type, and has the same value as the value described in the SDLT signaling table for discovering Internet-based services. This value may reference a corresponding service entry in the SDLT.

@globalServiceId: has a globally unique service identifier value of the anyURI type. This value matches the value of global service ID that is used in the ESG, and may be used as information for mapping to a specific type of service. In some service categories, this value may not be used. This value may reference a corresponding service entry in the ESG (Electronic Service Guide) information.

@serviceCategory: is distinguished by an integer value of the unsignedByte type and represents a service category. That is, @serviceCategory may represent a category of a service, and the category may include linear TV, linear radio, on-demand, or application service. For specific categories, refer to the figure.

@hidden: indicates whether this service is hidden in the service list or shown to users. This field has an attribute value of the Boolean type, and indicates whether the service should be shown to the user in the service list. When this value is not indicated, the default value is FALSE, which means that the service is shown to the user.

@appRendering: indicates whether any application will be executed first and render this service. It has an attribute value of the Boolean type, and indicates whether the service is provided through a module embedded in the receiver or through a specific app in showing the service to the user. When the value is TRUE, the receiver may plays a role of waiting for the app to be driven, and this information may be provided to the user. When the value is not presented, this means FALSE, and that the application does not perform the rendering. Thus, the receiver performs the function of rendering the service immediately.

@MediaPresentationDescription: indicates a URL pointing to the MPD signaling description. It has an attribute value of the anyURI type that may be indicated as optional, and specifies a URL where an MPD file is downloadable through broadband.

@ApplicationInformationTable: indicates a URL pointing to the AIT signaling description. It has an attribute value of the anyURI type that may be indicated as optional, and specifies a URL where the AIT table describing application information is downloadable through broadband.

@DistributionWindowDescription: indicates a URL pointing to the DWD signaling description. It has an attribute value of the anyURI type that may be indicated as optional, and specifies an URL where the DWD, a signaling table describing a time for which files related to the service may be received, is downloadable over a broadband network.

RunningStatus: indicates the status of this service. For example, the status may include running, not running, or starting in a few seconds. This value represents an element value of the unsignedByte type, and may specify the running status of the current service.

@duration: may indicate the pausing duration in seconds when the RunningStatus is not running or is pausing. It has an attribute value having an integer value of the unsignedInt type. When the RunningStatus has a value different from 1, that is, when the RunningStatus is not running, it may specify a duration in seconds.

@resumeTime may indicate a resume date/time when the RunningStatus is not running or is pausing. It has an attribute value of the dateTime type. When RunningStatus has a value different from 1, @resumeTime may specify the date/time when the service is resumed.

Name: indicates the name of the DVB-I service. It has an element value of the string type.

@lang: indicates a language of the DVB-I service name. It has an attribute value of the lang type.

ServiceLanguage: indicates available languages of the DVB-I service.

Icon: indicates a URL pointing to an icon (or image). Multiple URLs may be used to point to icons or images. In this case, icons/images of different widths, heights, or resolution formats may be signaled. The Icon has an element value that may be indicated as optional, and may have one or more values. It may be a URL of the anyURI type, and may be a broadband URL indicating each file. Each file may point to a still image or icon that should be displayed on the screen before the service is provided. The Icon element has the following attribute values to provide information on whether the receiver can render the file.

@mimeType: may indicate the optional MIME type of the icon allowing receivers to ignore image types unsuitable to use. It has an attribute value of the string type and is configured in the MIME type form.

@width: may indicate the width of the referenced image in pixels. It has an attribute value of the unsignedInt type and specifies the width in pixels.

@height: may indicate the height of the referenced image in pixels. It has an attribute value of the unsignedInt type and specifies the height in pixels.

@dataSize: may indicate the size of image data in bytes. It has an attribute value of the unsignedInt type and specifies the size in bytes.

@displayDuration: may indicate the icon (image) display time duration in seconds. It has an attribute value of the unsignedInt type, and specifies the duration in seconds in which an icon or image is displayed on the screen.

DeliveryMethod: may indicate whether a container of transport-related information including contents of a service is broadcast or optionally transmitted/accessed in a broadband. This field is signaling information related to transmission information of data constituting the corresponding service, and may not be indicated according to @serviceCategory or may be indicated as multiple element values. Information on whether the container is transmitted over a broadcast network or a broadband network is indicated through a sub-element value.

BroadcastAppService: indicates a DASH representation delivered over broadcast containing corresponding media component(s) belonging to the DVB-I service. In the case of linear A/V service or linear audio service, the DASH representation may be transmitted over the broadcast network to configure the service. In this case, multiple element values may be indicated.

BasePattern: indicates a character pattern used by the DVB-I receiver to match against any portion of a segment URL used by the DASH client to request DASH media segments of a parent DASH representation. This value is used to indicate the base URL of the DASH representation transmitted over the broadcast network, may be composed of one or more values. It should match the BaseURL value described in the MPD.

UnicastAppService: indicates a DASH representation delivered over a broadband containing media content component(s) belonging to the DVB-I service. In the case of the linear A/V service or linear audio service, the service may be configured by transmitting the DASH representation over the broadband network. In this case, multiple element values may be indicated.

BasePattern: used to indicate the base URL of the DASH representation transmitted over the broadband network, may be composed of one or more values. It should match the BaseURL value described in the MPD.

In addition, the configuration of the USBD may depend on the values of @serviceCategory as defined in FIG. 10.

In the case of Linear TV Service and Linear Radio Service, the USBD/USD essentially contains MPD URL (@MediaPresentationDescription). The MPD URL value means a URL where the receiver may directly access the broadband server and acquire a file. Since Application may be included, the AIT URL (@ApplicationInformationTable) may be optionally included.

In the case of VOD Service, the MPD URL (@MediaPresentationDescription) may not be included. In the case of rendering the application first to show the VoD list, the attribute value of @appRendering is set to TRUE, and the AIT URL must be included.

In the case of App Service, the AIT URL is essentially present no matter what value @appRendering has, and the MPD URL may appear optionally.

ESG Service indicates a special service that transmits ESG data. In this case, the AIT URL (@ApplicationInformationTable) and MPD URL (@MediaPresentationDescription) are not signaled in the USBD/USD.

Data Service indicates a service that transmits data. In this case, the AIT URL and MPD URL are not signaled in the USBD/USD.

FIG. 22 shows RunningStatus according to embodiments.

FIG. 22 shows specific values of the running status of FIG. 21.

When the above-described RunningStatus is not running, that is, when it has a value of 2, 3, 4, or 5, it has a sub-attribute value of @duration or @resumedTime depending on the case. When the values are not given, the value infinite may be indicated as a default value.

RunningStatus may include Running, Not Running, Pausing, Starts in a few seconds, and Service off-air.

Figure 23:
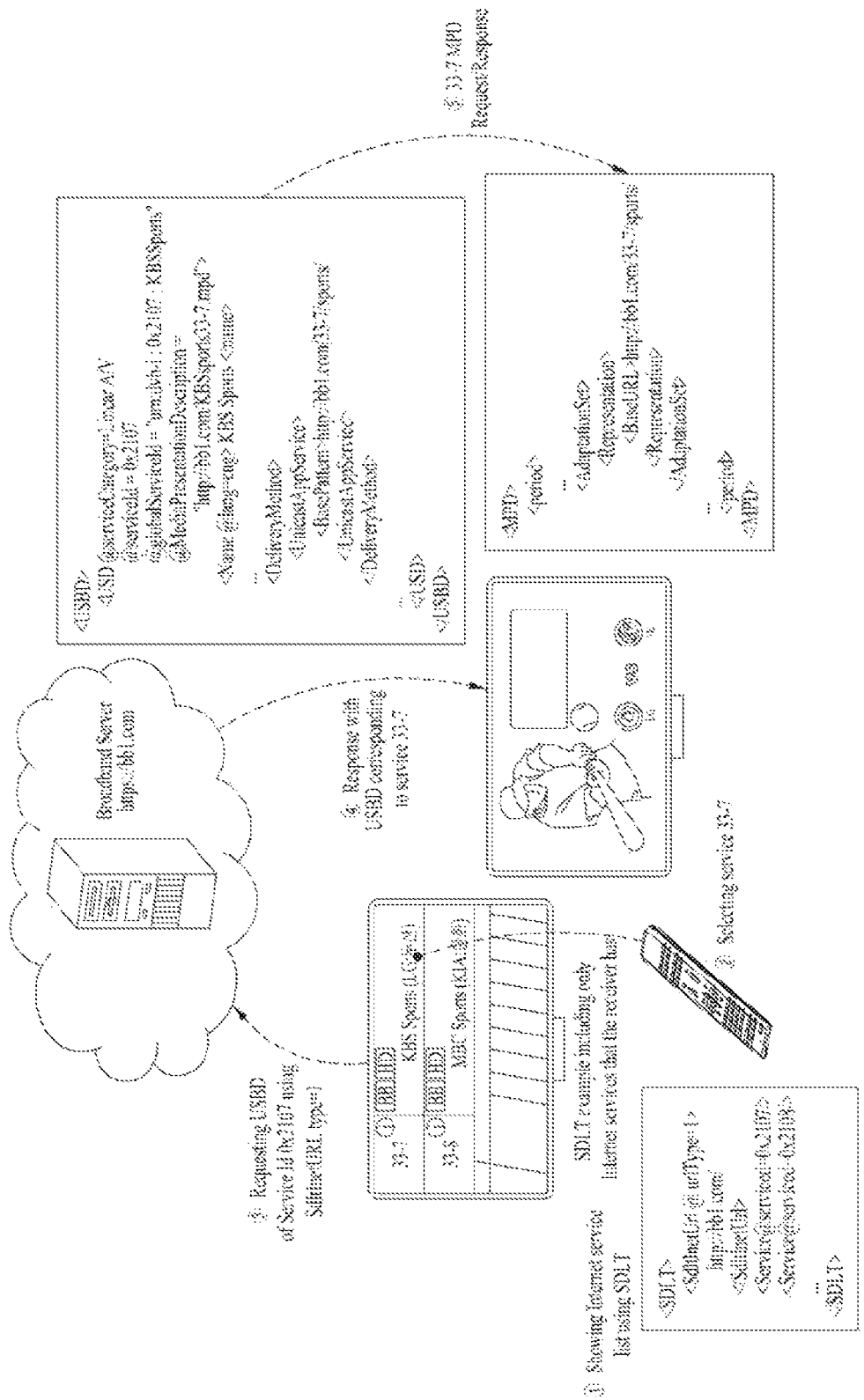
FIG. 23 is a flowchart illustrating USBD and MPD acquisition of an Internet-based service according to embodiments.

FIG. 23 is a flowchart illustrating USBD and MPD acquisition of an Internet-based service according to embodiments.

FIG. 23 is a flowchart illustrating a flow in which a reception device according to embodiments acquires service signaling based on signaling information related to FIG. 20 and the like. FIG. 23 may be an example combined with the service acquisition/discovery process of FIGS. 4, 6, 7, 16, 17, and 19 described above.

A flowchart of providing a service to a user by acquiring signaling of the service from signaling data acquired through service discovery by the receiver according to a service signaling mechanism method for the Internet-based service according to embodiments will be described.

Regarding the method/device according to the embodiments, this example shows that a URL indicating MPD is inserted in the USBD when the linear A/V service is an Internet-based service, and the URL value of USBD/USD/DeliveryMethod/BasePattern must match the value of BaseURL signaled in the MPD.

The details described in the above-mentioned drawings and above paragraphs will be omitted or briefly described in the description of FIG. 23, and reference may be made to the embodiments described above.

Figure 24:
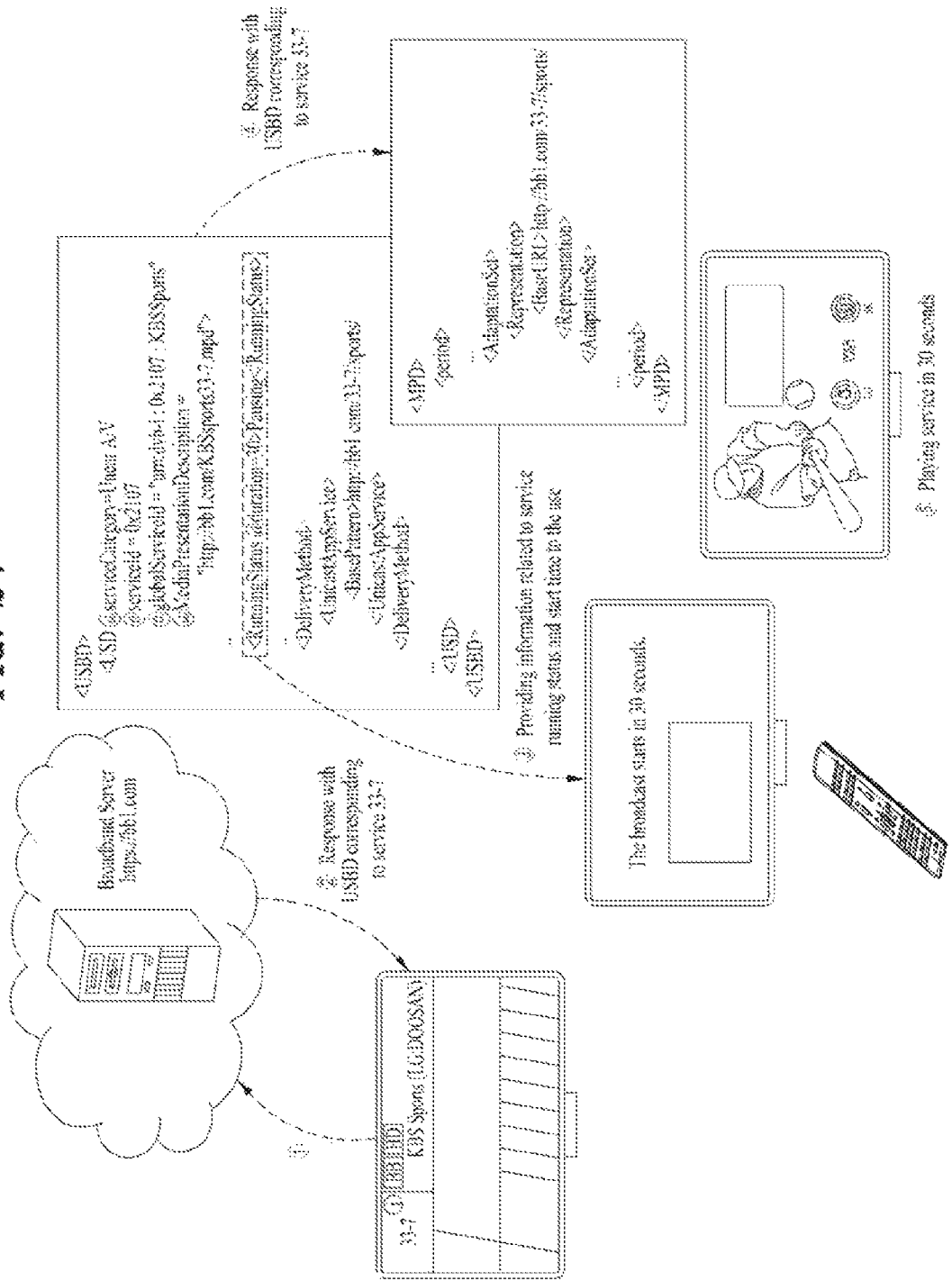
FIG. 24 shows an example of a UI/UX based on RunningStatus according to embodiments.

1. The reception device may display a list of Internet services using an SDLT. The SDLT may include information as shown in FIG. 24.

2. The reception device receives a signal for selecting a service (DVB-I) corresponding to 33-7 from a user.

3. The reception device makes a request for signaling information corresponding to a specific service ID, for example, USBD, to the broadband server using the values of URL TYPE and SERVICE ID.

4. The reception device receives a USBD corresponding to the service 33-7 from the server as a response.

5. The reception device may determine that there is an MPD corresponding to the service 33-7 from the USBD, make a request for an MPD to the server, and receive a response therefrom.

The reception device determines that the service with the ID of OX2107 is KBS Sports through the global service ID of the USBD, and determines the MPD for the service through the media presentation description of the USBD. The reception device may check the base URL for the sports of the service corresponding to 33-7 for the server address through the acquired MPD. The reception device may display a service desired by the user based on the above-described service discovery signaling.

FIG. 24 shows an example of a UI/UX based on RunningStatus according to embodiments.

FIG. 24 illustrates an operation based on the RunningStatus of FIG. 22 in relation to FIG. 23 and the like.

FIG. 24 shows a UX/UI that the receiver may implement to provide information to the user in relation to the RunningStatus element value for indicating the status of the service among the signaling schemes of USBD/USD according to embodiments.

The example of the embodiments shows that when RunningStatus is Pausing, the receiver determines that the app does not perform rendering after checking the attribute value of @appRendering, provides the pausing duration to the user using the receiver UI, and displays the score of a sporting event up to the present time on the screen using a receiver app.

In FIG. 24, operations 1 and 2 are the same as/similar to the above-described embodiments. Referring to operation 3 and subsequent processes, the reception device receiving the USBD may recognize that the running status is pausing at a duration of 30 seconds based on the information of the USBD, and display related information on the display in the form of UI/UX. For example, based on the image/icon/sound information, it may deliver information that "broadcast starts in 30 seconds" to the user. Regarding operation 4, the reception device makes a request to the server for an MPD for service 33-7, and receives the requested information as a response. Regarding the MPD, the period element contains an adaptation set, and the adaptation set element contains a representation. The representation element contains a base URL. The base URL may be composed of information such as a server address, a service ID, service category (sports), and the like. The reception device may play the sports service after 30 seconds based on the USBD and/or MPD.

Figure 25:
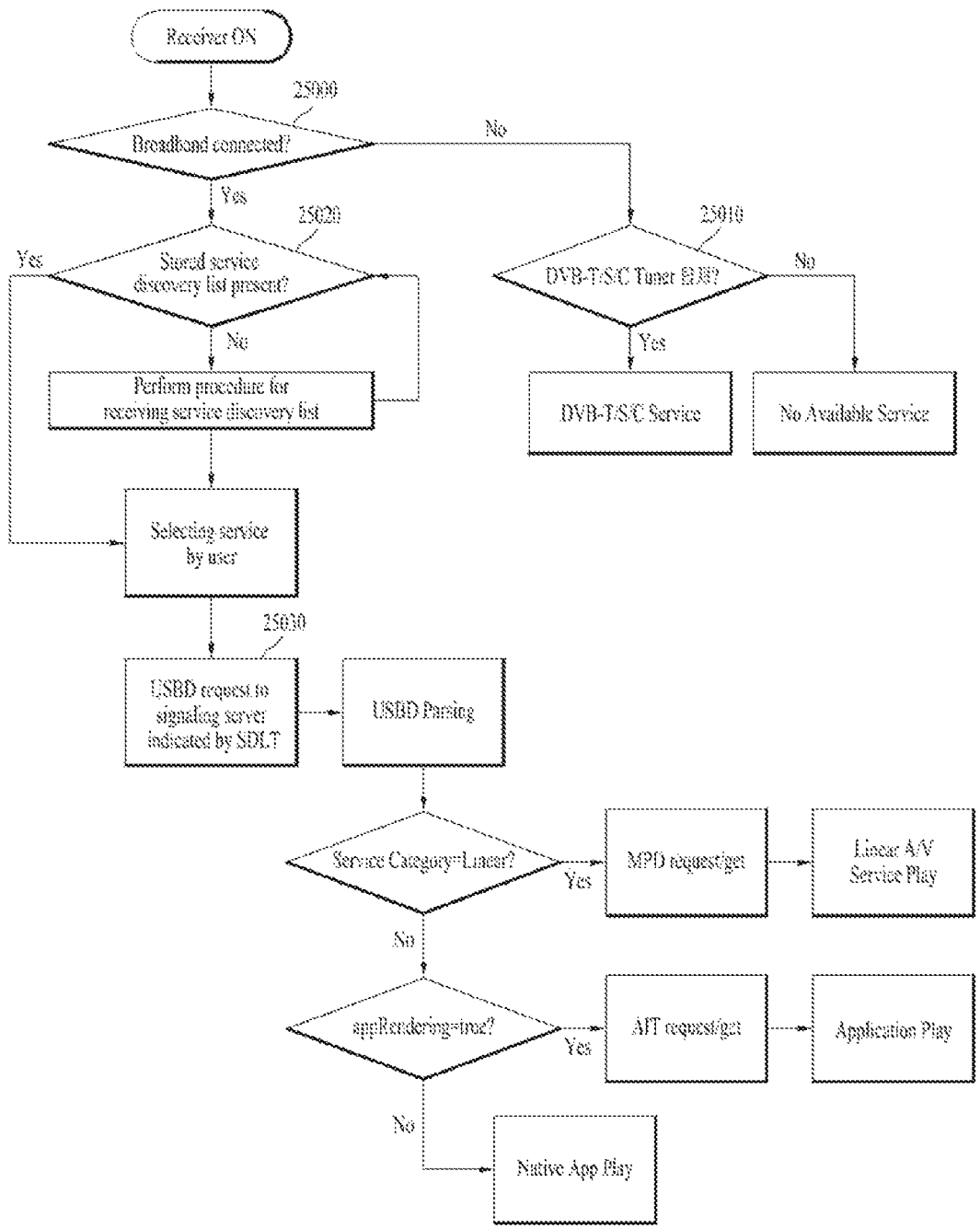
FIG. 25 is a flowchart of a USBD signaling process according to embodiments.

FIG. 25 is a flowchart of a USBD signaling process according to embodiments.

FIG. illustrates a flow in which a reception device according to embodiments acquires and plays various types of services based on the service signaling information described with reference to FIGS. 20 to 25. FIG. 25 may be combined with the flowchart of FIG. 8 and the like.

The signaling flowchart of the method/device according to the embodiments is configured as follows.

In operation 2500, the device according to the embodiments turns on the power. The reception device checks whether the device is connected to a broadband or communication network.

In operation 25010, when the reception device is not connected to the communication network such as the Internet, it checks the DVB-T/S/C tuner in the reception device or checks whether a DVB-T/S/C service can be received. When the reception device cannot receive the DVB-T/S/C service or the like, the reception device may display or notify the user that there is no available service. When a DVB-T/S/C service or the like can be received, the reception device provides the DVB-T/S/C service or the like to the user.

In operation 25020, when the reception device is connected to an Internet network or the like, it is checked whether there is a service discovery list (or information) stored in the reception device. When there no service discovery information is present in the reception device, the reception device performs an operation to acquire a service discovery list. When service discovery information is present in the reception device, the reception device receives a signal (information) for selection of a service from the user.

In operation 25030, the reception device may transmit a USBD request to the signaling server signaled (indicated) by the SDLT. The USBD request may include a case where the service category is Linear. When the service category is Linear, the reception device may make a request for an MPD to the signaling server and acquire the MPD. The reception device may play the linear A/V service based on this signaling process. When the service category is not Linear, the service signaling process may vary depending on whether the value of appRendering is TRUE or FALSE. When the appRendering is TRUE, the reception device may make a request for the AIT to the signaling server and acquire the AIT to play an application. When the appRendering is FALSE, the reception device may play a native app.

FIG. 26 shows extended syntax of a service discovery list table according to embodiments.

The SDLT of FIG. 26 may correspond to the SDLT of FIGS. 5, 6, 7, 8, 9, 13, 16, 17, 19, 23, 25, etc.

The method/device according to the embodiments may configure an SDLT for faster service discovery and service acquisition of the DVB-I service.

The embodiments propose a service discovery list table (SDLT) and USBD configuration scheme as shown in FIG. 26 in order to more quickly provide a service selected by the user from among the services that may be provided to the user through the service discovery process.

The SDLT may be essential information that the receiver must have first for service discovery. Through this signaling data, the receiver may provide service list information allowing the user to select a service. In this case, the SDLT may be configured to include more information. This configuration information has may enable a rich amount of service to be provided and enable a service to be played more quickly when a user selects the service.

When the SDLT is configured in this way, USBD in the signaling metadata of an Internet-based service may include a DeliveryMethod element value that provides information mapped to the MPD, and @serviceId and @globalServiceId information may be used as information for mapping to the SDLT and information for mapping to the ESG.

Each element of the SDLT will be described with reference to the figure.

ServiceDiscoveryListTable represents a root element.

SdltInetUrl indicates a URL for accessing signaling/ESG objects.

@urlType indicates the type of files available with this URL.

Service represents service information.

@serviceId indicates a number that uniquely identifies this service within the scope of originalNetworkId.

@globalServiceId indicates a globally unique service identifier. It is mapped to the global service ID in the ESG. For the traditional DVB/T/S/C services, this attribute may not be present.

@originalNetworkId indicates a number that uniquely identifies the original network from which this service was originally generated.

@transportStreamId indicates a number that uniquely identifies the transport stream. This attribute is present in the traditional DVB-T/S/C services. However, this attribute may not be present for the DVB-T service in ISO BMFF format.

@frequencyNum indicates a number that uniquely identifies the frequency number of the physical layer. This attribute may be present when the service is the traditional terrestrial service.

@serviceCategory indicates the category of this service. The category may be linear, on-demand, or application service.

@svcSeqNum indicates the version of service information. It may be incremented by 1 for each new version of service data in RFG.

@contentFormat indicates the format of contents of this service.

@hidden indicates whether this service is hidden in the service list or shown to users. The default value of @hidden is FALSE.

@appRendering indicates whether any application will be executed first or render this service. The default value is FALSE.

@MediaPresentationDescription is a URL pointing to MPD signaling description.

@ApplicationInformationTable is a URL pointing to AIT signaling description.

@DistributionWindowDescription is a URL pointing to DWD signaling description.

RunningStatus indicates the status of this service.

Description of attributes previously described will be omitted.

The syntax of USBD applied when an extended SDLT is used will be described below.

FIG. 27 shows syntax of a reduced USBD according to embodiments.

The USDB of FIG. 27 may correspond to the USBD of FIGS. 20, 21, 23, 24, 25, and the like.

UserServiceBundleDescription is a root element of the user service bundle description for DVB-I.

UserServiceDescription is a single instance of a DVB-I service.

The configuration of the USBD may be reduced as shown in FIG. 27. For details of each element, refers to the description above.

Figure 28:
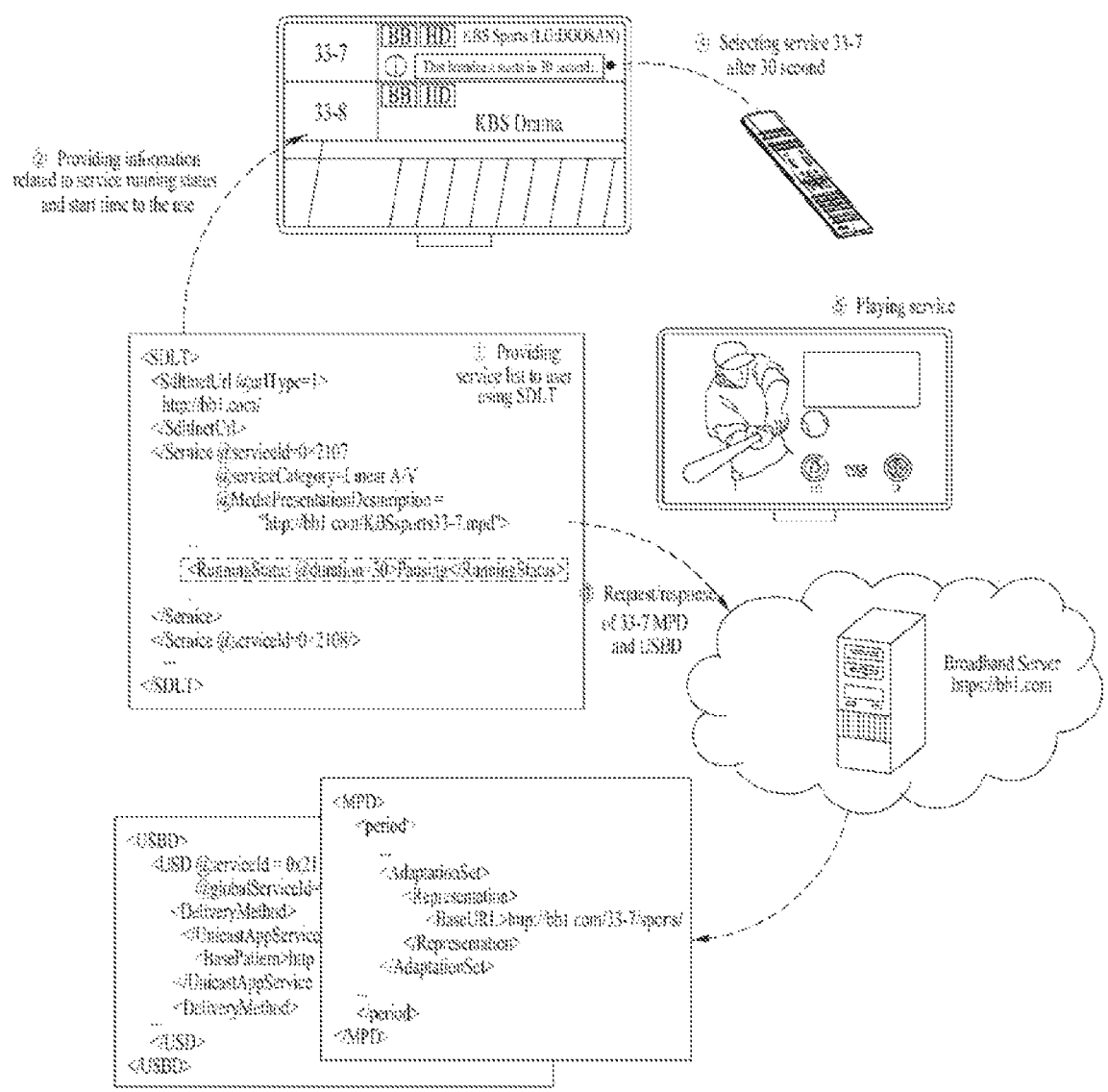
FIG. 28 illustrates a UI/UX for providing a service list and a service using an extended SDLT according to embodiments.

FIG. 28 illustrates a UI/UX for providing a service list and a service using an extended SDLT according to embodiments.

The SDLT, USBD, and MPD of FIG. 28 may correspond to the SDLT, USBD and MPD of FIGS. 5, 6, 7, 8, 9, 13, 16, 17, 19, 20, 21, 23, 24, 25, 26, 27, etc., respectively. In addition, FIG. 28 may be combined with the UI/UX implementation of FIGS. 7, 17, 23, 24, and the like.

A flowchart of service discovery using an extended SDLT by a method/device according to embodiments will be described below.

1. The reception device (corresponding to the reception device according to the above-described embodiments) provides a service list to the user using the SDLT. As described above, the SDLT includes a URL type, a service category for each service ID, media presentation description, and a running status.

2. The reception device may display service running status and start time related information on the display. The display of the reception device may display the ESG and service related information through UI/UX. For example, for channel number 33-7, information such as DVB-I content display, HD, BB, KBS SPORTS (LG vs. Doosan), "This broadcast starts in 30 seconds," and the like may be displayed.

3. The reception device may make a request for MPD and USBD for service 33-7 to the server and receive a response from the server.

4. The reception device may receive, from the user, a signal for selection of service 33-7 by the user after 30 seconds.

5. The reception device may display the service desired by the user.

Figure 29:
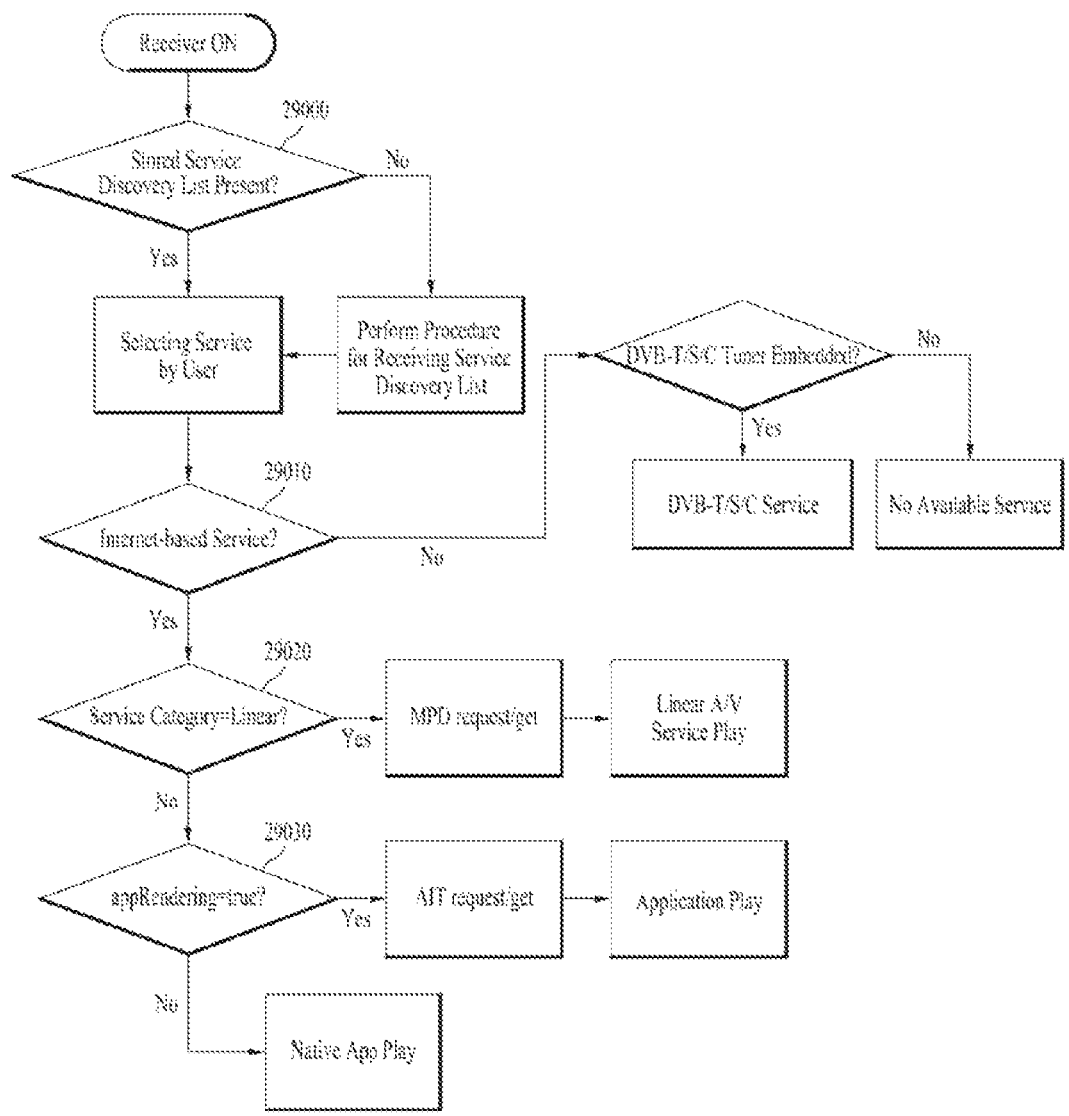
FIG. 29 is a flowchart illustrating use of an extended SDLT and a reduced USBD according to embodiments.

FIG. 29 is a flowchart illustrating use of an extended SDLT and a reduced USBD according to embodiments.

FIG. 29 is a flowchart illustrating a method of acquiring and playing service data by a reception device according to the embodiments using SDLT and USBD according to the above-described embodiments. FIG. 29 may be combined with the flowchart of FIG. 25 and the like.

In operation 29000, the method/device according to the embodiments checks whether there is a service discovery list stored in the reception device after the power of the receiver is turned on. When there is no stored list, an operation for receiving a service discovery list is performed. The reception device may acquire a service discovery list contained in a broadcast signal or may acquire a service discovery list from the server. When there is a stored list (including the service discovery information according to the above-described embodiments), the reception device receives a signal/information about a service selected by the user.

In operation 29010, the reception device checks whether the service selected by the user is an Internet-based service. When the selected service is not an Internet-based service, the device checks whether there is a DVB-T/S/C tuner in the reception device. When there is no tuner, the device informs the user that there is no service available. When there is a tuner, the reception device provides a DVB-T/S/C service.

In operation 29020, when the service is an Internet-based service, the reception device checks whether the service category is linear. When the service category is linear, the reception device transmits an MPD request to the server and receives an MPD response. The reception device plays the linear A/V service based on the MPD.

In operation 29030, when the service category is not linear, the device checks whether appRendering is true. When the appRendering is not true, the reception device plays the native app. When the appRendering is true, the reception device transmits an AIT request to the server and receives an AIT response. The reception device plays the application based on the AIT.

FIG. 30 shows syntax of a LocationInfo element indicating location information according to embodiments.

FIG. 30 shows location information that may be additionally delivered in the SDLT according to the above-described embodiments. FIG. 30 may be an example of the SDLT related to FIG. 26 and the like.

The method/device according to the embodiments may additionally signal location information for which a service may be provided.

Embodiments propose a method of including location information in service discovery signaling in order to filter a service or a service list according to a location of a receiver.

Embodiments propose a method of displaying location information as shown in FIG. 30. The location information may be indicated by various methods.

1. The LocationInfo according to the embodiments may provide region information using a registered country code and city name. Since region information recognizable by humans is provided in text, it may be provided to the user after receiver parsing even when the location information is not recognized by the receiver.

2. The LocationInfo according to the embodiments allows the information about a region in which the service is provided to be drawn in a circular shape. This allows comprehensive region information to be included by providing three kinds of simple information.

3. The LocationInfo according to the embodiments provides 4 kinds of location information by providing the latitude and longitude of the southwest end point and the northeast end point such that a rectangle may be drawn.

4. The LocationInfo according to the embodiments may provide more accurate location information by providing polygon location information allowing a polygon to be constructed.

5. The LocationInfo according to the embodiments may allow the IP of a receiver connected to the Internet to be known, and allow a corresponding service to be provided in a region of a category to which the IP address belongs.

The LocationInfo information as described above may be signaled through an SDLT according to embodiments, and may be positioned at two levels. When it is positioned under the SDLT, location information about all services belonging to the SDLT may be provided. When the LocationInfo is positioned under the Service, it may provide information about a location at which the corresponding service may be provided. When different information is provided in the region information presented in the SDLT and the Service, the location information provided in the Service takes precedence.

FIG. 31 shows an SDLT including location information according to embodiments.

FIG. 31 shows a specific example of the SDLT of FIG. 30 and the like.

LocationInfo: an element that may indicate various types of location information. It indicates location information corresponding to all services included in the SDLT.

The LocationInfo 31000 may be signaled as information common to the entire service list signaled by the SDLT.

The LocationInfo 31000 may be provided for each service signaled by the SDLT.

Figure 32:
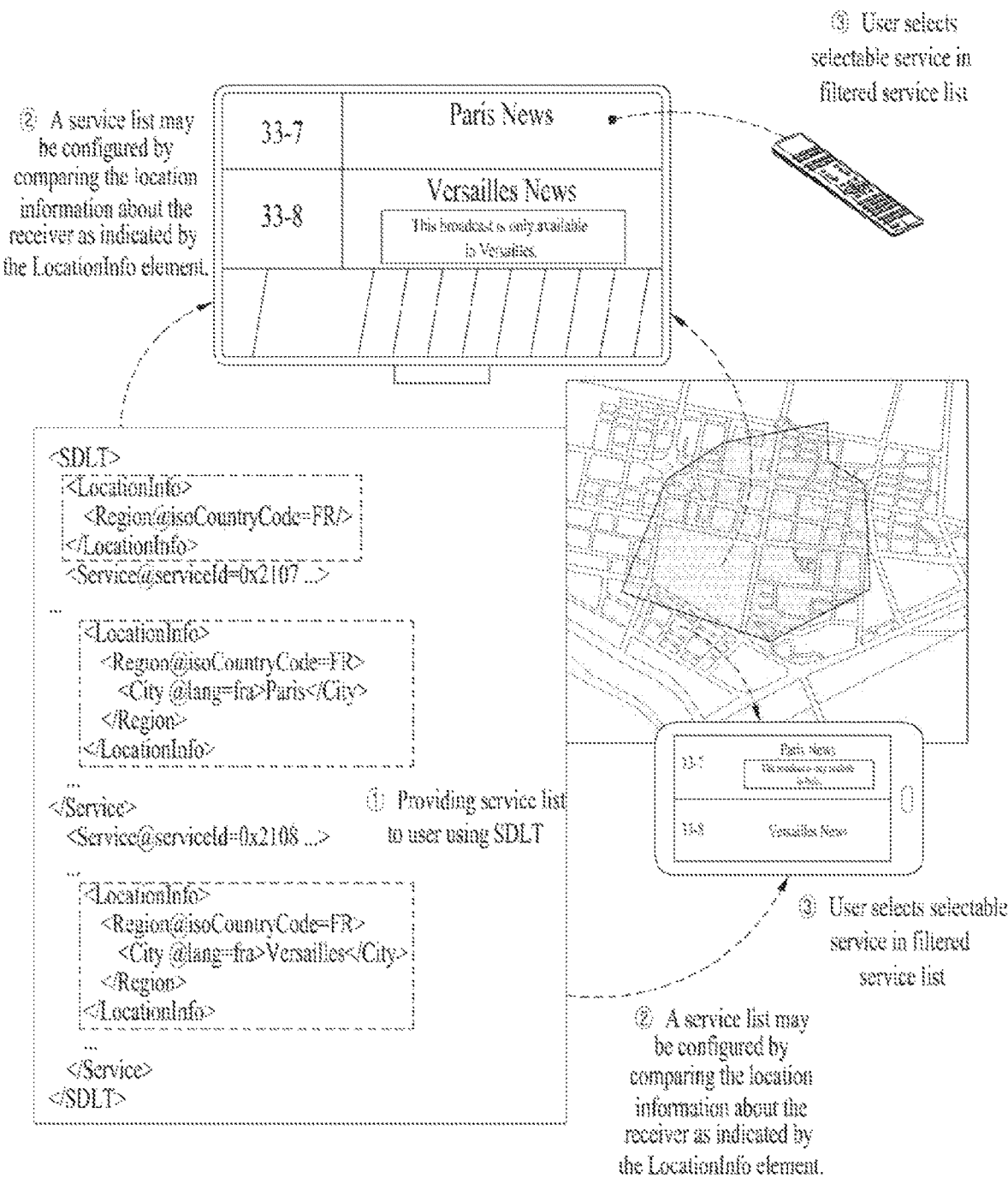
FIG. 32 illustrates an example of an SDLT providing area information and operation of a receiver according to embodiments.

FIG. 32 illustrates an example of an SDLT providing area information and operation of a receiver according to embodiments.

FIG. 32 illustrates a UI/UX operation implemented based on the SDLT related to FIG. 31 and the like.

FIG. 32 shows a flow in which a reception device provides a region-based service using an SDLT including LocationInfo (which may be referred to as location information, region information, or the like).

A method of configuring the UX/UI and SDLT according to the embodiments is described below.

FIG. 32 shows an example of the configuration of an SDLT including region information. For example, when two services provided in France by broadcast are services provided only in different cities, the respective pieces of region information are signaled under the SDLT and the Service. The receiver having acquired the SDLT may show a service list to the user according to the information provided. In this case, the receiver capable of extracting information on which the receiver is located may show a filtered service list to the user according to the location information provided by the SDLT.

The operation of the method/device according to the embodiments is performed in a flowchart as follows.

1. The reception device (including the reception device of the above-described embodiments) provides a service list to the user using the SDLT. The SDLT according to embodiments may further provide LocationInfo.

2. The reception device may check information on which the receiver is located based on the LocationInfo element, configure a service list through comparison and display the configured service list on the display. For example, service 33-7 is Paris News, and service 33-8 is Versailles News. Here, the Versailles news may be news that may be viewed only in the Versailles region. Based on the SDLT, the reception device may provide the user with "this broadcast is available only in the Versailles region" as 33-8 service guide information.

The reception device includes a TV or a mobile device. In this case, the reception device may compare the location of the mobile device (or TV) with the location information of the LocationInfo based on the information indicated by the LocationInfo element, and may display a service list reflecting the comparison result.

3. The reception device may receive, from the user, a signal for a service selected by the user in the filtered service list. The user may select a selectable service in the filtered service lists.

Figure 33:
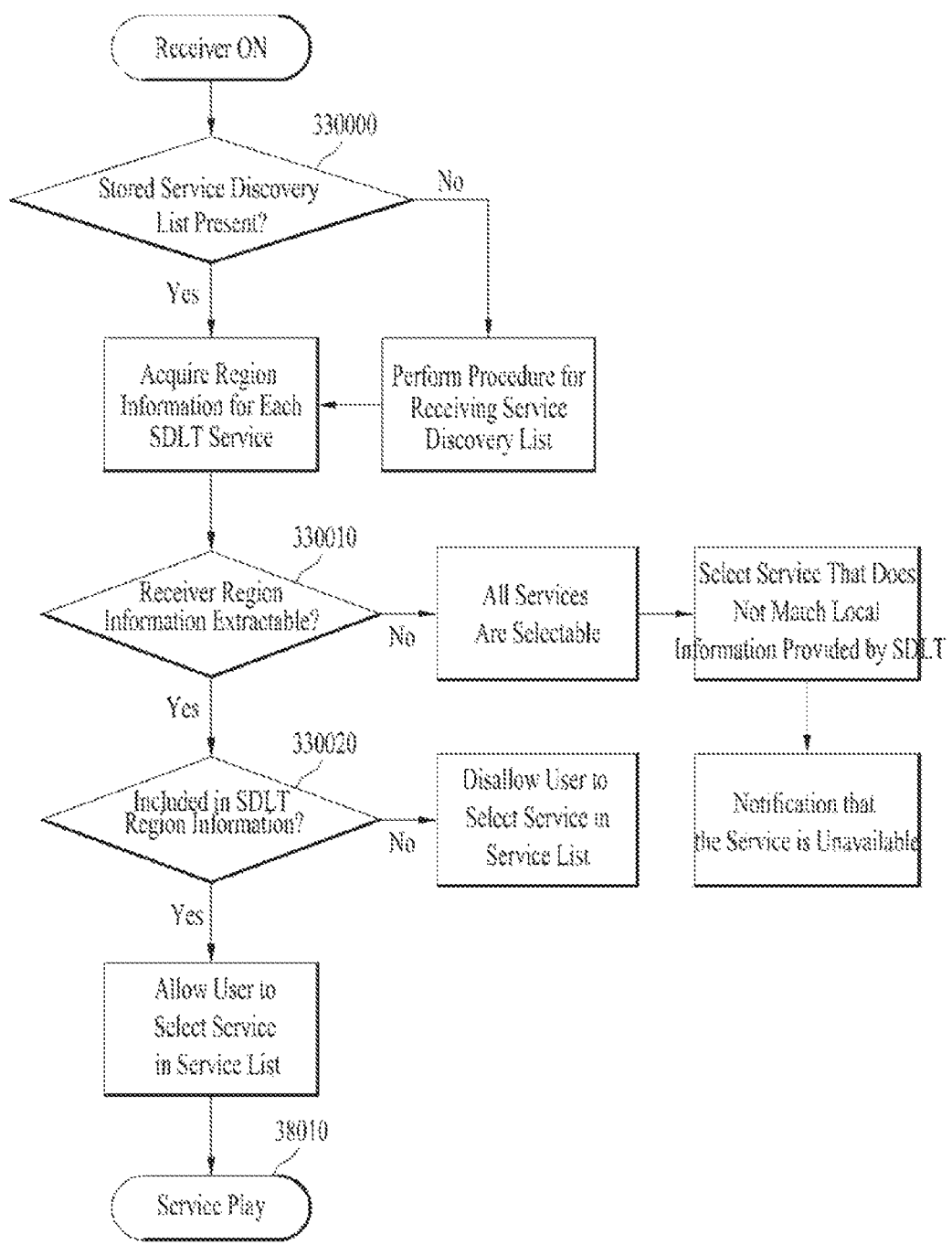
FIG. 33 is a flowchart of a receiver through provision of region information according to embodiments.

FIG. 33 is a flowchart of a receiver through provision of region information according to embodiments.

FIG. 33 is a flowchart of a receiver providing service information based on the SDLT related to FIG. 31 and the like. FIG. 33 may be combined with flowcharts related to FIG. 29 and the like.

Operations in this flowchart that are the same as/similar to the above-described operations may be omitted or briefly described, and reference may be made to the description of the operations disclosed above.

In operation 33000, when the power of the receiver (reception device) is turned on, the receiver checks whether there is a stored service discovery list. When there is a stored service discovery list, the receiver acquires region information for each SDLT service.

In operation 330010, the receiver checks whether receiver region information can be extracted. When the region information cannot be extracted, the receiver may select any services. When the user selects a service that does not match the local information provided by the SDLT, the receiver notifies the user that the service is not available.

In operation 330020, the receiver extracts the receiver region information, and checks whether the receiver region is included in the SDLT region information. When the location is not included, the receiver notifies the user such that the user cannot select a service in the service list. When the location is included, the receiver notifies the user that the user can select a service in the service list, and plays a service corresponding to the user selection.

Figure 34:
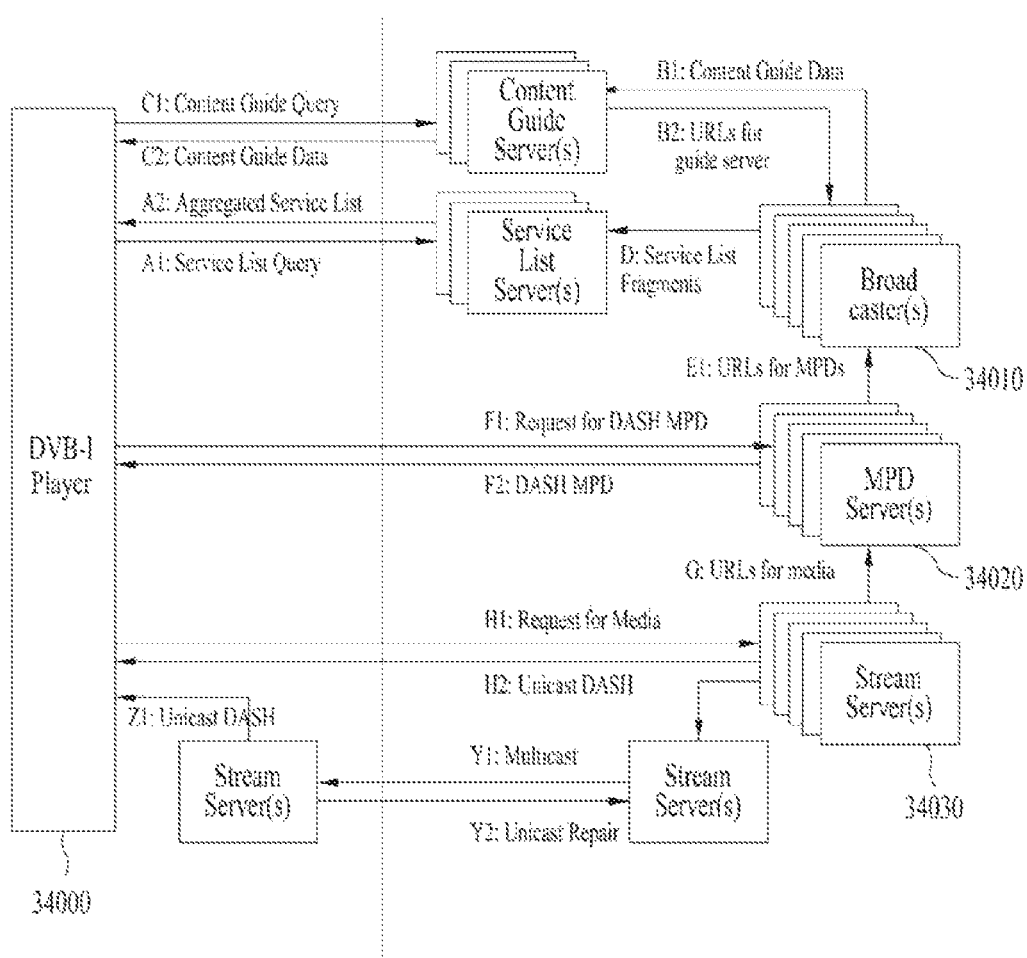
FIG. 34 shows an example configuration of DVB components and interfaces related to an device according to embodiments.

FIG. 34 shows an example configuration of DVB components and interfaces related to a device according to embodiments.

The DVB-I player 34000 of FIG. 34 may correspond to the reception device according to the embodiments. FIG. 34 shows a flowchart in which a reception device acquires service signaling information and the like from servers. The DVB-I player 34000 may correspond to is a reception device corresponding to the DVB-I transmission of FIG. 1, the TV 20000 of FIG. 2, the mobile device 40020 of FIG. 4, the computer 40030 of FIG. 4, the TV 40040 of FIG. 4, the set-top box or second device 40050 of FIG. 4, the mobile device 60000 of FIG. 6, the TV of FIGS. 7, 17, 23, 24, 28, 32, 57, 86, and 87, the mobile device of FIGS. 16 and 19, the reception device of FIG. 58, the device for the DVB-I client 75000 in FIG. 75, the reception device of FIGS. 77 and 89, and the like.

The method/device according to the embodiments may implement a method of receiving DVB-I aggregated service list signaling.

In the above, a query form for requesting a DVB-I service description over the broadband network has been defined. A DVB-I terminal sends a query through a pre-provisioned URL and receives an aggregated service list including all DVB-I service lists.

FIG. 34 is a diagram illustrating a process of performing DVB-I service discovery and receiving content. On the interface B, a service list query is sent at regular intervals and a service list is received. For example, a broadcaster 3410 or a transmission device 34010 corresponding to a reception device 34000 according to embodiments may transmit content guide data B1 and/or URLs B2 for the content guide server to the content guide server(s). The transmission device 34010 may transmit service list fragments D to the service list server(s). The reception device 34000 (DVB-I player) may transmit a content guide query C1 to the content guide server(s) and receive content guide data C2 from the content guide server(s). The reception device 34000 may transmit a service list query A1 to the service list server(s) and receive an aggregated service list A2 from the service list server(s).

The interface C is a process in which the reception device 34000 receives a content guide through SdltInetUrl or SvcInetUrl defined in the aggregated service list table, or through a pre-provisioned URL. The received content guide is aggregated with the existing broadcast channel into a specific logical channel to show a service. The content/service provider provides content guide data to allow the DVB-I terminal 34000 to access the content guide server. In addition, a service list fragment is periodically provided through the interface D at regular intervals to allow the DVB-I terminal to receive the aggregated service list. The reception device 35000 requests an MPD through an MPD URL defined in the received aggregated service list table and receives a desired linear service.

The broadcaster/transmission device 34010 receives URLs for MPDs from the MPD server(s) 34020 (E1). The MPD servers 34020 receive (G) URLs for media from the stream server(s) 34030. The reception device 34000 transmits a request F1 for DASH MPD to the MPD server 34020 and receives DASH MPD F2 from the MPD server 34020.

The stream server 34030 receives a request H1 for media from the reception device 34000 and transmits unicast DASH H2 to the reception device 34000. The stream server 34030 may be connected to a multicast server. The reception device 34000 may be connected to a multicast gateway. The multicast gateway and the multicast server are used to transmit multicast Y1 and to exchange unicast repair Y2. The reception device 34000 receives unicast DASH Z1 from the multicast gateway.

Figure 35:
FIG. 35 shows a metadata envelope for receiving a service list according to embodiments.

FIG. 35 shows a metadata envelope for receiving a service list according to embodiments.

FIG. 35 shows a configuration of the metadata envelope of FIGS. 18 and 19.

In FIG. 35, the DVB-I terminal should periodically send an HTTP request query for requesting an aggregated service list through the interface A, and should check whether the received response information is the latest information. However, there is no information for determining whether the response according to the query is the latest version information. Thus, embodiments additionally proposed a method of quickly checking whether the response information is the latest information and determining whether to receive and parse the information.

Metadata Envelop: When the method/device according to the embodiments sends an HTTP request and receives an HTTP response thereto, it must be allowed to check whether the returned response meets the sent request. Second, the embodiments intend to ensure that the latest information may be acquired in the fastest time. Third, the aggregated service list should have multiple service lists, such that only the latest information is identified.

An HTTP response including a DVB-I service aggregated service list signaling object is carried in the metadataEnvelope structure, and each service list is transmitted for each multipart/related container of RFC 2387, for example. The metadataEnvelope is not attached to each service list, but is positioned at the top and references each fragmented service list. The metadataEnvelope of DVB-I service signaling according to the embodiments is composed of metadataEnvelopeType as shown in FIG. 36, and the type is defined by the following schema.

For example, the metadataEnvelope may have an XML format, and a service list may be transmitted for each multipart container.

FIG. 36 specifically shows a metadata envelope according to embodiments.

FIG. 36 corresponds to the metadata envelope described in FIGS. 18, 19, 35, and the like.

Through the interface A1 of FIG. 34, a query in the form of an HTTP request is sent to the service list server, and a service list aggregated in the form of a metadata envelop as shown in FIG. 35 is received as received data The metadataEnvelope is composed of a sequence of item elements. Each item represents a respective signaling object. The item element is defined by metadataEnvelopItemType.

metadataURI indicates the address of the aggregated service list, and "version" and "validfrom"/"validUntil" indicate the valid time of the document/information. ContentType specifies an identifier of a specific service in the currently included aggregated service list.

The string of ContentType has a template form as shown below, and the information has a unique value for each service:

ContentType="Application/DITS-(OriginalNetworkID)-(TransportStreamID)-(serviceID)+xml"

Through this information, the version information of a service changed in the aggregated service list may be checked, and then updated information may be acquired. Accordingly, the reception method/device according to the embodiments may search for and update only a changed value of a specific service without receiving the entire service list.

nextUrlAvailableTime: indicates a possible start time for making an HTTP request to the broadband server through nextUrl pointing to signaling of the next version. This attribute is proposed to reduce the request error of receivers that acquire a signaling object through the request/response process over the broadband network. The best time is calculated according to an implementation algorithm of the receiver in the duration between the value of this attribute and the attribute value of validUntil to reduce the probability that a response fails to be received due to concentration of receiver requests.

nextUrl: indicates a broadband URL address value pointing to a signaling object of the next version.

FIG. 37 shows a DITS service discovery metadata envelop according to embodiments.

FIG. 37 shows a configuration in which a container of a metadata envelope related to FIGS. 18, 19, 35, 36, etc. has an identifier, a type, a content type, and a metadata URI.

The metadata envelope of FIG. 37 is a service list metadata envelope configured when a service list fragmented for each unique service is carried in a multipart/related container. contentType of each service is encoded and transmitted as (OriginalNetworkID)-(TransportStreamID)-(serviceID), which is unique information in DITS. Versioning and expiration management including the information and version information may be performed. When necessary, the multipart/related container content ID/content-type value may be checked and only corresponding information may be received.

FIG. 38 shows an extension of an SDLT according to embodiments.

FIG. 38 shows an example extended syntax of the SDLT according to the above-described embodiments (FIG. 26, etc.). For details of elements described above, refer to the above description.

In the method/device according to the embodiments, a service discovery list table (SDLT) and USBD configuration scheme is proposed in order to more quickly provide a service selected by the user from among the services that may be provided to the user through the service discovery process.

The SDLT may be essential information that the receiver must have first for service discovery. Through this signaling data, the receiver may provide service list information allowing the user to select a service. In this case, the SDLT may be configured to include more information. This configuration information has may enable a rich amount of service to be provided and enable a service to be played more quickly when a user selects the service.

There are two ways to select a linear channel in providing DVB-I service. The user may directly select a channel number or select a channel through channel surfing. Considering the characteristics of the DVB internet channel, unicast may be received based on an HTTP network, or a linear channel service may be provided in the form of multicast. DVB-I is a subscription/streaming type on the Internet, unlike the reception of a channel, which is a DVB broadcast, for an unspecified number of users through a dedicated frequency and logical channel, and thus it requires channel management through the hidden/inactive modes of the channel.

The extended syntax of the SDLT according to the embodiments further includes the following values: @hidden (indicating whether the service is hidden or shown to users, and has FALSE as a default value), @selectable (indicating selection possibility), @hidden(visible)_guide, @hidden(visible)_presentation (a hidden channels may be signaled through a combination).

FIG. 39 shows an example of channel management according to embodiments.

FIG. 39 shows the hidden element of FIG. 38;

For example, the broadcast network ATSC 1.0 may define channel management as follows.

@hidden: A boolean value indicating whether a logical channel is visible or hidden. It indicates the visible or hidden attribute when a user searches for the logical channel or directly selects a channel entry.

@hide_guide: A boolean value indicating whether a logical channel is visible or hidden in the EPG. It indicates the visible or hidden attribute of a channel guide for the user.

This method is an RF broadcasting environment-based channel management method, and channel management should be manually performed based on only the information in the service list. However, in the DVB-I environment, a return channel exists, and thus there may be various channel management methods.

In embodiments, when a channel is hidden/inactive in a DVB-I environment, a user may determine the existence/status of the corresponding channel using the return channel, and the hidden/inactive channel of an existing broadcast may be easily managed through an alternative service.

In the case of hide_guide (=1) and Hidden (=1), an indication that that the app service is accessible may be additionally signaled.

FIG. 40 shows values of hidden (visible)_presentation according to embodiments.

Regarding the technical issue described in FIG. 39, the following added elements may be used.

@Hidden(visible): A boolean value indicating whether a logical channel is visible or hidden. It indicates the visible or hidden attribute when a user searches for the logical channel or directly selects a channel entry.

@selectable: When this is set, a hidden service may be selected by direct input to the logical channel number. When the value is false, the hidden service cannot be selected even when the user directly inputs the hidden service.

@hidden_guide: When a channel is directly accessed in a hidden channel state, @hidden_guid may guide the state in the channel or display an alternative screen through a link. There may be type values indicating various types of channel guide methods.

@hidden(visible)_presentation: defines corresponding anyURI information according to a type value defined through hidden_guide.

FIG. 40 shows types of hidden guides related to hidden presentation.

When the type is 0x0001, it indicates an alternative link of a service provider, and the hidden presentation may provide a connection address, for example, www.bbc.co.kr/alternative/music.

When the type is 0x0002, it indicates a linked service of an alternative channel, and the hidden presentation may signal a DVB triplet, for example, DITS-(OriginalNetworkID)-(TransportStreamID)-(serviceID).

When the type is 0x0003, it indicates a stereoscopic channel guide, and the hidden presentation may signal a DVB triplet, for example, DITS-(OriginalNetworkID)-(TransportStreamID)-(serviceID).

When the type is 0x0004, it indicates an ESG or broadband content guide (BCG) link, and a hidden presentation may signal loginformDB.html.

When the type is 0x0005, it indicates an alternative app service, and the hidden presentation may signal an app dedicated channel. Thus, the reception device may access the app using the AIT.

Figure 41:
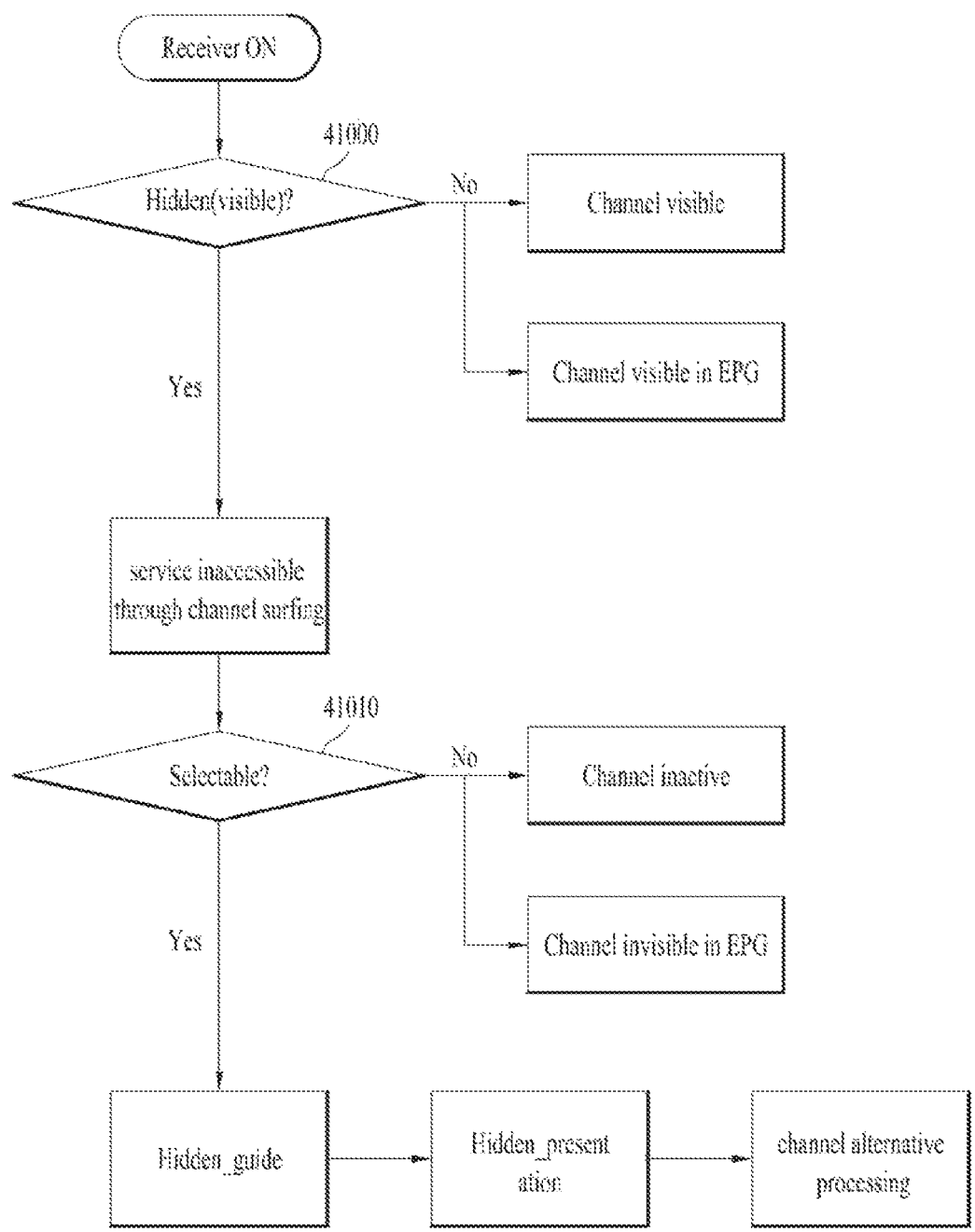
FIG. 41 is a flowchart of hidden channel management according to embodiments.

FIG. 41 is a flowchart of hidden channel management according to embodiments.

FIG. 41 is a flowchart illustrating processing of a channel based on the hidden channel related to FIGS. 38 to 40.

The operation of the above-described embodiments will be described with reference to the flowchart as follows.

In operation 41000, when the power of the reception device is turned on, the reception device checks whether the channel/service is hidden. When the channel/service is not hidden, the reception device indicates a visible channel and a visible channel guide on the display.

In operation 41010, when there is a hidden channel/service and channel surfing is impossible, the reception device checks whether the channel is selectable. When the channel is not selectable, the reception device notifies the user that the channel is inactive and the channel guide is not visible. In the case of YES for selection possibility, the reception device may generally process/display the hidden channel based on the hidden guide and the hidden presentation.

Figure 42:
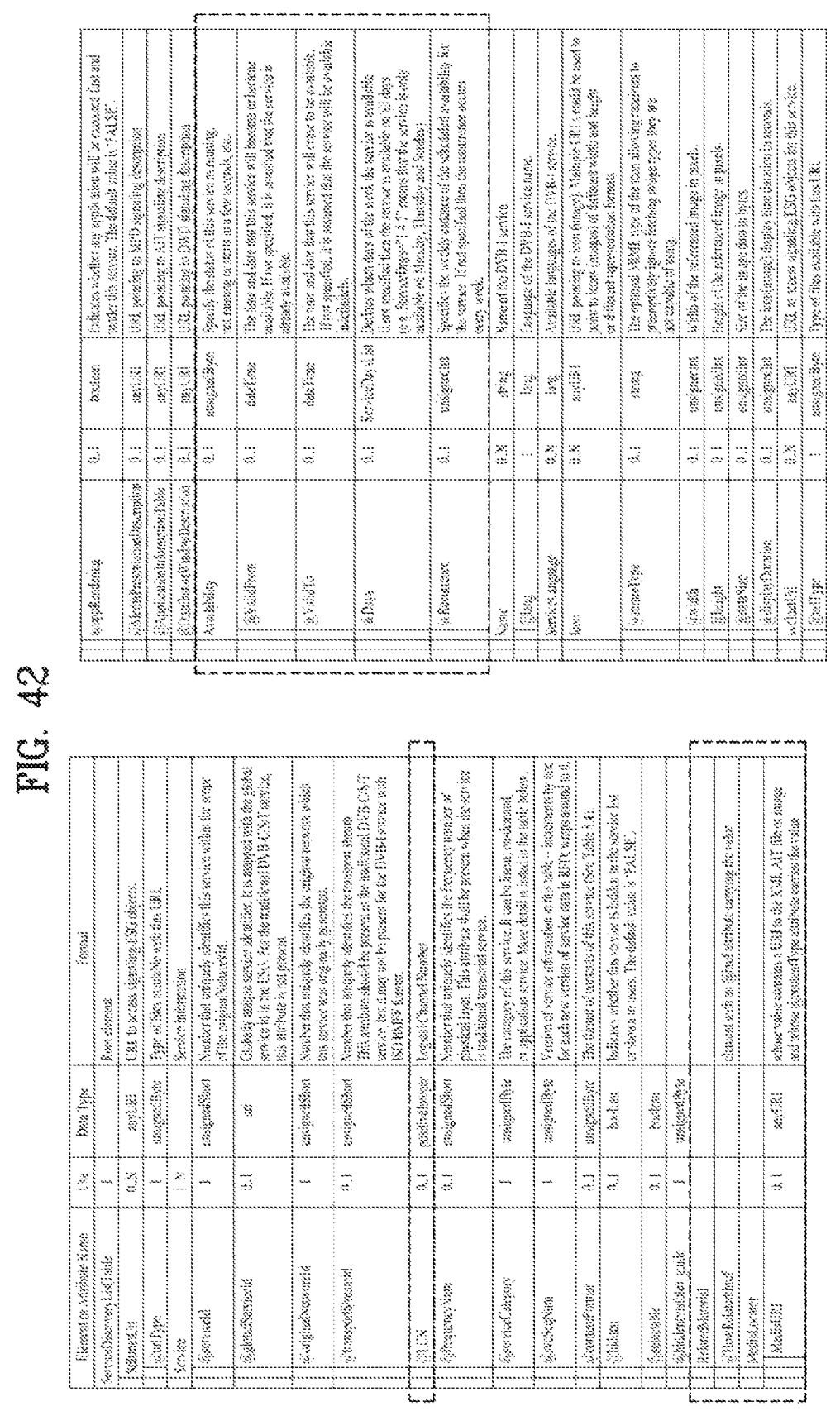

FIG. 42 shows an example of an SDLT including RelatedMaterial according to embodiments.

FIG. 42 shows the syntax of an SDLT related to FIG. 38 and the like.

A method of providing a service related material when a DVB-I part-time service is provided and the service is inactive will be described with reference to FIG. 42.

As described above, the DVB-I service may provide an Internet linear channel, and in a service discovery process, a service may be provided in a part-time form in a specific LCN. In order not to cause confusion when the user selects directly a service through a channel number in the outside of service state, channel change API may be executed through an inactive service banner image or an additional application, or additional VoD service may be provided. In this regard, a hierarchy that fits the real practice is proposed by applying a datatype value that is actually used in the industry.

The SDLT of FIG. 42 may correspond to the SDLT according to the above-described embodiments, and added elements/fields will be described as follows.

@LCN indicates a logical channel number.

RelatedMaterial may further include the following elements.

@HowRelated:href may be delivered together with an @href element carrying a value.

MediaLocator may carry information about the location of the media. Specifically, MediaURI may be a value containing a URI for an XML AIT file or image, and @contentType may carry the value.

Availability indicates the status of this service (running, not running or starts in a few seconds, etc.).

@ValidFrom indicates the time/date when this service becomes valid. When this value is not specified, it may be assumed that the service is already available.

@ValidTo indicates the time/date when this service will expire. When this value is not described, it may be assumed that this service is available indefinitely.

@Days indicates days of the week on which the service is available. When not specified, the service is available on all days. For example, ServiceDays="1 4 7" indicates that the service is only available on Monday, Thursday and Saturday.

@Recurrence indicates the weekly cadence of the scheduled availability for the service. When not specified, the recurrence occurs every week.

FIG. 43 shows an example of use of the Related Material according to embodiments.

FIG. 43 shows a detailed syntax of the related material of FIG. 42.

The receiver according to the embodiments signals an actual valid time of the part-time service through the attributes in the <Availability> element, and checks the inactive period. The screen displayed on the LCN during the period may show the inactive state as an attribute defined in the element of <RelatedMaterial>. @MediaURI is the same attribute as the above-described hidden(visible)_presentation URI and conforms to HbbTV(AIT) app signaling and app life-cycle. When it is omitted, an inactive alternative service may be provided through the URI defined in @ApplicationInformationTable. When the content_type of @MediaURI is "image/png", the inactive service banner may be indicated. An inactive service may be provided through an image and app signaling according to content_type in the @MediaURI attribute.

For example, according to @MediaURI, the reception device may provide an inactive state based on the image (image/png) (banner) of http://img-ctv.digitaluk.co.uk/channel7/service_a_linear.png.

According to @MediaURI, the reception device may provide an inactive state based on application/vnd.dvb.ait+xml(application) of http://www.channel9.co.uk/player/ait.aitx?channel=channela.

Figure 44:
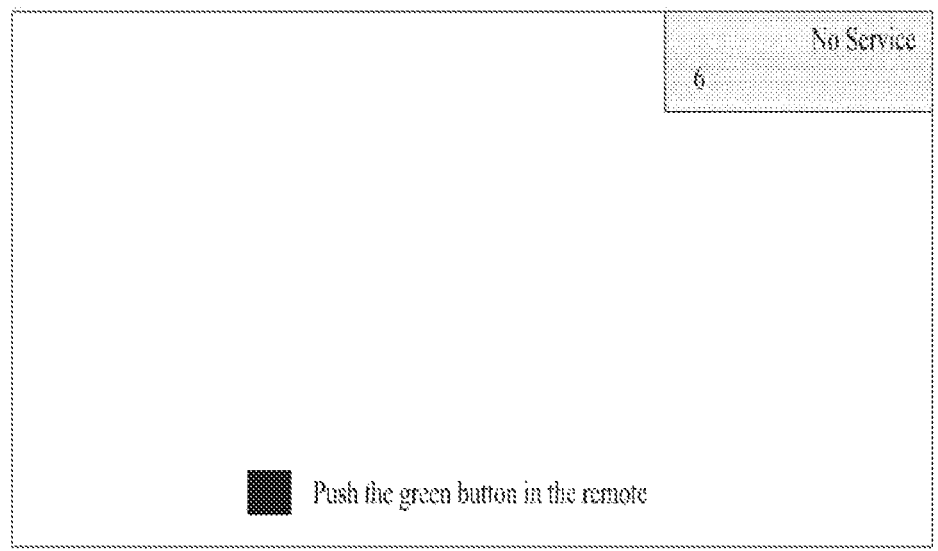
FIG. 44 shows an example of use of an inactive banner according to embodiments.

FIG. 44 shows an example of use of an inactive banner according to embodiments.

FIG. 44 may be included in the example of channel management in FIG. 41 and the like.

FIG. 44 shows a UI/UX that may be applied on a specific logical channel number (LCN) in an inactive service. The reception device may display an ESG 44000 on the display. In the case of LCN 6 on the UI/UX of the ESG 44000, the reception device may provide an alternative application such as a "No service" banner indicating "No service" as a current state (44010). The alternative application may be executed on the blank screen, or the reception device may receive a signal for selecting an alternative application by a user through a remote controller, and execute an operation related thereto.

Figure 45:
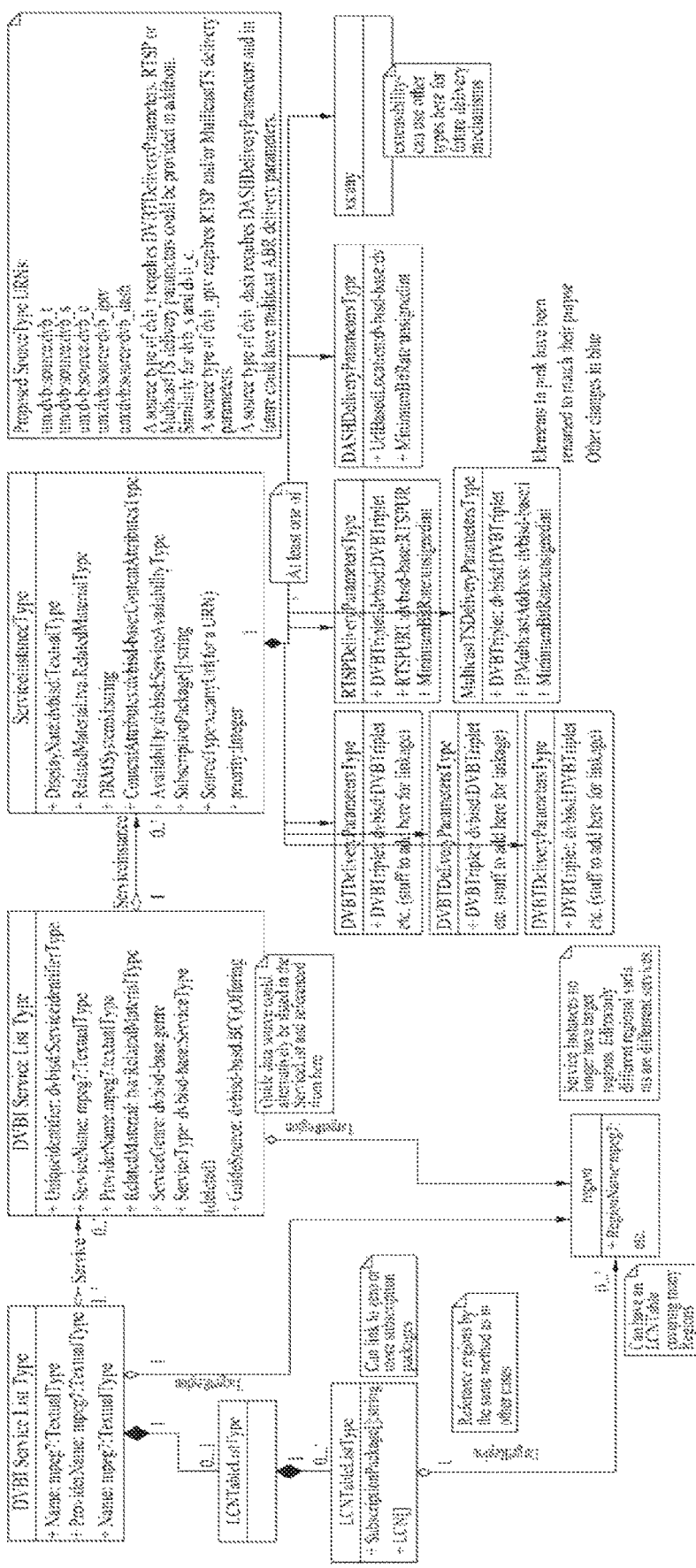
FIG. 45 shows a hierarchical structure of a service list according to embodiments.

FIG. 45 shows a hierarchical structure of a service list according to embodiments.

The service list hierarchical structure of FIG. 45 is for the service scenario of FIG. 1.

The transmission device generates service information as shown in FIG. 45, and the reception device acquires service-related information (e.g., service list information, content guide information, etc.) based on the service information as shown in FIG. 45.

The DVB-I service list may contain respective services, and each service may contain service instances. Multiple service instances may be defined according to each delivery network, and uniqueness may be distinguished according to the URN of source_type.

The DVB service list type 45000 may reference the DVB-I service type 45010 for each service. The DVB-I service type 45010 signals a related material and a guide source. The DVB-I service type 45010 may reference the service instance type 45020 for each service instance. The service instance type 45020 signals a subscription package for the related material and a source type for URN. The service instance type may reference at least one of a delivery parameter type for DVB T/S/C, an RTSP delivery parameter type, a multicast delivery parameter type, or a DASH delivery parameter type.

The proposed source type URNs 45030 provide URNs for DVB T/S/C/IPTV/DASH, etc.).

The DVB service list type 45000 references the LCN table list type, and the LCN table list type references the LCN table type. The LCN table type, the DVB service list type 46000, and the DVB-I service type 45010 may reference REGION. Related region information may vary among services.

Details of the elements of FIG. 45 will be described with reference to each of the subsequent drawings.

FIG. 46 shows a DVB-I service list type according to embodiments.

The DVB-I service list type 45010 hierarchically expressed in FIG. 45, will be described in detail.

The DVB-I service list has a type of "dvbisd:DVBiServiceListType", and has attributes for each sequence.

TextualType, RelatedMaterialType, which is additionally signaled, RegionListType for region information, LCNTableListType for a logical channel number, and the like may be signaled for each sequence.

FIG. 47 is a table representation of a DVB-I service list type according to embodiments.

In FIG. 47, ServiceList, which corresponds to the ServiceList shown in FIGS. 45 and 46, is a list of details and locations of IP services offered by the service provider. The service provider may divide their services into multiple service lists. This attribute is mandatory.

Name is the name of a service list in a readable form. Multiple service list names may be expressed in different languages. This attribute is mandatory.

ProviderName is the name of the provider of the readable service list. Multiple values for the provider name may be described in different languages. This attribute is mandatory.

RelatedMaterial indicates an additional material related to the service. This attribute is optional.

RegionList is a list of geographic regions with logical identifiers that are used to provide regional information of services in the service list or the service list. This attribute is optional.

TargetRegion represent the identifiers of the regions specified in the RegionList for which this service list is targeted. This attribute is optional.

LCNTableList is a list of tables that define regionalized and packaged logical channel numbers for the respective services. This attribute is optional.

Service represent services that are part of the service list. This attribute is optional.

@version is the version number of the service list. The value is incremented for every published change. This attribute is mandatory.

FIG. 48 shows a DVB-I service type according to embodiments.

The DVB-I service type described above may be expressed as shown in FIG. 48.

For each sequence, The DVB-I service type may have UniqueIdentifier and ServiceInstance, and provide TargetRegion, a name for a signaled service (ServiceName), a service provider (ServiceName), RelatedMaterial, which is additional information, genre about this service (ServiceGenre), a specific type of this service (ServiceType), recording related information about this service (RecordingInfo), and a guide source of this service (GuideSource).

FIG. 49 shows a DVB-I service type according to embodiments.

The DVB-I service type of FIG. 49 describes the service type of FIG. 48 in the form of a table.

UniqueIdentifier is the unique ID of the service. This ID may never be changed for a service. Other parameters of this service may be changed. This attribute is mandatory.

Service Instance is an instance having A/V content for this service. When multiple elements of the type of this attribute are present and available, the one with a lower value of the @priority attribute may have a higher priority (or vice versa). All service instances for a given service may have the same content. This attribute is optional.

TargetRegion is the regions where the service is received. When not specified, no region constraints exist. This attribute is optional.

ServiceName is the name of the service. Service names may be specified in various languages. This attribute is mandatory.

ProviderName is the readable provider name of this service. This element may be specified in various languages and is mandatory.

RelatedMaterial is an additional material related to the service. The material may include, for example, out of service banners, service related applications, and service logos. This attribute is optional.

ServiceGenre is the genre of the service. ServiceGenre is optional.

ServiceType is the type of service (refer to the description in ETSI EN 300 468). ServiceType is optional.

RecordingInfo is information allow a DVB-I client to determine whether or not the content from this service is recorded, time-shifted, or redistributed. RecordingInfo is optional.

GuideSource is the details of a broadband content guide carrying metadata for this service. GuideSource is optional.

@version is the version number of this service. It is incremented for every published change. @version is mandatory.

FIG. 50 shows a DVB-I service type according to embodiments.

FIG. 50 shows a detailed form of the service instance type 45020 of FIG. 45.

For example, for each service instance type, DisplayName, RelatedMaterial, DRMSystemId, ContentAttribute, Availability, SubscriptionPackage, FTAContentManagement, and various parameters as shown in FIG. 45 may be carried.

FIG. 51 shows a table representation of a service instance type according to embodiments.

Elements of the service instance type will be described with reference to FIGS. 50 and 51.

DisplayName is a readable name of the service associated with a specific service location. Multiple service names may be specified in various languages. When not present, the ServiceName field may be used. This attribute is optional. In the present disclosure, an attribute may correspond to an element, a field, information, or a value according to a level, and may be referred to by various terms.

RelatedMaterial is an additional material related to the service. Specifically, it may include a no-service banner, service related applications, service logos, and the like. A related material with a specific value of the attribute HowRelated, which is provided within a ServiceInstance element, supercedes any corresponding related material with the value of HowRelated provided within a Service element. This element is optional.

DRMSystemId indicates any content projection schemes used for the service. The value may be the same as the @schemeIdURI defined in document DVB A168. This value is optional.

ContentAttributes may refer to Annex D.1.3.2 of ETSI TS 103 205. This value is optional.

Availability indicates the period in time when this service location is expected to be active. This value is optional.

SubscriptionPackage specifies a subscription package in which this service is included. This value is optional.

FTAContentManagement: DVB-I service instances that do not use DRM may carry an FTAContentManagement element to define the content management policy for the ServiceInstance. The semantics of each attribute may be specified in the corresponding fields of FTA_content_management_descriptor, which is a descriptor in document ETSI EN 300 468. This value is optional.

SourceType identifies the primary delivery source for this service instance. SourceType determines the required delivery parameters. This value is optional.

DVBTDeliveryParameters provides delivery parameters for DVB-T serviceS.

DVBSDeliveryParameters provides delivery parameters for DVB-S services.

DVBCDeliveryParameters provides delivery parameters for DVB-C services.

RTSPDeliveryParameters provides delivery parameters for RTSP-based services.

MulticastTSDeliveryParameters provides delivery parameters for services delivered using multicast UDP.

DASHDeliveryParameters( ) provides delivery parameters for services using DVB DASH delivery.

SATIPDeliveryParameters provides parameters that a DVB-I client supporting SATIP may use to receive a service instance from an SATIP server.

The above-mentioned parameters may be described according to the SourceType.

@priority indicates the priority of this service instance relative to the other service instances of the service. This value is optional.

FIG. 52 shows an extension of DASH delivery parameters for simulcast according to embodiments and a table representation of the DASH delivery parameters for simulcast according to embodiments.

FIG. 52 shows a detailed syntax of the DASH delivery parameters of FIG. 51;

DASHDeliveryParameters according to the embodiments may be additionally extended for simulcast.

UriBasedLocation may refer to Annex D.1.3.2 of document ETSI TS 103 205. It is mandatory. When the DASH service is simulcast, this value may provide location information based on the URI.

MinimumBitRate indicates a threshold bit-rate under which an alternative service for the same service should be preferred. This value is optional.

As a child element of the DVB-I service type, a service interface may be provided according to the delivery network. a client may consider each @priority and device capability and The reception device May determine a service instance.

Here, @minimumBitrate indicates throughput in terms of a network stack for receiving a stream within a service instance.

For example, @minimumBitrate according to the embodiments may indicate throughput in terms of a network stack for receiving a stream within a service instance. That is, the device according to the embodiments may check the minimum bit rate information for the minimum bit-rate at which the network may currently receive the DASH service.

Through the information, it may be determined whether the service instance is playable. However, in the case of the currently defined information, when multiple service instances are contained in DVBiservicetype, it is difficult for the client to select a service instance based only on the information of @minimumBitrate.

For example, it is assumed that there are two service instances as follows.

(Service instance 1) DVB-T delivery method, HD, H.264/AVC (Service instance 2) DVB-I DASH delivery method, MinimumBitRate 1.5 Mbps For example, where there are two service instances (e.g., service instance 1 and service instance 2), a client related to the transmission/reception device according to the embodiments is an HEVC UHD capable terminal, and the network situation above the bit rate of the other comparison target can be ensured, the receiver (terminal) should request service instance 2 (e.g., HEVC UHD). However, unless the MPD is received through a request, the receiver cannot know, from the current information, an attribute indicating that a stream of better quality than instance 1 is included. Receiving and comparing all MPDs of all service instances may not only be a burden from the perspective of the receiver, but also may be an issue in rational network selection. A scheme for providing a better service between instances within DVB service scheme information is proposed below. That is, embodiments may be implemented in which the burden of the receiver parsing/analyzing all MPDs or similar signaling information is eliminated and the receiver is allowed to quickly identify and request a better service instance in response to a network situation of a specific bit rate or higher.

Therefore, service instances may be distinguished through the extension of information as described below. This challenge may be addressed by the embodiments described with reference to FIGS. 55 and 26.

FIG. 53 shows a DASH delivery parameters type according to embodiments.

FIG. 53 shows a detailed syntax of the DASH DeliveryParametersType of FIG. 45;

As shown in FIG. 53, the DASH DeliveryParametersType may ComparisonBitRate and ComparisonContentAttributeType. The ComparisonContentAttributeType may include an AudioAttributes element, a VideoAttributes element, a CaptionLanguage element, and a SignLanguage element.

The ComparisonContentAttributeType may correspond to the ContentAttributes element included in the ServiceInstanceType 45020 of FIG. 45.

FIG. 54 shows a DASH delivery parameters type according to embodiments.

As shown in FIG. 54, the DASHDeliveryParametersType may include ComparisonContentAttributeType. In addition, the ComparisonContentAttributeType may include ComparisonBitRate along with an AudioAttributes element, a VideoAttributes element, a CaptionLanguage element, and a SignLanguage element.

Although the configurations of FIGS. 53 and 54 are different, the ComparisonBitRate and ComparisonContentAttributeType, which are common elements, may be defined as follows.

The ComparisonBitRate means what bitrate it would be able to handle for a particular IP-delivered Service Instance to be likely to provide a better user experience than any non-IP-delivered Service Instance available for that Service.

The @ComparisonContentAttributeType indicates which video characteristic would be available for a DVB-I client to provide a better user experience than any non-IP-delivered Service Instance available for that Service.

FIG. 55 illustrates signaling of a DVB-I service instance according to embodiments.

FIG. 55 illustrates an example of the DVB-I service instance of FIG. 45;

FIG. 55 shows two service instances. Part 55000 represents DVB-S ServiceInstance, and part 55010 represents DVB-I ServiceInstance.

The ServiceInstance of 55000 has priority 0, and the display name is ABC drama. As shown in FIG. 55, AudioAttributes, VideoAttributes, and the like are signaled as attributes, and the ServiceInstance includes DVBSDeliveryParameters. Here, the priority '0' may be an example value. In addition, the reception device according to the embodiments may check an additional service instance in addition to the service instance to provide, through signaling information according to embodiments, a service instance capable of providing a better service to the user in consideration of not only the priority value, but also the network status or available bandwidth and capabilities of the client.

The service instance of 55010 has priority 1, and the display name is ABC drama. DASHDeliveryParameters may signal the address of https://live.daserste.de/0001 Das%20Erste.mpd</dvbisd-base:URI for content of the application/dash+xml type through a URI-based location. The MinimumBitRate is 1M, and the ComparisonBitRate is 7M. The ComparisonContentAttribute signals VideoAttributes through "urn:mpeg:mpeg7:cs:VideoCodingFormatCS: 2001:2.2.2" and HEVC Video Main10 Profile @ Main Level</tva:Name> (UHD enable). Specifically, the value of the ComparisonBitRate may be an example value. The reception device (terminal, client, etc.) according to the embodiments checks the value of ComparisonBitRate, and recognize, from the value, that a better service is provided. For example, when a better service corresponding to the value of 7M is provided, the method/device according to the embodiments may additionally define corresponding video attribute information like the ComparisonContentAttribute of FIG. 55. Accordingly, the reception device according to the embodiments may check the presence of the UHD stream and switch the stream to a service for the ComparisonContentAttribute according to the network situation.

When the receiver receives two instances within the same service (e.g., ABC drama) in the DVB-I service scheme, the DVB-I client should select an instance that may be provided for a better user experience. When the value of @ComparisonBitrate value is identified as 7 Mbps, the available bandwidth of the current network is exceeded compared to HD, and the attribute of @ComparisonContentAttribute is supportable by the terminal (receiver), an MPD may be requested and a better service may be received and provided to the user. The attribute indicates "beyond HD" based on @ComparisonBitrate (7 Mbps—HD), and means that a service that is enriched compared to the broadcast service instance may be provided.

Here, the bit rates of 1M BPS and 7M BPS may be example values. These values may be bit rates applied between services with different resolutions, such as UD and UHD.

According to embodiments, a use case is expanded as follows.

Instance 1. HD broadcast

Instance 2. UHD DASH with representations from SD to UHD, 1.5 Mbps to 33 Mbps (with an HD Representation at 7 Mbps). MinimumBitRate 1.5 Mbps; ComparisonBitRate 7 Mbps.

That is, Instance 1 indicates HD broadcast, and Instance 2 indicates UHD DASH. Instance 2 may be represented from SD to UHD and may have a bandwidth from 1.5 Mbp to 33 Mbps. In this case, the HD representation is 7 Mbps, the minimum bit rate is 1.5 Mbps, and the comparison bit rate is 7 Mbps.

A player capable of supporting UHD according to the embodiments may select Instance 2 when the bit rate is 7 Mbps.

A player capable of supporting HD without HEVC support according to embodiments selects Instance 1.

A player capable of supporting UHD and having a Wi-Fi link of 5.5 Mpbs speed according to embodiments selects Instance 1.

A player capable of supporting UHD and having a 3G mobile connection of 1 Mbps, at which a broadcast report cannot be received, according to embodiments may not have a connection fast enough to play a service, but may attempt to play the service.

A player capable of supporting UHD and having a 4G mobile connection of 2 Mbps, at which broadcast cannot be received, according to embodiments may select Instance 2.

Figure 56:
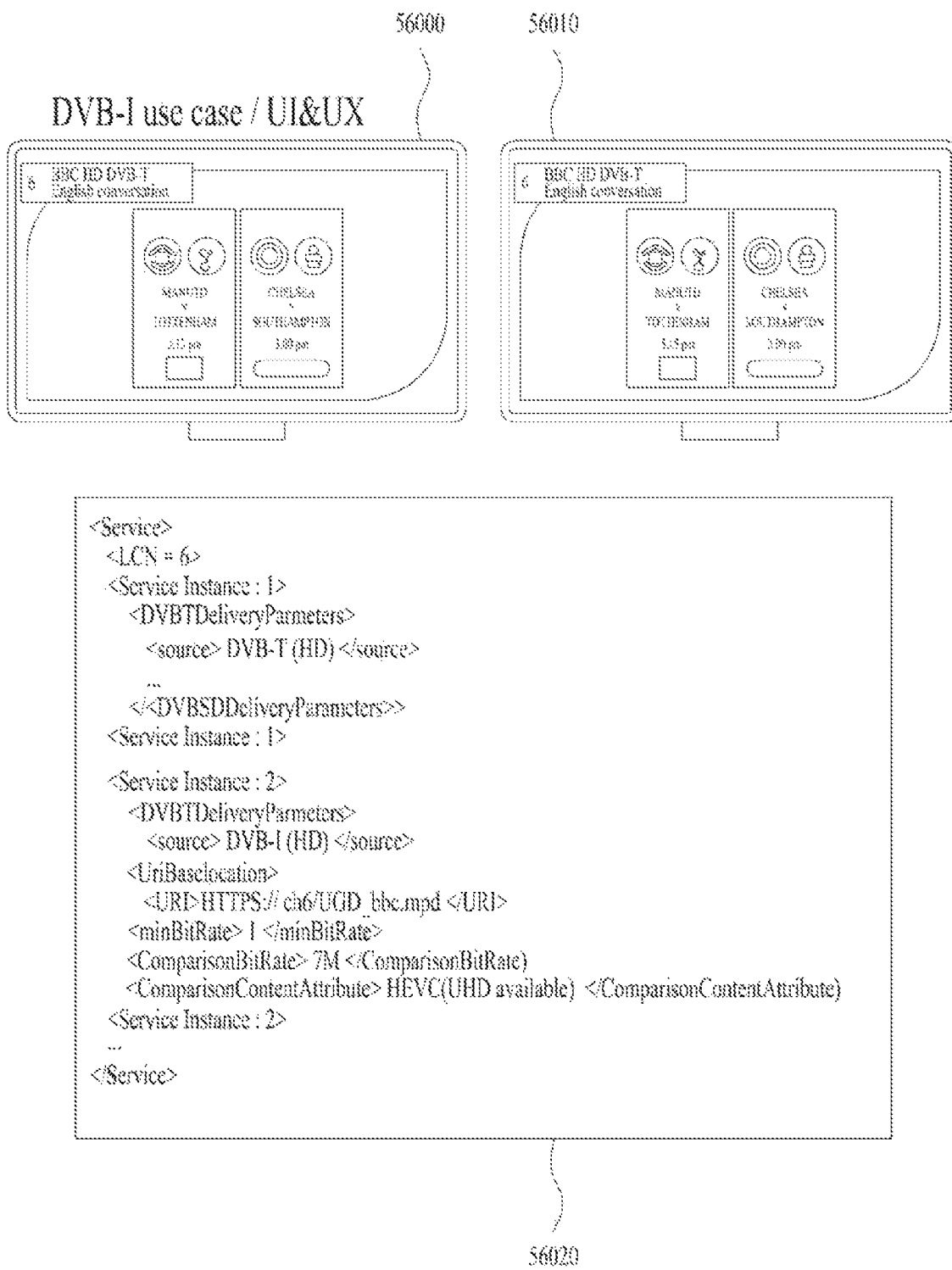
FIG. 56 shows simulcast UI/UX according to embodiments.

FIG. 56 shows simulcast UI/UX according to embodiments.

In the figure, part 56000 illustrates a state in which the reception device according to the embodiments displays the DVB-T broadcast service, and part 56010 illustrates a state in which the reception device according to the embodiments displays the DVB-I service. FIG. 56 illustrates that a better user experience for the same service is provided to a user according to a user's selection and/or a characteristic of the reception device, based on a signaling scheme and a UI/UX scheme according to embodiments.

Part 56020 is an example of the above-described signaling information for the aforementioned sates. The example corresponds to the service list described above with reference to FIG. 45.

The service list according to the embodiments may provide a service instance for each service. The service for parts 56000 and 56010 has logical channel number 6, and includes service instance 1 and service instance 2. Service instance 1 signals DVB-T (HD) service as shown in part 56000, and service instance 2 signals DVB-I (UHD) service as shown in part 56010.

According to embodiments, when a device capable of receiving the DVB-I service receives one or more service instances, a determination may be made such that a media service of higher quality may be provided based on the comparison bit rate value and the comparison content attribute value included. When two service instances are received as in the embodiment, a service instance that is likely to receive a better service may be quickly identified through IP/DASH. As in the embodiment, when HD and UHD are simultaneously received, a delivery type may be selected through the information.

In other words, a reception device receiving Service Instance 1 and Service Instance 2 may immediately check a better DVB-I UHD service based on the comparison bit rate value and the comparison content attribute value included in the service instance for DVB-I, without having to parse all other signaling information for all services. Based on Instance 2, the reception device may recognize through the comparison content attribute that the comparison bit rate is 7 Mbps and the resolution of the better service is UHD (HEVC). The reception device may ask the user whether to view the better service based on UI/UX. The service according to Instance 2 may be provided to the user according to the user's selection or the setting of the reception device.

The reception device according to embodiments may provide a DVB-I simulcast service UI/UX to a user. The UI/UX shown in FIG. 56 represent a UI/UX that provides a better experience to a user when a DVB-I client receives multiple service instances through the extended information according to the above-described embodiments. For a terminal capable of supporting UHD/HEVC, a DVB-I service instance capable of receiving UHD may be selected in place of the DVB-T service instance capable of receiving HD. The terminal may select a service instance of high quality only through the service list scheme without having to receive all DASH MPDs.

The signaling information according to the above-described embodiments may be referred to as various terms such as field, attribute, element, first information, second information, first value, and second value.

The above-described embodiments and the embodiments to be described below may provide the following effects.

According to embodiments, an MPEG-2 system/DVB SI-based service for Internet channel scanning for providing the same user UX as the existing linear service channel may be initialized.

According to embodiments, network/stream/service unique signaling for Internet stream identification may be performed for aggregation with an existing linear channel.

According to embodiments, a method for replacing TSID in existing system information may be extended.

According to embodiments, switching of a DVB network provided on the same dedicated channel and each bit-stream provided on a DVB-I channel may be allowed.

According to embodiments, SUHD (8k) linkage may be provided through a DVB-I channel in SD, HD, and UHD linkage services provided on an existing channel.

According to embodiments, a DVB-I service list may be acquired over the existing DVB network.

According to embodiments, in order to provide a linear IP-based TV service, a service bootstrap technology of the existing linear channel network.

According to embodiments, unique information that must be defined for Linear IP based TV service identification may be added.

According to embodiments, an IP based TV channel may be added to the existing linear channel EPG.

According to embodiments, an existing DVB stream and a DVB-I stream may be simultaneously provided on the same dedicated channel, and the streams may be dynamically changed for a predetermined period.

According to embodiments, SUHD (8k) linkage may be provided through a DVB-I channel in SD, HD, and UHD linkage services provided on an existing channel.

According to embodiments, linkage information for acquiring a DVB-I service list or a query end point over the existing DVB network may be extended.

According to embodiments, a service bootstrap scheme for an existing linear channel network may be extended to provide a linear IP based TV service.

According to embodiments, linkage between the existing DVB network and the DVB-I network may be provided at the bouquet level, service level, and event level based on DVB-SI information.

According to embodiments, content of various resolutions may be provided on the same logical channel through linkage information about the existing DVB network and the DVB-I network.

According to embodiments, a DVB-I service list location and a query may be defined through a linkage descriptor (uri_linkage_descriptor) to acquire a DVB-I service list on the existing DVB network.

According to embodiments, an open DVB-I service registry may be accessed through an end point and a service list entry list suitable for a client may be acquired.

According to embodiments, a service that is accessed by a device supporting an RF-based DVB tuner through a UI in which an existing linear service and an OTT service are aggregated may be enabled.

According to embodiments, a media service that provides the same UX as existing linear channels may be provided through the open Internet without a set-top box (STB).

According to embodiments, as the existing DVB network and the Internet channel are aggregated, a resolution that may be provided on the same channel may be extended.

According to embodiments, a DVB-I service list location may be signaled due to a linkage descriptor (uri_linkage-_descriptor). The reception device according to the embodiments may efficiently acquire a DVB-I service list. In addition, due to the end point according to the embodiments, the reception device according to the embodiments may efficiently acquire a service list.

Due to the above-described embodiments, the terminal (device) according to the embodiments may acquire a service list in which all channels are aggregated, as shown in FIG. 34. The aggregated service list may include an entire list, a list desired by the reception device, and the like.

A URI by which all services may be acquired may be present. Through this URI, a URI for a list of individual services may be additionally acquired. The individual list may be a list of services for each broadcaster.

As the service platform expands, operators may provide services through more diverse environments. From the user perspective, media services received in various app environments may be offered in an aggregated reception environment called DVB-I. Accordingly, services that are more convenient and have good accessibility may be received.

With the expansion and integration of the service platform, a service may be simulcasted over communication networks including terrestrial, cable, satellite, and 5G networks, and the receiver may receive a desired service according to the receiver capability.

This process may be implemented through ComparisonBitrate and/or ComparisonContentAttribute in FIGS. 53 to 56 and the like.

The MPD may contain multiple representations and also contain both UD related information and UHD related information.

The reception device has a large burden of parsing all the information of the MPD, which takes a lot of time.

On the other hand, when the DVB-I service list at the service instance level is used, the reception device may be allowed to selectively and quickly decode optimized services and rich media according to the capabilities of the reception device.

The reception device may recognize presence of services with different capabilities through ComparisonBitrate. ComparisonBitrate may be a concept of minimum throughput. Furthermore, the reception device may recognize a specific attribute of a switched service through ComparisonContentAttribute.

A broadcast signal transmission device according to embodiments represents a device configured to generate and transmit DVB-I related data. For example, the broadcast signal transmission device may correspond to the content guide server, the service list server, the broadcaster 34010, the MPD server 34020, the stream server 34030, the multicast server, and the like in FIG. 34, may be referred to as a server or a processor connected to a memory, or the like.

A broadcast signal reception device according to embodiments represents a device configured to receive DVB-I related data and play and provide a media service to a user. For example, the broadcast signal reception device corresponds to the player 34000 of FIG. 34 and components of the corresponding drawings, and may be referred to as a client or the like.

Figure 57:
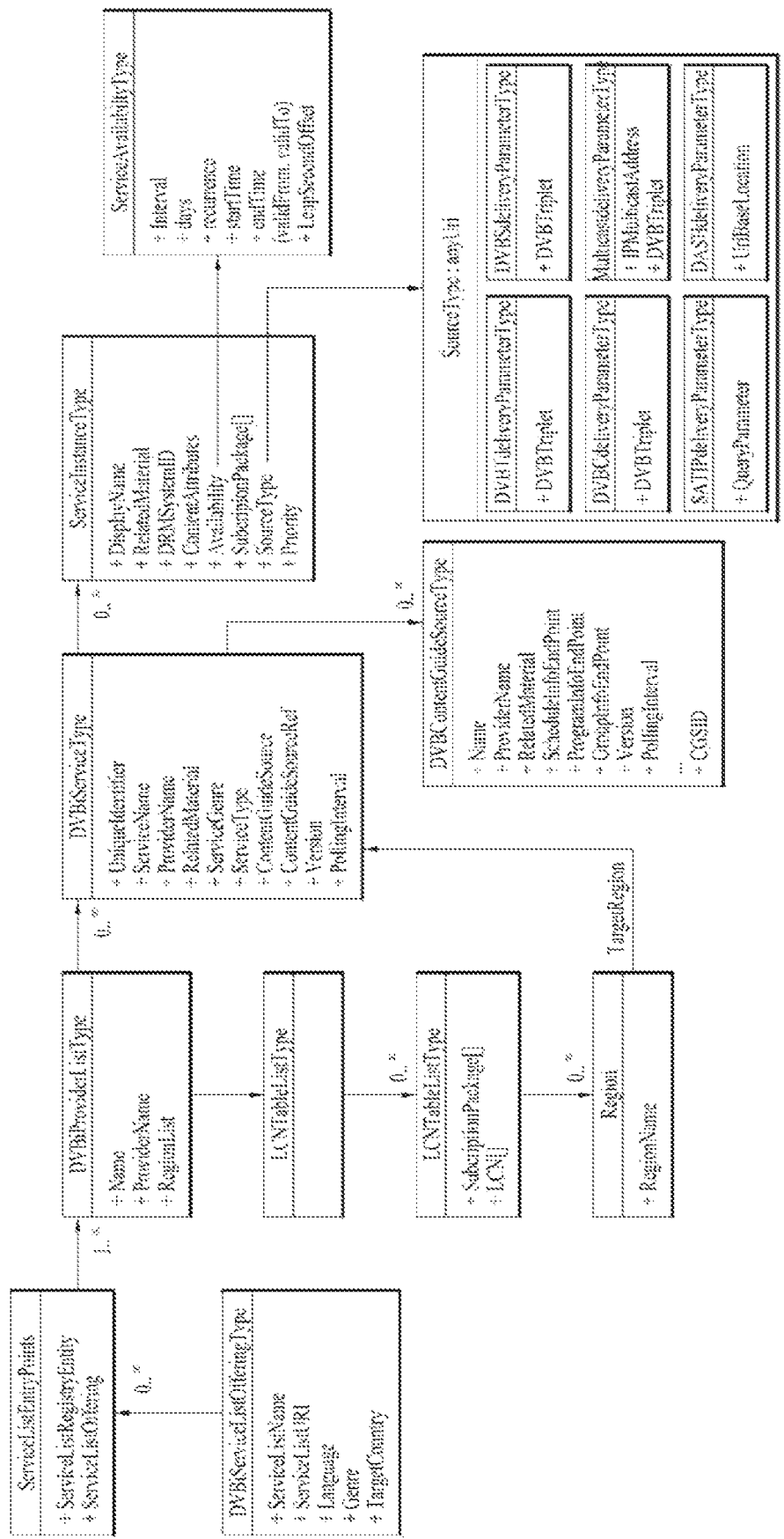
FIG. 57 shows a DVB-I service list hierarchy according to embodiments.

FIG. 57 shows a DVB-I service list hierarchy according to embodiments.

A broadcast signal transmission device according to the embodiments may generate a service list as shown in FIGS. 45 and 57 and transmit the generated service list to a broadcast signal reception device.

The transmission device generates service information as shown in FIGS. 45 and 57, and the reception device acquires service related information (e.g., service list information, content guide information, etc.) based on the service information shown in FIGS. 45 and 57.

In the DVB-I service list hierarchy each service may contain service instances through unique information of service_ID. That is, a Parents element of one Service_ID may define multiple service instances distinguished by delivery networks. In the case of simulcast, when the Internet and the existing DVB network are connected simultaneously, instances of DVB-T and DASH may be defined and transmitted.

A service including respective service instances defines a DVB-I service content guide to be provided to a user. By defining specific information about a program (or event) corresponding to a specific schedule (timeslot), the reception device may receive a currently ongoing program guide. DVB-I service reception is basically operated in a pull-only mode based on HTTP 1.1, and each client may download content guide information about content currently being consumed according to the client's own polling algorithm, and then may show the same through an appropriate UX/UI.

The PULL mode according to embodiments is a mode in which a reception device makes a request for a specific operation to a transmission device and receives information on the specific operation. Compared with a case where the transmission device transmits specific data to the reception device in a broadcasting manner, the reception device may pull the desired data to the transmission device. Depending on the full mode, the reception device may acquire necessary data more dynamically from the transmission device. Depending on the full mode, the reception device may need service/content guide information according to embodiments.

FIG. 58 shows a content guide source list according to embodiments.

FIG. 58 shows the detailed syntax of an instance of the DVB content guide source type shown in FIG. 57;

The broadcast signal reception device according to the embodiments may download a DVB-I service content guide by the following method.

When the reception device according to the embodiments makes a request for the content guide to the content guide server (transmission device), it requests and receives data with the following API endpoint. "ContentGuideSource" is given the following API_endpoint_URL and updates necessary information on the corresponding address. The basic structure is configured as follows, and the request method is divided into a timestamp filtered schedule request and a now/next filtered schedule request according to a time span.

<api_endpoint_URL>[?<query_params>]

[1] Timestamp Filtered Schedule Request

By defining a specific time span of the ScheduleEndpoint, query information is defined as follows.

<ScheduleInfoEndpoint>?start=<start_unixtime>&end=<end_unixtime>
&sid=<service_id>&image_variant=<variant>

Example

<ScheduleInfoEndpoint>?start=1433246400&end=1433268000&sid=12345

Here, service_id indicates a single decimal service ID determined by the reception device (client device).

Only a single presence of the service ID parameter may be passed.

Variant may optionally specify an image variant.

Now/Next Filtered Schedule Request

The now/next filtered schedule endpoint represents query information.

Example

<ScheduleInfoEndpoint>?sid=12345&now_next=true

Figure 59:
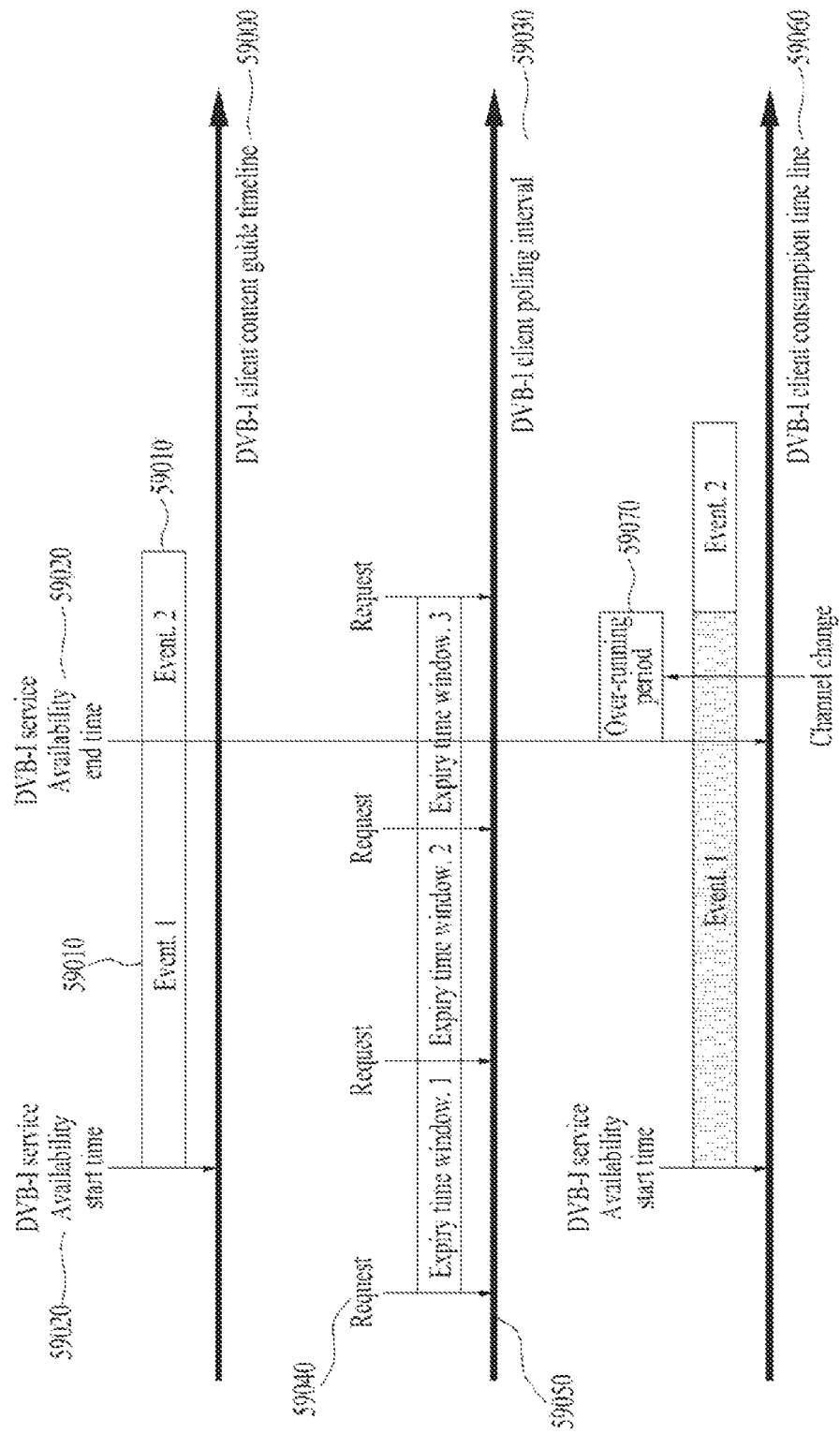
FIG. 59 illustrates a DVB-I client over-running issue according to embodiments.

FIG. 59 illustrates a DVB-I client over-running issue according to embodiments.

FIG. 59 illustrates up-to-date state issues due to over-running that may occur while a broadcast signal reception device according to embodiments reproduces DVB-I related data.

The over-running issue may occur between the broadcast signal reception device (client) and the broadcast signal transmission device (server unit, broadcaster, etc.) according to the embodiments for the following reasons.

The broadcast signal reception device (DVB-I client) according to the embodiments updates the content guide data with the latest information by polling according to the client's own standards and shows the updated data to the user. Live broadcasting on the DVB network provides content guide data in a push form over the broadcast network. On the other hand, DVB-I updates the latest information through a fixed periodic refresh in the pull-only mode.

The broadcast signal reception device (DVB-I client) according to the embodiments may play a program (event) by DVB-I service availability according to the service discovery information according to a DVB-I client content guide timeline 59000. A program (or event) 59010 according to the embodiments has a start time 59020 and an end time 59020.

An event according to embodiments may represent aperiodic sparse media-time related auxiliary information for the client or reception device according to the DASH definition.

The broadcast signal reception device (DVB-I client) according to the embodiments may send a request 59040 for content guide data to the transmission device in every expiry time window 59050 based on a DVB-I client polling interval 59050.

An issue of the content guide based on DVB-I is that a DVB-I service that is different from the information in the guide of the existing program may be displayed due to a delay in a specific program (or event) 59010, for example, sports broadcasting or the insertion of specific live breaking news. FIG. 59 is a diagram illustrating DVB-I content guide information according to a polling interval and a progression of a live program actually being consumed.

As shown in FIG. 59, the client may be tuned in or switch channels during an over-running period 59070 of a live program. The DVB-I content guide has an issue indicating data about Event 2 according to the scheduled end time (the reception device is playing Event 1 in reality).

In other words, the client updates the content guide through the periodic request 59040. However, when over-running occurs in the end-time span, the current play-out screen may not match the UI information of the channel banner.

In addition, the expiry time related cache-control and the max-age header in predefined HTTP do not take into account a time span for over-running.

Accordingly, embodiments propose methods for updating the latest information by a DVB-I receiver based on a pull-only mode.

Figure 60:
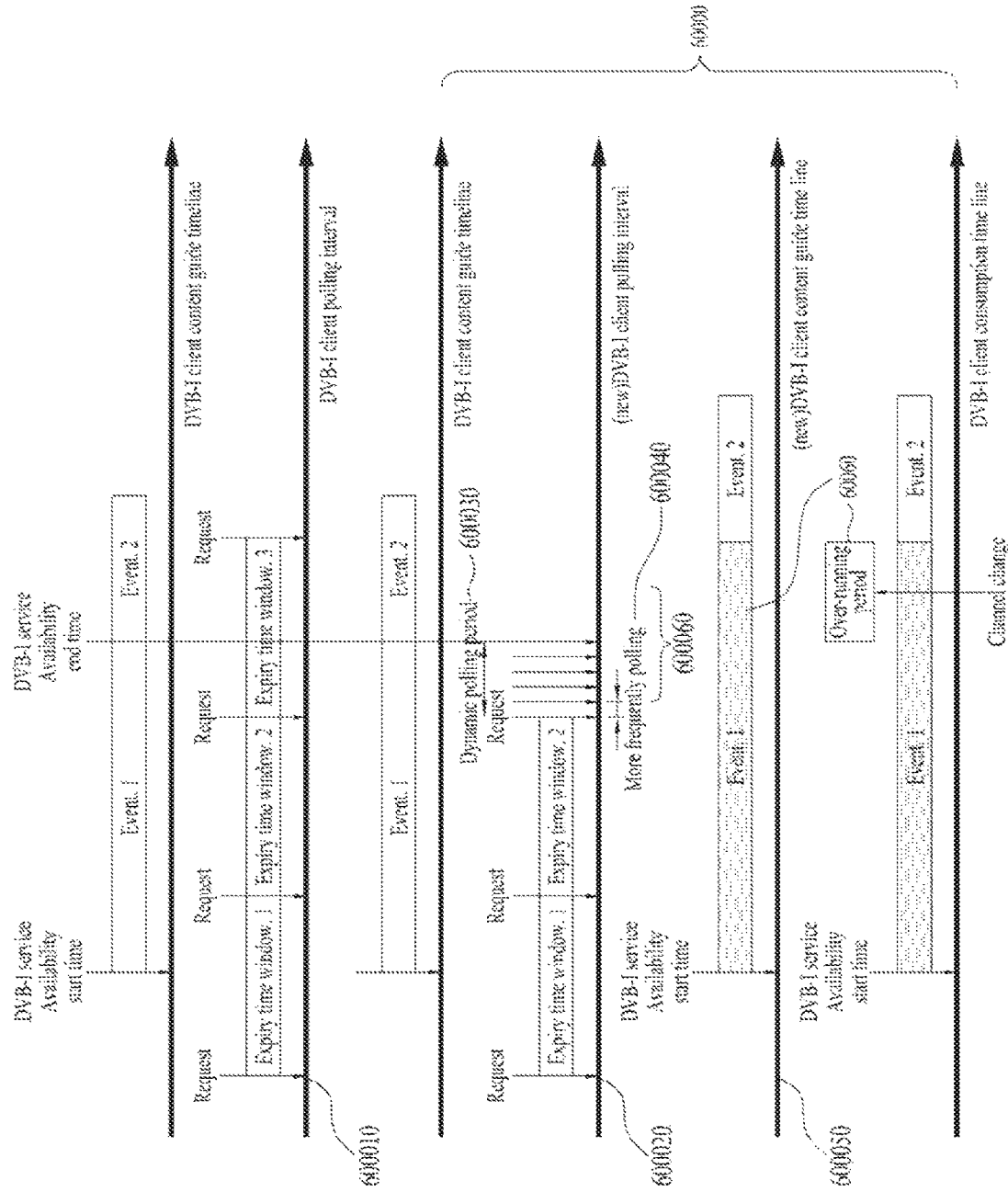
FIG. 60 illustrates a dynamic polling algorithm according to embodiments.

FIG. 60 illustrates a dynamic polling algorithm according to embodiments.

FIG. 60 illustrates a method of addressing the problem of FIG. 59 by a broadcast signal transmission/reception device according to embodiments.

The broadcast signal reception device (DVB-I client) according to the embodiments may maintain an up-to-date state based on an operation 600000.

As shown in FIG. 60, a method of preventing incorrect information (guide information related to an event/program, etc.) from being shown in the over-running period is proposed. The broadcast signal reception device according to the embodiments may receive a DVB-I service, and may check service availability currently in progress through <Availability> in a service instance (FIGS. 42, 45, 50, 51, 57, etc.), as shown in FIG. 60. Accordingly, the service progress may be checked according to the service window defined in the service availability.

When a specific live service is over-run, the polling period in a specific interval may be adaptively changed through the <pollingInterval> in the existing polling method that the client is running.

Even when the reception device autonomously performs polling as shown in part 600010, it may not appropriately respond to over-running occurring at the event end time.

Accordingly, as shown in part 600020, the reception device may perform polling in a predetermined manner according to the service window, and then may dynamically perform polling from the vicinity of the end time of the event/program for a specific dynamic polling period 600030 in every polling period 600040.

In accordance with the content guide timeline according to the embodiments, when Event 1 is over-run and thus an over-running period 600060 occurs, the reception device may provide the user with a content guide for Event 1 reflecting over-running along with Event 1 based on an entire dynamic polling period 600030 and a polling period 600040.

The entire dynamic polling period 600030 and the polling period 600040 may be set for a certain period 600060 from a time before the expiry time of Event 1 to a time after the start point of Event 2.

The dynamic polling interval may prevent content guide misinformation that occur in over-running and provide up-to-date information. FIG. 60 illustrates an operation of adaptively switching a polling period of a specific interval to apply a dynamic polling interval to address the issue of over-running. The following information is required as an algorithm for addressing the over-running issue.

Reference timing information for applying dynamic polling interval: This may indicate the entire interval in which dynamic polling is applied.

For example, the reference timing information may represent a point indicated by an offset by x sec from the DVB-I service Availability end time.

Polling interval to be newly applied: This indicates an interval at which polling is to be performed for dynamic polling in the entire interval.

Version information for comparison with existing information: This may be version information indicating dynamic polling compared to a client polling interval.

Specifically, (1) the reference timing information for applying the dynamic polling interval indicates a period in which the dynamic polling is applied. (2) The offset by x sec from the reference timing information (e.g., DVB-I service Availability end time) is a value for (1) and may be an offset or a Boolean type. (3) The polling interval to be newly applied may be @minimumMetadataUpdatePeriod according to embodiments.

For example, when the total period is 10 minutes, and polling is dynamically performed every 1 minute within 10 minutes, the information of (1) is 10 minutes, and the information of (2) is the start point of 10 minutes (AST or AET+offset or @dynamic), and the interval of (3) may be 1 minute. In addition, it may be seen that this is information for dynamic polling through the version information for comparison with the existing information.

FIGS. 61 and 62 show syntax for dynamic polling according to embodiments.

FIGS. 61 and 62 show syntax representing the method of FIG. 60;

The reception device may acquire a content guide based on ContentGuideSource and ContentGuideSourceRef of FIGS. 61 and 62 and provide the same to the user.

The reception device may perform self-polling based on the PollingInterval and the PollingIntervalType of FIGS. 61 and 62.

The reception device may recognize the start/expiry time of the currently serviced event or program based on Availability of FIGS. 61-62.

The reception device (DVB-I client) may address the over-running issue through "PollingIntervalType" of FIGS. 61-62. PollingIntervalType may indicate the dynamic polling type of FIG. 60.

The reception device may acquire the polling interval and duration for dynamic polling based on the PollingInterval and Duration of FIGS. 61 and 62.

The reception device may identify information on the start time of dynamic polling based on the DynamicIntervalPeriodOffset and integer of FIGS. 61 and 62. The transmission device may inform the reception device of the start time of dynamic polling by an integer type.

Figure 63:
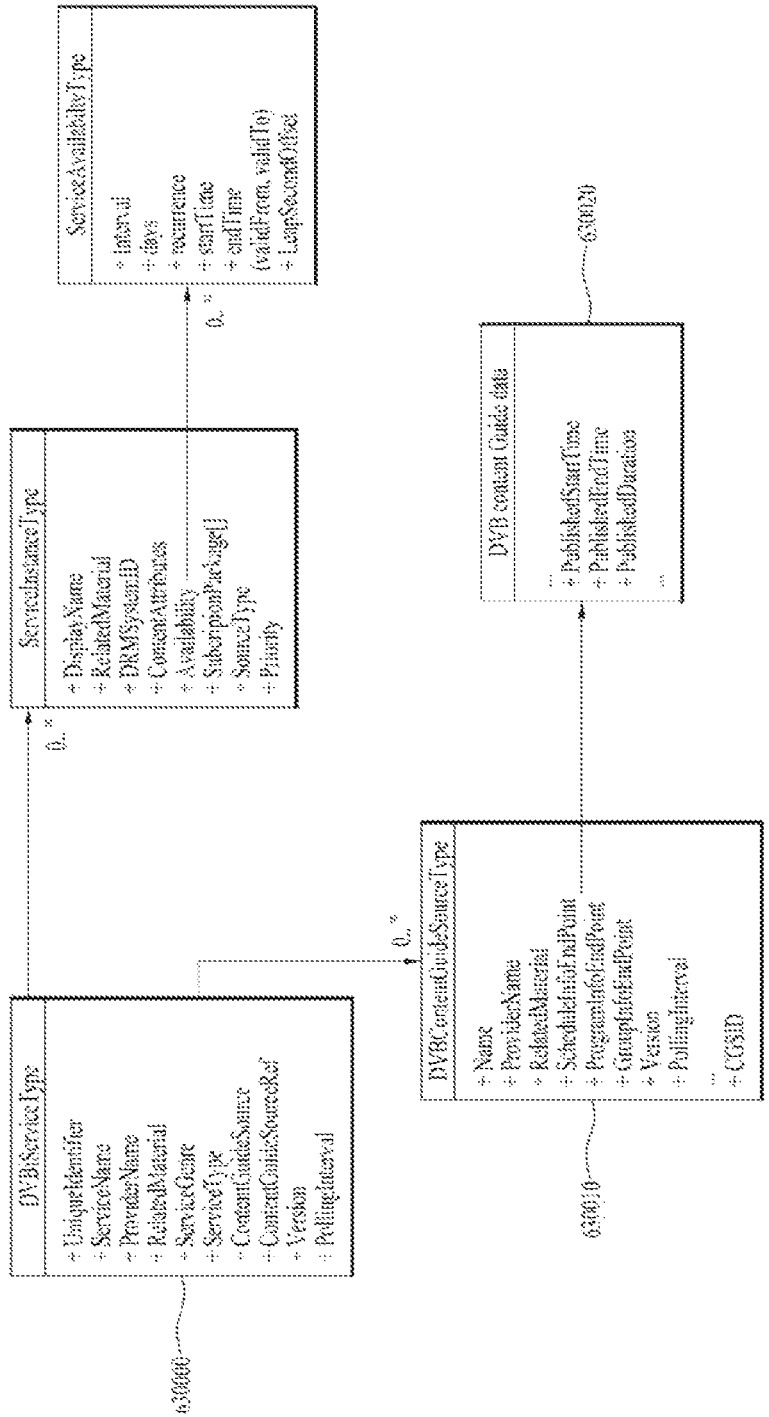
FIG. 63 illustrates a dynamic polling procedure according to embodiments.

FIG. 63 illustrates a dynamic polling procedure according to embodiments.

FIG. 63 shows that information for FIGS. 60 to 62 is defined in a service type level and ContentGuideSourceType.

DVBiServiceType 630000 corresponds to a service type element according to the DVB-I service scheme of FIGS. 45, 57, 64, 67, and the like.

The DVBiServiceType 630000 according to the embodiments may include a PollingInterval element.

The reception device may poll and acquire service information for each individual service based on the PollingInterval element applied to each service.

DVBContentGuideSourceType 630010 may be referenced by the ContentGuideSourceRef information of the DVBiServiceType 630000.

The DVBContentGuideSourceType 630010 according to the embodiments may include version information and/or a PollingInterval element. The DVB content guide data 630020 about the DVBContentGuideSourceType 630010 may include start time, end time, and duration information in relation to the polling interval.

The reception device may poll and acquire guide information for each individual piece of content based on the PollingInterval element applied to each piece of content, at the content level, which is more specific than the service level.

Regarding the operation of FIGS. 61 to 63, the reception device may check the latest information (content guide) through the procedure as illustrated in FIG. 63 and send a query to the transmission device (server, processor, etc.).

As shown in FIG. 63, the reception device checks the state of the current service (or program, event) based on the available start time and end time of the current service through the availability value of the service instance level.

From a point in time corresponding to a value obtained by subtracting @DynamicIntervalPeriodoffset (start point of dynamic polling; see 600030, 600040, and 600060) from the available end time, the reception device (client) may skip existing static content guide polling (see 59040, FIG. 60), and may update new content guide data through a dynamic request and response based on the value of @PollingInterval.

An example of dynamic polling is disclosed below.

@availability End Time="2020-02-19T10:42:02.684Z"

(This indicates the end time of data that is current played by the reception device.)

@DynamicIntervalPeriodoffset="5000"

(This indicates that the reception device can perform dynamic polling from a time preceding the end time of the current data by 5000 time units (where the time unit may be hour, minute, second, or the like according to embodiments).)

@PollingInterval="1000"

(This indicates that the reception device dynamically polls the content guide information for the transmission device (server, processor, etc.) every 1000 time units.)

@version=10→11

(When the version of static polling of the reception device is 10, the version of dynamic polling may be expressed as 11. The version may have various values according to embodiments.)

When a value of the PollingIntervalType is included (that is, the PollingIntervalType indicates dynamic), At intervals of "1000" from a point corresponding to "2020-02-19T10:42:02.684Z"—"5000", the client may perform access through a query of @ScheduleInfoEndpoint (<ScheduleInfoEndpoint>?sid=12345&now_next=true) and update a new content guide.

Based on the dynamic polling in the pull mode of the reception device, the reception device may address the issue of over-running, which cannot be solved by the static polling in the push mode of the broadcaster.

Figure 64:
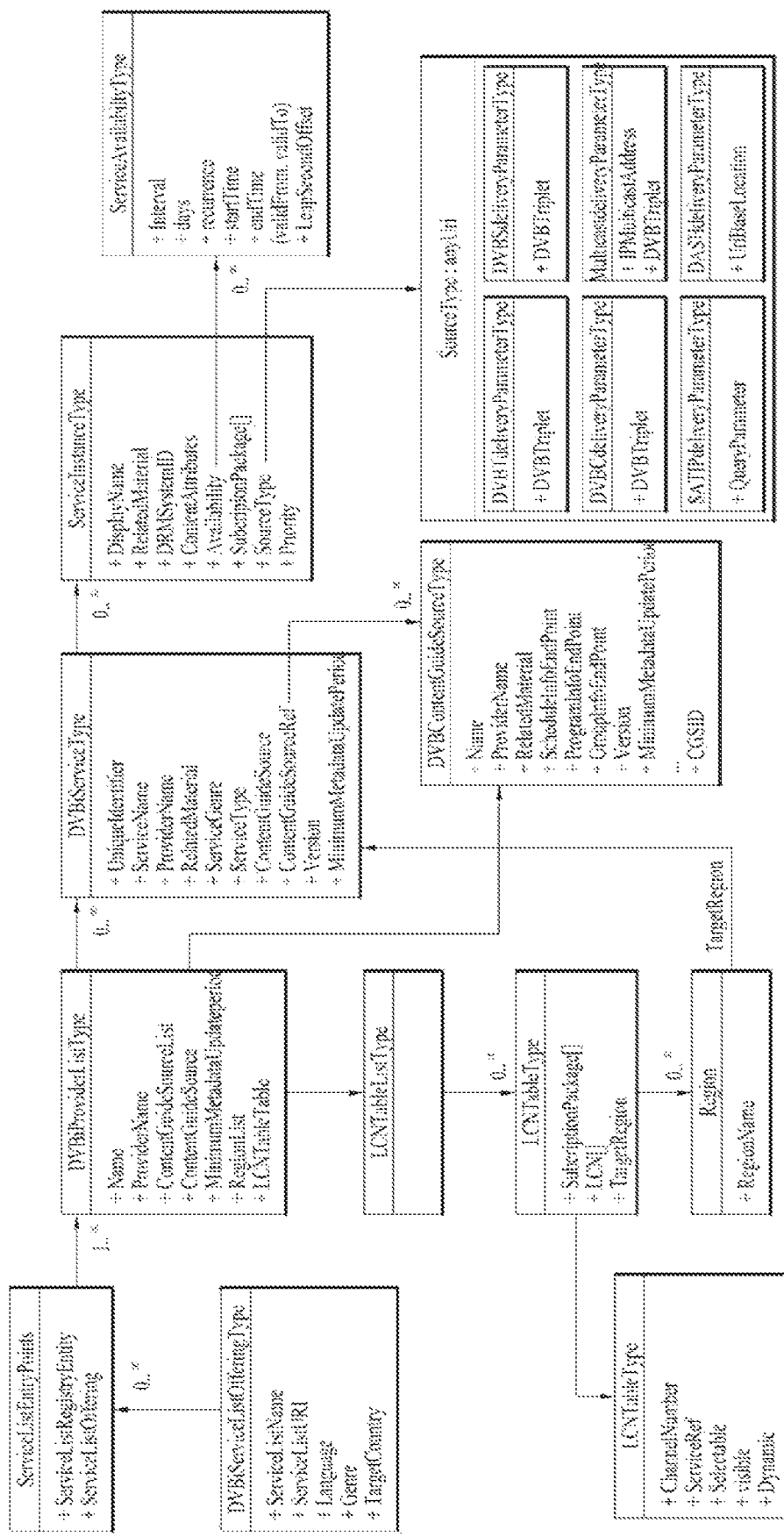
FIG. 64 shows a DVB-I service list hierarchy according to embodiments.

FIG. 64 shows a DVB-I service list hierarchy according to embodiments.

FIG. 64 shows a DVB-I service list as in FIGS. 45 and 57.

The transmission device according to the embodiments generates a service list as shown in FIG. 64, and transmits the same to the reception device, and the reception device provides a DVB-I media service to a user based on the service list.

The transmission device generates service information as shown in FIGS. 45, 57, and 64, and the reception device acquires service related information (e.g., service list information, content guide information, etc.) based on the service information as shown in FIGS. 45, 57, and 64.

In the DVB-I service list hierarchy according to embodiments, each service may include service instances through unique information of service_ID. That is, a Parents element of one service_ID may define multiple service instances classified by the delivery network. In the case of simulcast, when the Internet and the existing DVB network are connected simultaneously, the transmission device may define and transmit instances of DVB-T and DASH. For a service including service instances, the transmission device generates a DVB-I service content guide to be provided to a user. By defining specific information about a program (or event) corresponding to a specific schedule (timeslot), the reception device may receive a currently ongoing program guide. DVB-I service reception is basically operated in a pull-only mode based on HTTP 1.1, and each client may download content guide information about content currently being consumed according to the client's own polling algorithm, and then may show the same through an appropriate UX/UI.

FIGS. 65 and 66 show syntax for polling according to embodiments.

FIGS. 65 and 66 illustrate a DVB-I service scheme as in FIGS. 61 and 62. The transmission device may generate service list information such as that shown in FIGS. 65 and 66 and transmits the same to the reception device, and the reception device may provide content to the user based on the service list information such as that shown in FIGS. 65 and 66.

The transmission device generates service information such as that shown in FIGS. 45, 57, and 64 to 66, and the reception device acquires service related information (e.g., service list information, content guide information, etc.) based on the service information such as that shown in FIGS. 45, 57, and 64 to 66.

The reception device may update metadata for content for a specific period and duration, based on the MinimumMetadataUpdatePeriod and duration of FIGS. 65 and 66.

Based on the MinimumMetadataUpdatePeriod and the MinimumMetadataUpdatePeriodType of FIGS. 65 and 66, the reception device may update the metadata for content for a predetermined period.

The reception device may know, from the transmission device based on the Boolean type, that polling should be performs dynamically as in <attribute name="dynamic" type="boolean" default="false"/>, <attribute name="MinimumMetadataUpdatePeriod" type="duration" use="optional"/>. For example, when the Boolean is False, dynamic polling may be deactivated. When the Boolean is True, dynamic polling may be activated. The reception device may dynamically make a request for polling to the transmission device based on the MinimumMetadataUpdatePeriod and duration, and receive the queried information from the transmission device.

The reception device may update the metadata based on the MinimumMetadataUpdatePeriod and MinimumMetadataUpdatePeriodType according to the content guide source type of FIGS. 65 and 66.

The transmission device may independently transmit polling related information together with version information to the reception device, may transmit the polling related information together with a content guide source type, or may transmit the polling related information together with an LCN table entry type.

The reception device may acquire a polling interval, duration, a dynamic interval period offset, and an integer value according to MinimumMetadataUpdatePeriodType, transmit a query for dynamic polling to the transmitting side, and receive response information for the query.

The transmission device may generate the MinimumMetadataUpdatePeriod at various locations in the service list and transmit the same to the reception device, and the service discovery operation of the reception device may vary according to the location of the MinimumMetadataUpdatePeriod. For example, the MinimumMetadataUpdatePeriod may have various locations and hierarchies, as it may be included in a service list, included in a service, or included in a content guide. A specific example will be described with reference to FIG. 69.

Figure 67:
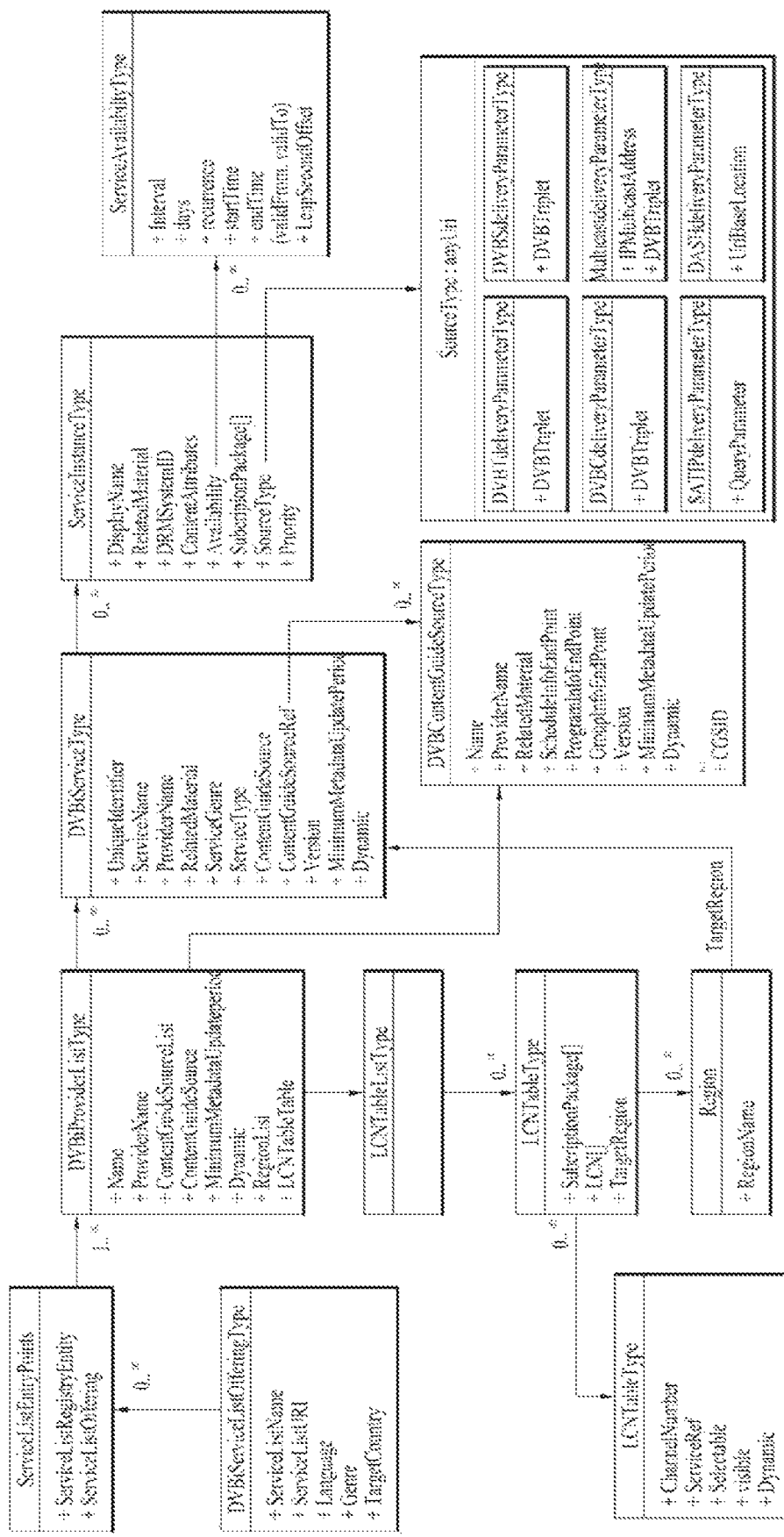
FIG. 67 shows a DVB-I service hierarchy according to embodiments.

FIG. 67 shows a DVB-I service hierarchy according to embodiments.

FIG. 64 shows a DVB-I service list as in FIGS. 45, 57 and 64;

The service list according to the embodiments may have a hierarchical structure as shown in FIGS. 45, 57, 64, 67, and the like. The transmission device according to the embodiments generates a service list having the hierarchical structure according to the embodiments and transmits the same to the reception device, and the reception device provides a media service to the user based on the service list according to the embodiments.

The transmission device generates service information as shown in FIGS. 45, 57, and 64 to 67, and the reception device acquires service related information (e.g., service list information, content guide information, etc.) based on the service information as shown in FIGS. 45, 57, and 64 to 67.

FIG. 68 shows a DVB-I service list discovery schema according to embodiments.

The reception device according to the embodiments may update the latest information of the content guide using the schema shown in FIG. 68.

The transmission device generates service information as shown in FIGS. 45, 57, and 64 to 68, and the reception device acquires service related information (e.g., service list information, content guide information, etc.) based on the service information as shown in FIGS. 45, 57, and 64 to 68.

The DVB-I Service List Discovery schema includes @ServiceListURI for acquiring a service list and service list provider information according to ServiceListEntryPoints (see FIGS. 45, 57, 64, 67, etc.).

The reception device (DVB-I client) initializes the DVB-I service to acquire a service list, performs an HTTP request/response reception process through the service list address information (@ServiceListURI), and stores the received service list. The DVB-I service may be initialized and the service list and content guide may be updated through the aforementioned process.

The DVB-I service list scheme hierarchy of FIG. 67 supports an operation of service list metadata reception through @MinimumMetadataUpdatePeriod. Based on a DVB-I model according to embodiments, multiple DVB-I service lists and individual service lists may include multiple services or a service. Each single service may be assigned as a service instance according to a delivery source.

The content guide is content guide information about the entire service list including respective services, and may be defined through ContentGuideSourceList. ContentGuideSource may be defined for each single service.

Expiry time related cache-control in the existing HTTP: The max-age header indicates the expiry period of the low layer of the HTTP level. It does not reflect the actual content on the DVB-I client or update on the UI. Therefore, the DVB-I standard needs @MinimumMetadataUpdatePeriod, an algorithm to indicate issues such as over-running or up-to-date information at the DVB-I client code level.

The operation of the content guide in the receiver corresponding to the update of the service list may depend on the position of @MinimumMetadataUpdatePeriod in the service list scheme hierarchy.

Figure 69:
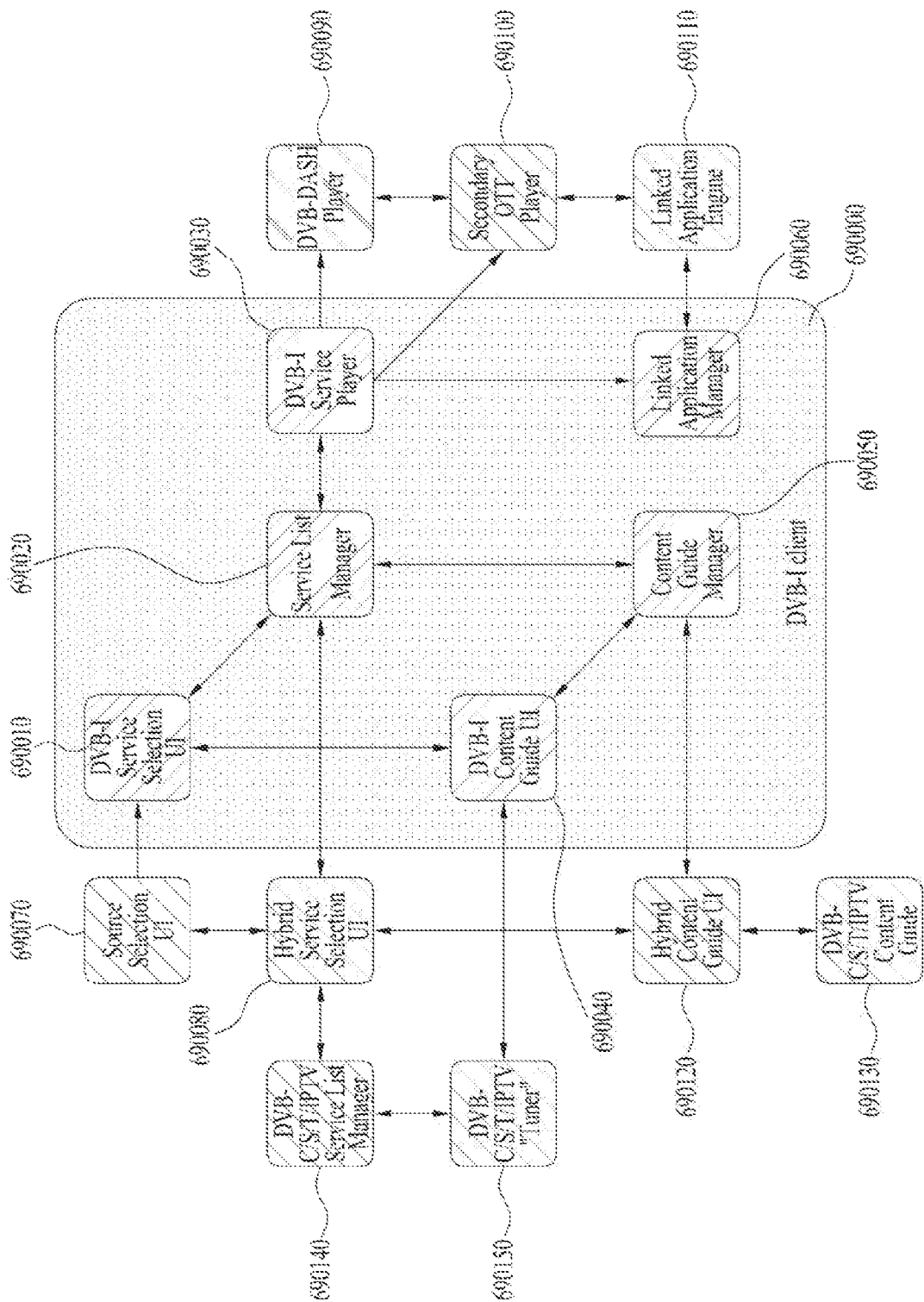
FIG. 69 shows a model of a DVB-I client according to embodiments.

FIG. 69 shows a model of a DVB-I client according to embodiments.

FIG. 69 shows a structure of a reception device (client) and a structure between devices associated with the reception device according to embodiments.

The reception device 690000 acquires service-related information (e.g., service list information, content guide information, etc.) based on the service information as shown in FIGS. 45, 57, and 64 to 68.

The reception device 690000 is the reception device (client) according to the embodiments described herein. The reception device includes components described below. Each component corresponds to hardware, software, a processor, and/or a combination thereof.

The DVB-I service selection UI controller 690010 controls a service selection related UI of the reception device 690000. For information about the service selection related UI, the DVB-I service selection UI controller 690010 may exchange necessary data with a service list manager 690020 and a content guide UI controller 690040. The service selection UI controller 690010 may receive source data for the service selection UI from a source selection UI controller 690070.

The service list manager 690020 controls service list information (e.g., FIGS. 45, 57, 64, and 67). The service list manager 690020 may receive service selection UI information for a service list from a hybrid service selection UI controller 690080, and may exchange service list related data therewith. The service list manager 690020 may exchange service list data and/or service information with a service player 690030. The service list manager 690020 may exchange service list information and/or content guide information with a content guide manager 690050.

The DVB-I service player 690030 controls service play. The service player 690030 may provide a service to a DVB-DASH player 690090, a secondary OTT player 690100, a linked application engine 690110, and the like. The linked application engine 690110 may be an application that provides a service through control of a linked application manager 690060.

The DVB-I content guide UI controller 690040 controls a content guide related UI. The DVB-I content guide UI controller 690040 may exchange service selection UI related data, content guide UI related data, and content guide control related data with the service selection UI controller 690010 and the content guide manager 690050.

The content guide manager 690050 controls content guide processing performed by the reception device. The content guide manager 690050 may exchange service list related information, content guide control information, and hybrid content guide UI related information with the service list manager 690020 and the hybrid content guide UI controller 690120. Here, hybrid refers to a unit that supports integration between the DVB-I network and broadcast services such as existing terrestrial, satellite, cable, and IPTV. services The linked application manager 690060 controls service play of an application of an additional device that may be linked to the reception device.

The DVB-C/S/T/IPTV content guide controller 690130 provides content guide information for the reception device for services of the DVB cable network, satellite network, terrestrial network, and IP network to the hybrid content guide UI controller 690120.

The DVB-C/S/T/IPTV service list manager 690140 controls service list information about the services of the cable network, satellite network, terrestrial network, and IP network. The DVB-C/S/T/IPTV service list manager 690140 may exchange the DVB-I service and cable network, satellite network, terrestrial network, IP network service list related information for hybrid with the hybrid service selection UI controller 690080.

A DVB-C/S/T/IPTV tuner 690150 receives broadcast services such as terrestrial, satellite, cable, and IPTV services. The tuner 690150 may exchange information for a service list with the service list manager 690140.

The reception device 690000 may provide a service list, content guide information, and the like for the DVB-I service to a user based on the model and embodiments of FIG. 67. The receiver 690000 may provide the DVB-I service and service guide information, and optionally provide the user with the cable network, satellite network, terrestrial network, and IP network services and service guide information in connection with a tuner configured to receive the cable network, satellite network, terrestrial network, and IP network services.

Embodiments of maintaining the up-to-date state of the DVB-I client 690000 will be described with reference to FIGS. 65, 66, and 69. Depending on the options according to the embodiments, the operation of the reception device may vary.

Option 1 (65000): The meaning and reception operation of signaling of the service list level are disclosed below.

@MinimumMetadataUpdatePeriod in the service list is a polling period in which information about the entire DVB-I service list including services may be updated.

The DVB-I client service list manager 690020 included in the reception device 690000 of FIG. 69 may manage the entire service list and manage the update of the service list.

Regarding the HTTP cache-control of the reception device 690000, a max-age value is static, and an expiry period is calculated.

When a value of @MinimumMetadataUpdatePeriod is defined, the service list may be updated. A query may be sent to a service list address (@ServiceListURI) defined in <DVB-I Service List discovery scheme>.

The query period of the service list may be dynamically changed through the value of @MinimumMetadataUpdatePeriod regardless of the max-age value of HTTP cache-control for @ServiceListURI.

The changed service list information may be transmitted through a content guide manager 670050, and an update period of a content guide may be dynamically set.

Options 2, 3, and 4 (65010): The meaning and reception operation of signaling of the service level are disclosed below.

@MinimumMetadataUpdatePeriod in a service is a polling period in which service information and ContentGuideSource of a DVB-I single service may be updated.

The DVB-I client service list manager 690020 of FIG. 69 included in the reception device 60000 may manage individual service information and manage updates of individual services. HTTP cache-control sets the max-age to static and calculates the expiry period. When @MinimumMetadataUpdatePeriod is defined, the service list update is performed.

HTTP cache-control for @ServiceListURI defined in <DVB-I Service List discovery scheme> may dynamically set and change the query period of the service list through @MinimumMetadataUpdatePeriod, regardless of the max-age value.

In addition, in order to acquire the latest information according to @MinimumMetadataUpdatePeriod defined, the content guide manager 690050 dynamically performs polling for a specific duration based on the @ContentGuideSource HTTP endpoint of the content guide corresponding to each service.

Options 5 and 6 (66020): The meaning and reception operation of signaling of the ContentGuideSource level are disclosed below.

@MinimumMetadataUpdatePeriod, which defines ContentGuideSource in the service, specifies a polling period in which ContentGuideSource of a DVB-I single service may be updated.

The DVB-I content guide manager 690050 dynamically performs polling in a specific duration using the HTTP endpoint in @ContentGuideSource of a content guide corresponding to each service according to the defined value of @MinimumMetadataUpdatePeriod.

An example of the operation according to the embodiments is described below.

@availability End Time="12345"

The end time of the currently serviced data may be 12345. When there is no over-running issue, the reception device may receive and reproduce the next service data after the reference time 12345 according to a predetermined schedule.

@MinimumMetadataUpdatePeriod=1000

The reception device may perform an update operation for receiving metadata including content, a list of services, and guide information every 1000, which is a set update period value.

@version=1->2

The version may indicate an update or polling operation. When the version is changed from 1 to 2, this may indicate that the version is changed from static polling to dynamic polling.

@UniqueIdentifier=korea123

The reception device may receive a service and/or service information indicated by the unique identifier, korea123.

In this way, when the update period (@MinimumMetadataUpdatePeriod) is defined, the reception device (client) may send a query (e.g., <ScheduleInfoEndpoint>?korea123=12345&now_next=true) to the transmitting side according to the definition of a Now/Next filtered schedule request of the TV anytime of @ScheduleInfoEndpoint at intervals of "1000". Thereby, the reception device may access the server, processor, memory, etc. of the transmitting side, and update a new service and content guide required by the user at the corresponding time.

<attribute name="dynamic" type="boolean" default="false"/>

The transmission device may generate logical channels in corresponding LCNTableList and LCNTable in each service list according to the DVB-I service list hierarchy of FIGS. 45, 57, 64, and 67. The transmission device may provide an LCN channel for each service through @serviceRef, which is included in each LCNTableEntryType, in connection with @UniqueIdentifier of each service. The LCN channels connected to each service may define selectable/visible attributes according to channel attributes.

The content guide manager 690050 and the service list manager 690010 store the LCN channels of the DVB-I client in the channel database (DB) through a series of parsing and caching processes. In addition, they provide channel information to the user through a UI.

When the LCN list stored in the channel DB is not updated with the latest information, the UI aligned with the content information being played may not be displayed.

In order to present the correct information, the DVB-I content guide UI controller 670040 of FIGS. 45, 57, 64, 67, etc. indicate that dynamic polling is supported for the corresponding channel (e.g. the DVB-I channel) in the channel DB. For example, the indication may be provided based on a boolean attribute of @dynamic.

Through this information, the DVB-I LCN DB may pre-notify that a change may occur in a specific duration on a channel on which an LCN corresponding to a specific service may perform dynamic polling. Through this processing, the DVB-I client may create an interface that may update only a specific channel in the cached channel DB, and reflect the updated channel information on the UI through dynamic polling.

A channel DB, an LCN DB, etc. according to embodiments may correspond to a media processing device connected to the processor.

Figure 70:
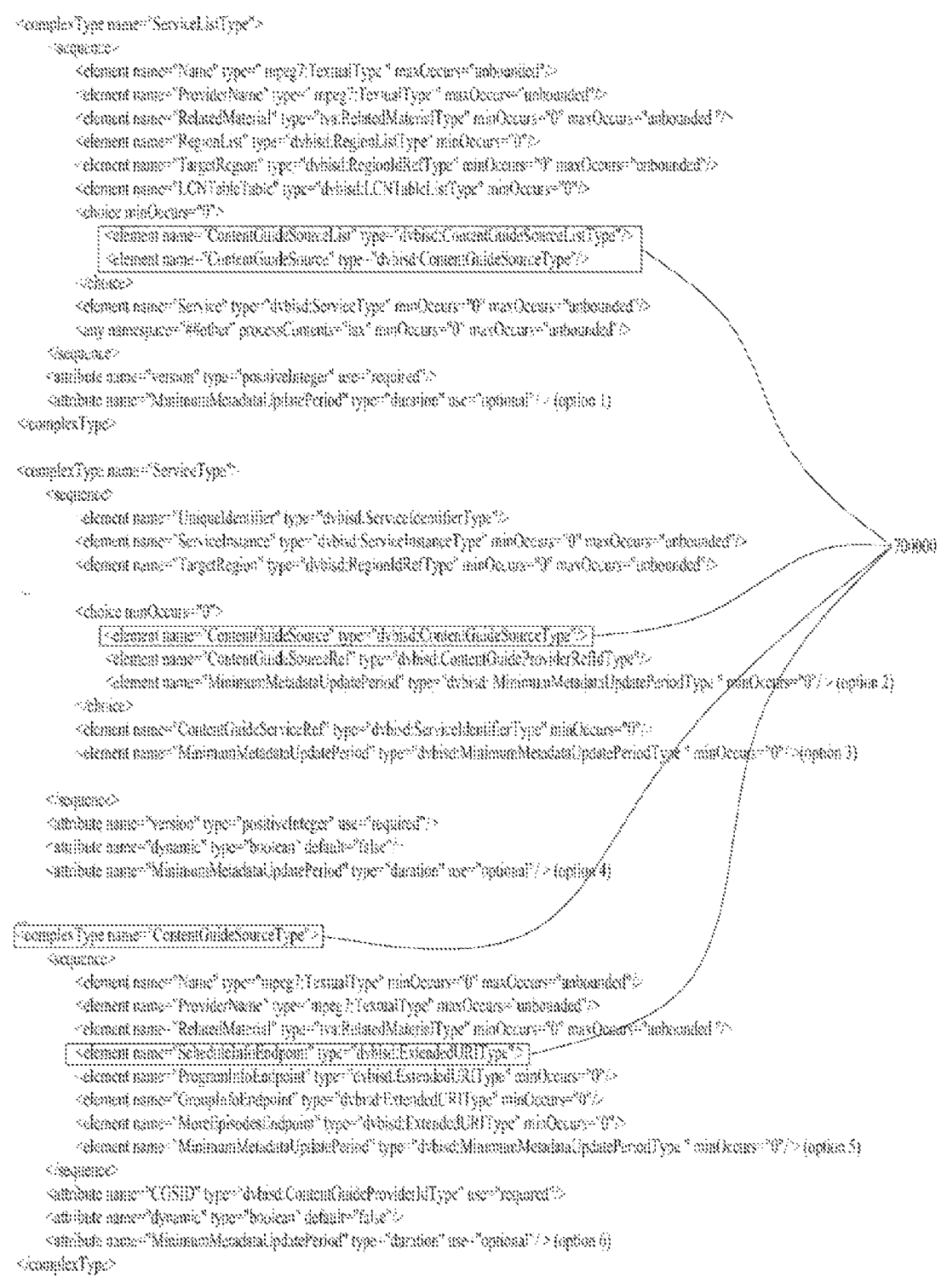

FIG. 70 illustrates a method of acquiring the latest content guide information for each DVB-I service according to embodiments.

FIG. 70 shows DVB-I service information as shown in FIGS. 45, 57, 64 to 68, and the like. The transmission device may generate DVB-I service information, and the reception device may acquire the latest information of the content guide based on the DVB-I service information.

According to the DVB-I service scheme of FIG. 70, there may be two methods of receiving ContentGuideSource.

(1) Constantly receiving the entire ContentGuideSource in the defined duration of all services at the service list level For example, the reception device may constantly acquire the ContentGuideSource at the service list level at a specific time, e.g., one of the following times on a day: 0:00, 3:00, 6:00, 9:00, 12:00, 15:00, 18:00, 21:00.

(2) Receiving ContentGuideSource information at the service level

The reception device may acquire the ContentGuideSource information at the service level, not at the service list level in the duration for all services.

In both methods, the information is received according to the following method.

Example URL: <ScheduleInfoEndpoint>?sid=12345&now_next=true

As in this scheme, @ScheduleInfoEndpoint may be defined in the same manner within the ContentGuideSourceType. In this method, an endpoint that may be received at the service list level and an endpoint that may be received at the service level are defined identically.

As a result, the reception durations for the service list level and the service level may be inevitably defined identically.

As indicated by 700000, ContentGuideSouceList, ContentGuideSource ContentGuideSourceType, and ScheduleInfoEndPoint are defined identically at the service list level and service level, and thus there is a limitation that the reception device must receive the same information.

Referring to the hierarchy of FIG. 64, the ServiceListType includes ContentGuideSourceList, ContentGuideSource, and MinimumMetadataUpdatePeriod. The ServiceType includes ContentGuideSource and MinimumMetadataUpdatePeriod. The ContentGuideSourceType includes ScheduleInfoEndPoint, Version, and MinimumMetadataUpdatePeriod. It may be seen that the ServiceListType and the SourceType reference the same ContentGuideSourceType.

Receiving now/next through ScheduleInfoEndpoint+sid is the same for services. Accordingly, updating a service is designed not to request update of only a specific period, which is a limitation. It is necessary to separate the endpoint for each service corresponding to each period to provide an end point for a specific individual period for each service.

Figure 71:
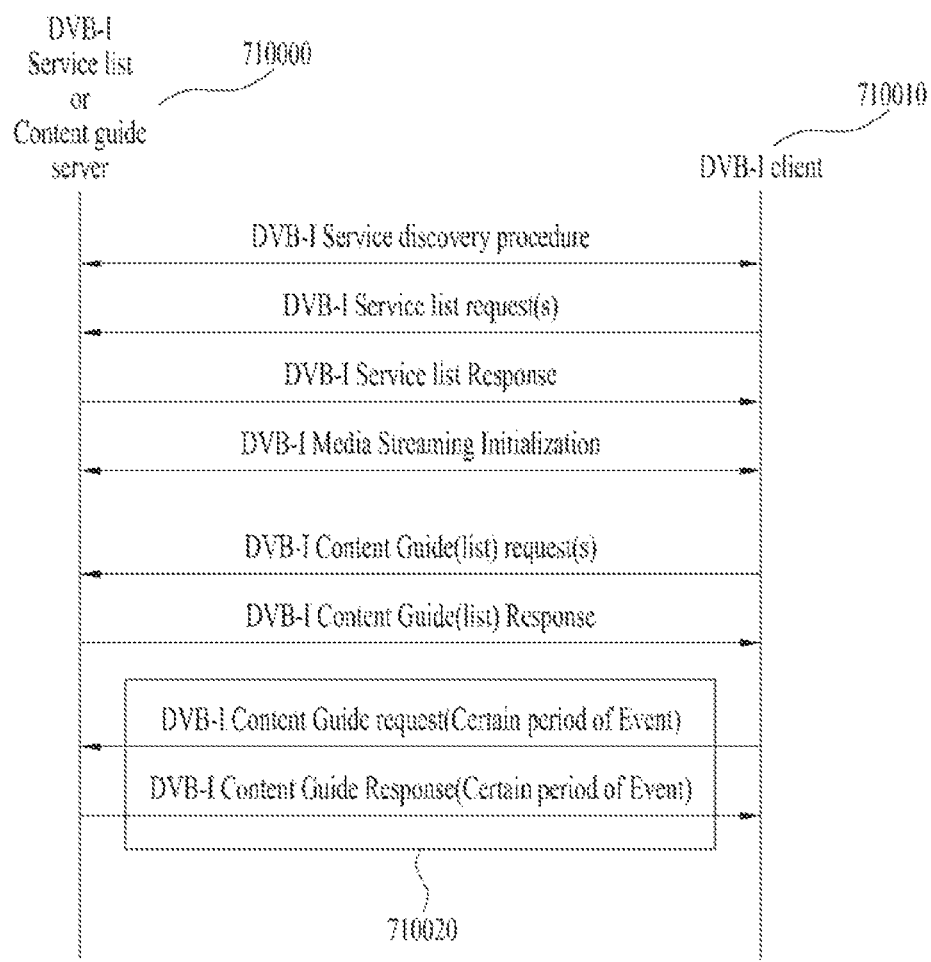
FIG. 71 is a flowchart of DVB-I service initialization and content guide update according to embodiments.

FIG. 71 is a flowchart of DVB-I service initialization and content guide update according to embodiments.

FIG. 71 illustrates an operation of service initialization and content guide update between a DVB-I source list or content guide server 710000 and a DVB-I client 710010.

The DVB-I source list or content guide server 710000 may correspond to a transmission device according to embodiments, and may correspond to the server (processor) 40000 of FIG. 4, the server (processor) 60030 of FIG. 6, and the server (processor) 70030 of FIG. 7, the server (processor) 16030, 16050 of FIG. 16, the server (processor) of FIG. 17, the server (processor) 19030 of FIG. 19, the server (processor) of FIGS. 22, 23 and 28, and the content guide server, the service list server, broadcaster 34010, the MPD server 34020, the stream server 34030, and the multicast server of FIG. 34.

The DVB-I client 710010 is a device that displays a service based on information about a DVB-I service. It corresponds to the device 20000 of FIG. 2, the device 40020, 40030, 40040, and 40050 of FIG. 4, the device 60000 of FIG. 6, the device 70010 of FIG. 7, the device 16000 of FIG. 16, the TV devices of FIGS. 17, 23, 24, 28, 32, 56, the device 19000 of FIG. 19, the player 34000 of FIG. 34, the client 690000 of FIG. 69, and the like.

Based on the operations illustrated in FIG. 71, the process of service initialization and content guide initialization and update is performed between the DVB-I service server 710000 and the DVB-I client 710010.

The transmission/reception device according to the embodiments performs a DVB-I service discovery process, a service list acquisition process, a DVB-I streaming initialization process, and a content guide initialization process in this order using the current schema.

However, this embodiment corresponds to the same content guide update, and may not support individual events and updates according to individual periods.

There is a limitation in that only a predefined time window section is allowed to be applied equally to the service list level or service level.

Accordingly, additional embodiments provide a method for extending the DVB-I service scheme such as the interface of 710020.

The reception device 710010 may send a DVB-I content guide request to the transmission device 710000. The request according to the embodiments may be a request generated based on a period of a specific event.

The transmission device 710000 may transmit a DVB-I content guide response to the reception device 710010 in response to the request from the reception device 710010. The response may be generated based on a period of a specific event.

FIG. 72 shows a DVB-I service scheme according to embodiments.

FIG. 72 shows a scheme for the interface 710020. The scheme for the interface 710020 according the embodiments includes 720000 and 720010.

The DVB-I scheme of FIGS. 45, 57, 64, and 67 may deliver an IndividualPeriodEndpoint element based on the content guide source type, such as 700000. The IndividualPeriodEndpoint may have ExtendedURIType.

The DVB-I scheme of FIGS. 45, 57, 64, and 67 may deliver the IndividualPeriodEndpoint element based on a service type, as in 720010. The IndividualPeriodEndpoint may have ExtendedURIType.

FIG. 73 shows a DVB-I service scheme according to embodiments.

FIG. 73 shows a DVB-I scheme according to embodiments, as shown in FIG. 72.

The DVB-I scheme of FIGS. 45, 57, 64, and 67 may deliver an IndividualPeriodEndpoint element based on the content guide source list, such as 730000.

Specifically, referring to the scheme of FIGS. 72 and 73, the reception device may receive ContentGuideSource elements as an example of a DVB-I service list response based on the procedure 710020.

The reception device (DVB-I client) may receive IndividualPeriodEndpoint as an endpoint for requesting content guide metadata between individual periods for each service. The reception device (client) may generate a string according to embodiments through the IndividualPeriodEndpoint and make a request for metadata information for each period to the transmitting side.

For example, suppose that the information of 2020-3-26 21:00:00 to 2020-3-27 00:00:00 is acquired for a service with Service ID=10, and data of 2020-3-26 21:00:00 to 2020-3-27 03:00:00 is acquired for Service ID=11 (based on, for example, unix time).

Then, https://cgs.az.metadata/IndividualPeriod?start=1585224000&end=1585234800&sid=10, and https://cgs.az.metadata/IndividualPeriod?start=1585224000&end=1585245600&sid=11.

The reception device may make a request for necessary information to the transmitting side for each service in each individual interval through a string as described above.

The reception device may generate corresponding information for each service and request data for each interval through the information.

For example, suppose that the reception device acquires information about a service in an interval from the current point in time to 2020-3-27 00:00:00 for a service of Service ID=10, and acquires data of the interval from the current point in time to 2020-3-27 03:00:00 for Service ID=11 (based on the unix time).

Then, https://cgs.az.metadata/IndividualPeriod?sid=10&now&end=1585234800, and https://cgs.az.metadata/IndividualPeriod?sid=11&now&end=1585245600.

The reception device may make a request for necessary information to the transmitting side for each service in each individual interval through the above string.

Figure 74:
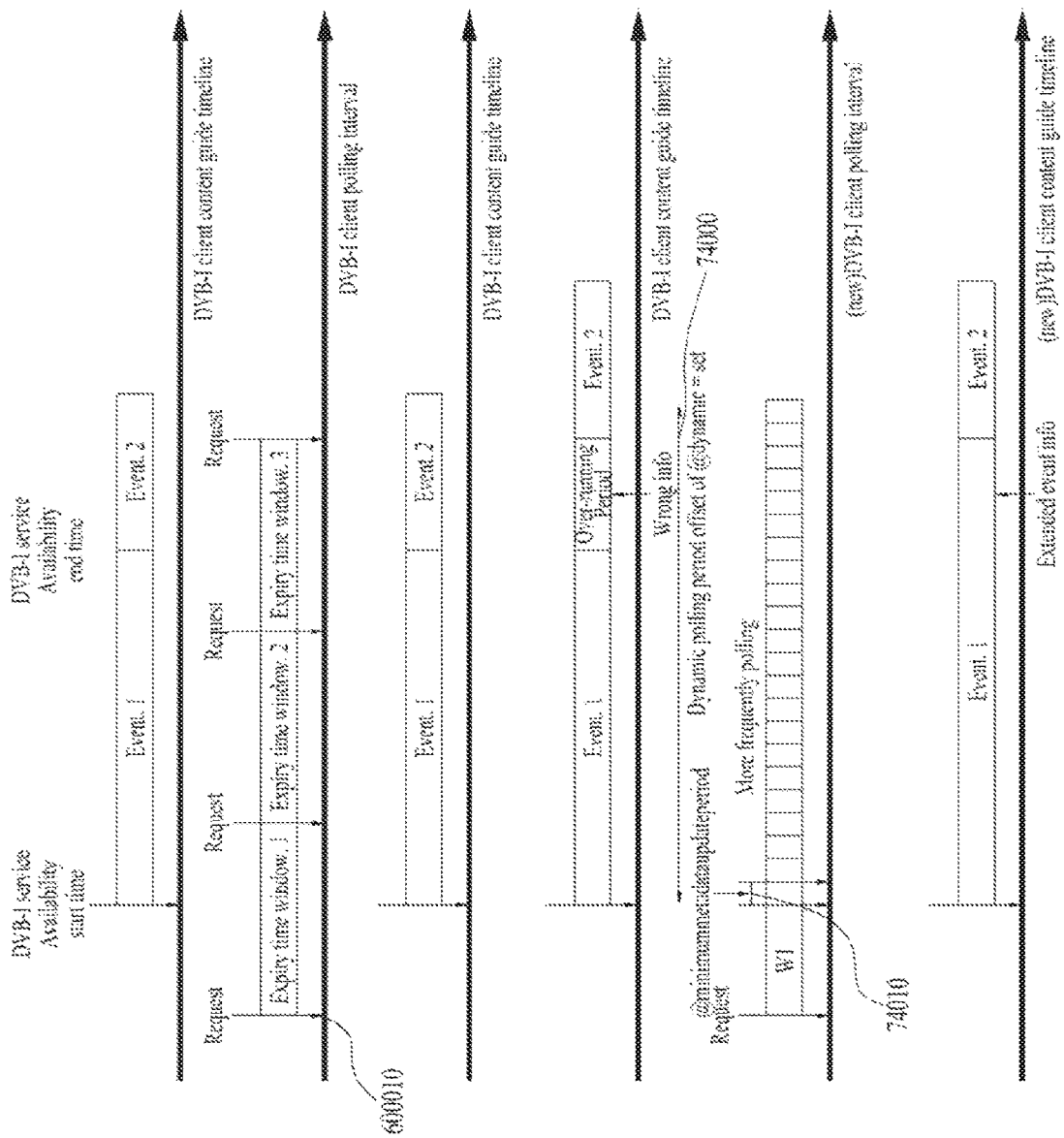
FIG. 74 illustrates a dynamic polling process according to embodiments.

FIG. 74 illustrates a dynamic polling process according to embodiments.

A transmission/reception device according to the embodiments relates to media transmission/reception processing. The media processing device according to the embodiments may or may not be associated with DVB-T/S/C. For example, the transmission/reception device may acquire discovery information (URL) about a service based on SI information in the RF transport stream, for example, service information such as NIT, and acquire discovery information about a service based on information (e.g., a hard-wired URL and a fixed end-point) between providers related to the media service.

The client (media processing device) according to the embodiments may process information such as, for example, a service list-service-service instant-content guide defined in TS103770. In addition, a DVB DASH player that may be connected to the client according to the embodiments processes MPD and DASH segments, and processes media data. The client may be referred to as a reception device. The reception device refers to a device configured to consume media or a processing device configured to provide media services to users.

For example, the media processing device 34000 or the like according to the embodiments may exchange information with the server. The server may include one or more servers. The service list and the content guide may have separate end points. The media processing device may access each server based on each endpoint and receive service list information and/or content guide. Furthermore, it may acquire a service list entry point and a URL for a service list query from a service list registry containing a service list through a NIT.

The media processing device according to the embodiments may adjust an individual update period for each individual service according to a situation. In the present disclosure, content according to embodiments means a media that may be consumed. A service according to embodiments may be a media containing the content. An operation according to embodiments is related to discovery/update of the latest information of a specific program of the service. As shown in FIG. 74, the media processing device according to the embodiments may perform a service/content guide update procedure for an individual event (media being watched) within a service of an individual service (e.g., a specific channel).

In the case of a non-real-time media service, which represents a media service that may be provided in real time or non-real time according to embodiments, there may be an issue of incorrect information delivery of service discovery. In addition, even in the case of real-time transmission, there is a need for a method of addressing the issue of provision of incorrect service information by the media processing device.

The media processing device according to the embodiments may provide a media event based on the DVB-I service availability window (time). Event 1 and Event 2 may have a start time and an end time, respectively. Event 1 and Event 2 may be provided to the user based on the DVB-I client content guide timeline.

The media processing device (client or reception device) may make a request for content guide information to the server according to a predetermined polling interval period. The request is regularly made based on the polling period of the client. The client may make the request according to a expiry time window set between the server and the client. However, the request may not handle a situation in which the time of the event changes dynamically.

The media processing device according to the embodiments may provide Events 1 and 2 to the user according to the DVB-I client consumption timeline. In this case, Event 1 may not end even after the end time and an over-running issue may be raised. In this case, while the user is watching Event 1, the content guide information may erroneously provide information about Event 2 to the user.

The media processing device according to the embodiments may perform dynamic polling based on the DVB-I client polling interval. The media processing device may acquire information on a section in which a dynamic polling interval is to be implemented for an event using the DVB-I service scheme according to the embodiments. The polling interval period may be indicated by a dynamic polling period offset according to embodiments or "@dynamic=true or false" according to embodiments.

The media processing device according to the embodiments may perform dynamic polling from a time indicated by the dynamic polling interval offset.

The media processing device according to the embodiments may perform dynamic polling from a time when dynamic information (polling period related information) is true.

The media processing device according to the embodiments may dynamically perform polling based on @minimummetadataupdateperiod. In each period indicated by @minimummetadataupdateperiod, polling may be performed more frequently and the media processing device may request and acquire content guide information.

The media processing device according to embodiments may acquire extended event information (e.g., content guide information) based on dynamic polling when Event 1 is run over the end time.

The media processing device according to the embodiments may correctly provide the event information (e.g., time, etc.) to the user through UI, banner, information, etc., based on content guide information suitable for a current event.

In other words, the following operations are performed between the media reception device and the media transmission device.

When the start/end time of a specific service (event) is not clearly known, the application/non-application of dynamic polling is signaled through a boolean value of @dynamic (True or False).

Thereafter, a polling request may be sent to the server and the processor on the transmitting side at every polling interval 74010 for a predetermined polling period 74000, and the media reception device may receive a response and update the metadata.

The polling algorithm is changed from the polling defined period 74000 to a period (@minimumMetadataUpdatePeriod) 74010.

Based on the period defined in @minimumMetadataUpdatePeriod, the data is updated to the latest data through a request and response according to a predefined end-point.

The dynamic polling period 74000 may be started by setting the related information to True. The polling period may be dynamically set on a service-by-service basis or event-by-event basis.

Figure 75:
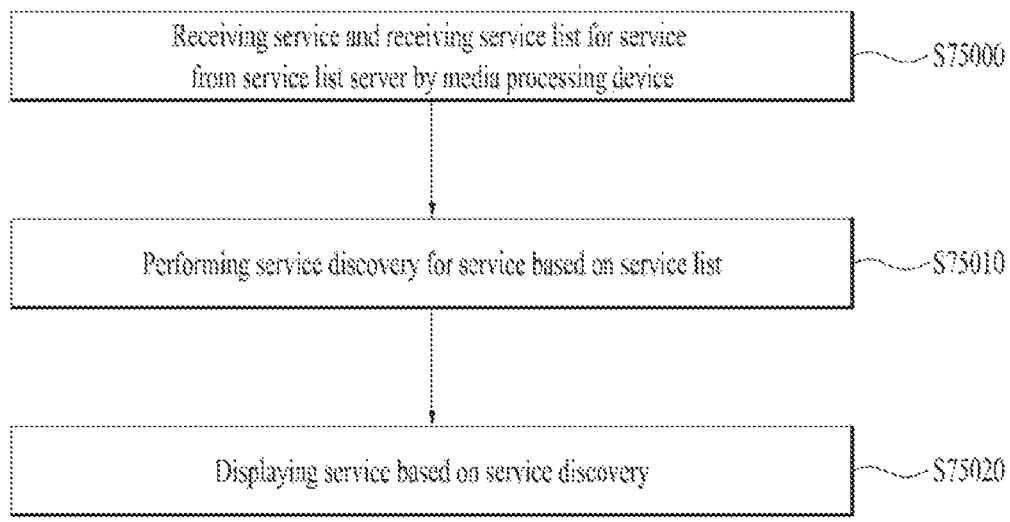
FIG. 75 illustrates a media reception method according to embodiments.

FIG. 75 illustrates a broadcast signal reception method according to embodiments.

The broadcast signal reception method according to the embodiments may be referred to as a media processing method for a DVB-I media service.

The media processing method according to embodiments may include the following operations.

S75000: The media processing method according to the embodiments, includes receiving a service by a media processing device, and receiving a service list for the service from a service list server.

The operation of acquiring the service and the service list according to the embodiments is performed as described with reference to FIGS. 4, 6, 7, 16, 17, 19, 23-34 28, 32, 34, and the like.

The service according to the embodiments is delivered to the reception device based on the network structure, the system structure, and the like of FIG. 1-3.

The service and/or the service list according to the embodiments may be received based on a satellite network, a cable network, a terrestrial network, the Internet, or the like.

According to embodiments, the service list information may be configured according to such a hierarchy as shown in FIGS. 57, 63, 64 to 68, 70, 72, 73, and the like.

The media processing device according to the embodiments includes the devices 10060, 10070, 40020, 40030, 40040, 60000, 72010, and 34000, and the client 690000 of FIG. 69.

The media processing device according to the embodiments is connected to a network such as DVB-S/T/C/I to receive services and/or service lists of various networks. In addition, it performs operations according to embodiments for efficient DVB-I service discovery.

S75010: The media processing method according to the embodiments includes performing service discovery for the service based on the service list.

The service discovery according to the embodiments may be performed according to the flowcharts of FIGS. 8, 25, 29, 33, 34, 41, 59 to 62, 71, and the like.

The service discovery according to embodiments may efficiently provide the DVB-I media service to users without errors.

S75020: The media processing method according to the embodiments includes displaying the service based on the service discovery.

The displaying of the service according to the embodiments is performed as described with reference to FIGS. 4, 6, 7, 16, 17, 19, 23-34 28, 32, 34, and the like.

A media processing (reception) device according to embodiments includes a receiver configured to receive a service and receive a service list from a service list server, a processor configured to perform service discovery for the service based on the service list, and a displayer configured to display the service based on the service discovery (see FIG. 34 and the like).

The service list according to the embodiments contains content guide source information providing metadata about one or more services for the service list (see FIG. 62 and the like).

The content guide source information according to the embodiments includes period information related to a polling operation for updating the metadata by the media processing device (see FIGS. 61 to 63, etc.).

The content guide source information according to the embodiments may include endpoint information providing schedule metadata related to the content guide source information, and the media processing device may access the endpoint information based on the period information related to a polling operation for updating the metadata included in the content guide source information (see FIGS. 61 to 63, etc.).

Content on the service according to the embodiments may be dynamically scheduled, and the media processing device may acquire current metadata or next metadata based on the period information related to the polling operation for update (see FIG. 60 and the like).

An event of the service according to the embodiments may have a start time and an end time, the media processing device may perform a polling operation on the server to update the metadata of the service based on a constant period. When the event is over-run with respect to the end time, the media processing device may request polling of the metadata about the current event during a period indicated by the period information related to the polling operation (see FIG. 60, etc.).

Figure 76:
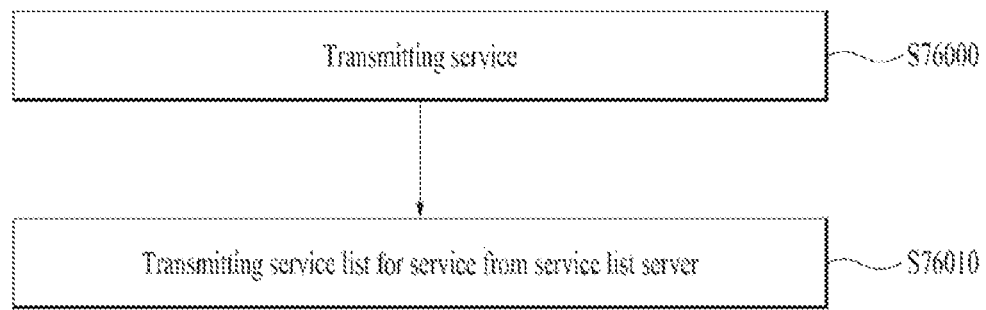
FIG. 76 illustrates a media transmission method according to embodiments.

FIG. 76 illustrates a broadcast signal transmission method according to embodiments.

The broadcast signal transmission method according to the embodiments may be referred to as a media processing method for a DVB-I media service.

The media processing method according to the embodiments may include the following operations performed by the media transmission device.

S76000: The media processing method according to the embodiments may include transmitting a service.

The media transmission device according to the embodiments may be a processor connected to the server 40000, 60030, 70030, 16050, 19030, and the content guide and service list server, broadcaster, MPD server, stream server, multicast server, and the like of FIG. 34.

The transmitting of the service according to the embodiments may be performed based on the network/system structure of FIG. 1 to 3 and the like.

The service according to the embodiments may be transmitted over a satellite network, a cable network, a terrestrial network, or the Internet.

S76010: The media processing method according to the embodiments may include transmitting a service list for a service from the service list server.

The service list information for service discovery according to the embodiments is generated by the media transmission device and transmitted to the media reception device.

The service list information according to the embodiments may be configured according to a hierarchy such as those shown in FIGS. 57, 62, 63 to 66, 68, 70, and 71.

The media transmission device according to the embodiments may exchange information with the media reception device and provide necessary data to the reception device according to the flowchart of FIG. 34, 69, or the like.

The media transmission method according to the embodiments may provide efficient service discovery information and operations and information corresponding to the request from the reception device such that the media reception device may efficiently provide the DVB-I service to the user without errors.

The transmission operation of FIG. 76 according to the embodiments may have a reverse relationship with the reception operation of FIG. 75.

A media processing (transmission) device according to the embodiments may include a memory and a processor connected to the memory. The processor may transmit a service, transmit a service list for the service from a service list server. The service list may be used to perform service discovery for the service.

Each part, module, or unit described above may be software, a processor, or a hardware part that executes successive procedures stored in a memory (or storage unit). The respective operations described in the embodiments above may be performed by software, processors or hardware parts. Each module/block/unit described in the examples above may operate as a processor, software, or hardware. In addition, the methods proposed in the embodiments may be realized by code. The code may be written in a recoding medium readable by a processor so that the code may be read by the processor provided by the apparatus.

Although the description of the present disclosure is explained with reference to each of the accompanying drawings for clarity, it is possible to design new examples by merging the examples shown in the accompanying drawings with each other. If a recording medium readable by a computer, in which programs for executing the examples mentioned in the foregoing description are recorded, is designed by those skilled in the art, it may fall within the scope of the appended claims and their equivalents.

The devices and methods according to the embodiments may be non-limited by the configurations and methods of the examples mentioned in the foregoing description. The examples mentioned in the foregoing description may be configured in a manner of being selectively combined with one another entirely or in part to enable various modifications.

In addition, the proposed methods according to the embodiments may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the disclosure has been described with reference to the exemplary examples, those skilled in the art will appreciate that various modifications and variations may be made in the embodiments without departing from the spirit or scope of the disclosure described in the appended claims. Such modifications are not to be understood individually from the technical idea or viewpoint of the present disclosure It will be appreciated by those skilled in the art that various modifications and variations may be made in the embodiments without departing from the spirit or scope of the disclosures. Thus, it is intended that the present disclosure covers the modifications and variations of this disclosure provided they come within the scope of the appended claims and their equivalents.

In the present disclosure, both an apparatus disclosure and a method disclosure are mentioned, and the descriptions of both the apparatus and method disclosures may be applied to complement each other.

In this document, the term "/"and," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Terms such as first and second may be used to describe various elements of the embodiments. However, various elements according to the embodiments should not be limited by the above terms. These terms are only used to distinguish one element from another.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

Mode for Disclosure

As described above, related details have been described in the best mode for carrying out the embodiments.

INDUSTRIAL APPLICABILITY

It is apparent to those skilled in the art that various changes and modifications are possible in the present disclosure without departing from the spirit or scope of the present disclosure. Accordingly, the present disclosure is intended to cover modifications and changes of the present disclosure provided within the appended claims and their equivalents.

The invention claimed is:

1. An apparatus for processing media, the apparatus comprising:
a receiver configured to receive a service list for a service based on an internet channel by querying the service list to a service list server;
a processor configured to perform service discovery for the service based on the service list,
wherein content guide source information related to the service list includes period information related to a polling operation,
wherein the processor is further configured to poll updated metadata based on the period information; and
a displayer configured to display the service based on the service discovery.

2. The apparatus of claim 1,
wherein the content guide source information includes endpoint information providing schedule metadata for the content guide source information, and
wherein the apparatus accesses the endpoint information based on period information related to polling operation for update of the metadata included in the content guide source information.

3. The apparatus of claim 1,
wherein a content on the service is dynamically scheduled, and
wherein the apparatus acquires now metadata or next metadata based on the period information related to polling operation for update.

4. The apparatus of claim 1,
wherein an event of the service has start time and end time,
wherein the apparatus performs polling operation in order to update metadata for the service based on a specific period,
when the event is over-run for the end time, the apparatus requests polling of metadata for a current event during a period represented by the period information related to the polling operation.

5. A method for processing media, the method comprising:
receiving a service list for a service by an apparatus for processing media based on an internet channel by querying the service list to a service list server;
performing service discovery for the service based on the service list,
wherein content guide source information related to the service list includes period information related to a polling operation;
polling updated metadata based on the period information; and
displaying the service based on the service discovery.

6. The method of claim 5,
wherein the content guide source information includes endpoint information providing schedule metadata for the content guide source information, and
wherein the apparatus accesses the endpoint information based on period information related to polling operation for update of the metadata included in the content guide source information.

7. The method of claim 5,
wherein a content on the service is dynamically scheduled, and
wherein the apparatus acquires now metadata or next metadata based on the period information related to polling operation for update.

8. The method of claim 5,
wherein an event of the service has start time and end time,
wherein the apparatus performs polling operation in order to update metadata for the service based on a specific period,
when the event is over-run for the end time, the apparatus requests polling of metadata for a current event during a period represented by the period information related to the polling operation.

9. An apparatus for processing media, the apparatus comprising:
- a memory; and
- a processor connected to the memory, wherein the processor is configured to:
- transmit a service list for a service to a client based on an internet channel in response to a query of the service list from the client,
- wherein the service list is used to perform service discovery for the service,
- wherein content guide source information related to the service list includes period information related to a polling operation;
- receive polling updated metadata based on the period information.

10. A method for processing media, the method comprising:
- transmitting a service list for a service to a client based on an internet channel in response to a query of the service list from the client,
- wherein the service list is used to perform service discovery for the service,
- wherein content guide source information related to the service list includes period information related to a polling operation; and
- receiving polling updated metadata based on the period information.

* * * * *